US010027027B2

(12) United States Patent
Gao et al.

(10) Patent No.: US 10,027,027 B2
(45) Date of Patent: Jul. 17, 2018

(54) BEAM TRACKING METHOD, APPARATUS, AND SYSTEM

(71) Applicant: Huawei Technologies Co., Ltd., Shenzhen, Guangdong (CN)

(72) Inventors: Bo Gao, Beijing (CN); Depeng Jin, Beijing (CN); Dejian Li, Beijing (CN); Jiamin Chen, Beijing (CN); Pei Liu, Beijing (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 15/064,354

(22) Filed: Mar. 8, 2016

(65) Prior Publication Data

US 2016/0190686 A1  Jun. 30, 2016

Related U.S. Application Data

(63) Continuation of application No. PCT/CN2013/083159, filed on Sep. 9, 2013.

(51) Int. Cl.
*H01Q 3/24* (2006.01)
*H04L 27/26* (2006.01)
(Continued)

(52) U.S. Cl.
CPC ............ *H01Q 3/24* (2013.01); *H04B 7/0617* (2013.01); *H04B 7/0695* (2013.01); *H04B 7/086* (2013.01); *H04B 7/088* (2013.01); *H04L 27/2607* (2013.01)

(58) Field of Classification Search
CPC ..................................................... H01Q 3/24
(Continued)

(56) References Cited

U.S. PATENT DOCUMENTS 7,289,826 B1  10/2007  Hovers et al.
2002/0165001 A1  11/2002  Phillips et al.
(Continued)

FOREIGN PATENT DOCUMENTS

CN  101350659 A  1/2009
CN  101808342 A  8/2010
CN  101867401 A  10/2010

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications Amendment 3", IEEE Standard, Picasaway, NJ, USA, Dec. 28, 2012, XP068045729.*

(Continued)

*Primary Examiner* — Gregory C. Issing
*Assistant Examiner* — Helena H Seraydaryan
(74) *Attorney, Agent, or Firm* — Fish & Richardson P.C.

(57) ABSTRACT

The present invention relates to the field of communications technologies, and discloses a beam tracking method, apparatus, and system, so as to ensure rapid discovery and to switch from an optimal link to a backup link in time, or switch from a backup link to an optimal link, thereby effectively improving a throughput of a system link. The beam tracking method includes: transmitting, by a beam tracking initiator, a beam tracking request to a beam tracking responder; receiving, by the beam tracking initiator, an enhanced beam tracking training auxiliary sequence transmitted, according to the enhanced beam tracking request, by the beam tracking responder; and when it is determined according to a reception detection result of the enhanced beam tracking training auxiliary sequence that it is necessary to switch to a backup beam link, transmitting, by the beam (Continued)

tracking initiator, first link switching information to the beam tracking responder.

19 Claims, 17 Drawing Sheets

(51) Int. Cl.
    *H04B 7/06*     (2006.01)
    *H04B 7/08*     (2006.01)

(58) Field of Classification Search
    USPC .......................................................... 342/374
    See application file for complete search history.

(56) References Cited

U.S. PATENT DOCUMENTS

| | | | |
|---|---|---|---|
| 2010/0150254 A1* | 6/2010 | Hansen | H04B 7/0617 375/259 |
| 2010/0210219 A1 | 8/2010 | Stirling et al. | |
| 2010/0214169 A1* | 8/2010 | Kafle | H01Q 3/26 342/368 |
| 2011/0211490 A1 | 9/2011 | Nikula et al. | |
| 2011/0287796 A1 | 11/2011 | Jain et al. | |
| 2012/0002681 A1* | 1/2012 | Inohiza | H04L 1/0003 370/437 |

OTHER PUBLICATIONS

Y. Ming Tsang and Ada S. Y. Poon, "Coding the Beams: Improving Beamforming Training in mmWave Communication System", Aug. 1, 2012.*
Bernard Schulz, "802.11.ad—WLAN at 60 GHz—A technology introduction"; Mar. 24, 2010. (Year: 2010).*
Bo Gao, et al., "IEEE P802.11—Wireless LANs"; Oct. 2014. (Year: 2014).*
"Part 11: Wireless LAN Medium Access Control (MAC) and Physical Layer (PHY) Specifications—Amendment 3: Enhancements for Very High Throughput in the 60 GHz Band", IEEE Std 802.11ad, Dec. 28, 2012, 628 pages.

\* cited by examiner

| B0 B7 | B8 B15 | B16 B17 | B18 B23 | B24 B25 | B26 | B27 | B28 | B29 | B30 B31 |
|---|---|---|---|---|---|---|---|---|---|
| Information element identity | Length | Backup link antenna weight vector setting | Peer transmit-sector identity | Peer transmit-antenna identity | Enhanced beam tracking in receiver request | Enhanced beam tracking in receiver OK | Enhanced beam tracking in transmitter request | Enhanced beam tracking in transmitter OK | Reserved bit |

FIG. 4

| B0 | B7 | B8 | B15 | B16 | B17 | B18 | B23 | B24 | B25 | B26 | B27 | B28 | B29 | B30 | B31 |
|---|---|---|---|---|---|---|---|---|---|---|---|---|---|---|---|
| Information element identity | | Length | | Backup link antenna weight vector setting | | Peer transmit-sector identity | | Peer transmit-antenna identity | | Enhanced beam tracking in receiver request | Enhanced beam tracking in receiver OK | Enhanced beam tracking in transmitter request | Enhanced beam tracking in transmitter OK | Switch to backup link identity | Reserved bit |

FIG. 5

BEAM TRACKING METHOD, APPARATUS, AND SYSTEM

CROSS-REFERENCE TO RELATED APPLICATIONS

This application is a continuation of International Application No. PCT/CN2013/083159, filed on Sep. 9, 2013, which is hereby incorporated by reference in its entirety.

TECHNICAL FIELD

The present invention relates to the field of communications technologies, and in particular, to a beam tracking method, apparatus, and system.

BACKGROUND

With inevitable trends that wireless communication spectrum resources become increasingly inadequat and data transmission rates become increasingly high, a 60 GHz band wireless short-range communications technology attracts increasing attention and becomes one of technologies having the greatest potential among wireless communications technologies. The 60 GHz band wireless short-range communications technology is a millimeter-wave communications technology and has an enormous communication capacity. Moreover, the 60 GHz band is also a globally free band, and therefore the European countries, the United States, Japan, and the like successively obtain continuous non-licensed spectrum resources through division from a range of 57 GHz to 66 GHz.

Because a 60 GHz millimeter wave is applicable to high-speed, short-range line of sight (Line of sight, LOS for short) communication, an LOS communication link is an optimal path of communication between devices. When the LOS communication link is being blocked, the link is interrupted, causing a loss of data transmitted between the devices. After the LOS communication link is blocked, beam tracking is performed again between the devices to find another backup link (for example, a non line of sight path (Non Line of sight, NLOS for short)), and communication keeps taking place by using the backup link. When the backup link is also blocked or beam training needs to be performed again between the devices, a system finds the original optimal path again. Because switching of an optimal link and the backup link cannot be performed between the devices in time, a throughput of the entire system is obviously affected.

SUMMARY

Embodiments of the present invention provide a beam tracking method, apparatus, and system, so as to ensure rapid discovery and to switch from an optimal link to a backup link in time, or switch from a backup link to an optimal link, thereby effectively improving a throughput of a system link.

To achieve the foregoing objective, the following technical solutions are adopted in the embodiments of the present invention:

According to a first aspect, the present invention provides a beam tracking method, including:

transmitting, by a beam tracking initiator, a beam tracking request to a beam tracking responder;

receiving, by the beam tracking initiator, an enhanced beam tracking training auxiliary sequence transmitted, according to the enhanced beam tracking request, by the beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link; and when it is determined according to a reception detection result of the enhanced beam tracking training auxiliary sequence that it is necessary to switch to a backup beam link, transmitting, by the beam tracking initiator, first link switching information to the beam tracking responder, where the first link switching information is used to instruct the beam tracking initiator and the beam tracking responder to switch to a second backup beam link.

In a first possible implementation manner, according to the first aspect, the transmitting, by a beam tracking initiator, a beam tracking request to a beam tracking responder includes:

if the current beam link via which the beam tracking initiator and the beam tracking responder perform communication is an optimal link after beamforming, and the beam tracking initiator detects that signal attenuation of the current beam link exceeds a preset threshold, transmitting, by the beam tracking initiator, the beam tracking request to the beam tracking responder; or, if the current beam link via which the beam tracking initiator and the beam tracking responder perform communication is a second optimal link after beamforming, and the beam tracking initiator detects that an optimal link after beamforming is recovered, transmitting, by the beam tracking initiator, the beam tracking request to the beam tracking responder.

In a second possible implementation manner, with reference to the first aspect or the first possible implementation manner, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

In a third possible implementation manner, with reference to the first aspect or the former two possible implementation manners, the receiving, by the beam tracking initiator, an enhanced beam tracking training auxiliary sequence transmitted, according to the enhanced beam tracking request, by the beam tracking responder includes:

a switch to backup beam link identity Switch to Backup AWV, used to represent whether to switch to a backup beam link in a next frame and use an antenna configuration of the current beam link as an antenna configuration of the backup beam link in the next frame.

In a fourth possible implementation manner, according to the first aspect, before the transmitting, by a beam tracking initiator, a beam tracking request to a beam tracking responder, the method further includes:

transmitting, by the beam tracking initiator, enhanced beam tracking information to the beam tracking responder, where the enhanced beam tracking information includes: antenna configuration information of the first backup beam link and an identity of requesting the beam tracking responder to transmit the enhanced beam tracking training auxiliary sequence; and receiving, by the beam tracking initiator, response information transmitted by the beam tracking responder, where the response information is used to instruct the beam tracking responder whether to transmit the enhanced beam tracking training auxiliary sequence.

In a fifth possible implementation manner, according to the fourth possible implementation manner, the transmitting, by the beam tracking initiator, enhanced beam tracking information to the beam tracking responder includes:

transmitting, by the beam tracking initiator, the enhanced beam tracking information to the beam tracking responder in a sector-level sweep SLS phase; or, transmitting, by the beam tracking initiator, the enhanced beam tracking information to the beam tracking responder in a beam refinement protocol BRP phase.

In a sixth possible implementation manner, with reference to the fourth or fifth possible implementation manner, the enhanced beam tracking information is in an enhanced beam tracking information unit of a media access control MAC layer;

the transmitting, by the beam tracking initiator, enhanced beam tracking information to the beam tracking responder includes:

transmitting, by the beam tracking initiator to the beam tracking responder, a sector sweep SSW frame or a sector sweep feedback SSW-feedback frame including, in the SLS phase, the enhanced beam tracking information unit; or, transmitting, by the beam tracking initiator to the beam tracking responder, a beam refinement protocol BRP frame including, in the BRP phase, the enhanced beam tracking information unit; and the receiving response information transmitted by the beam tracking responder includes:

receiving, by the beam tracking initiator, an SSW frame or an SSW-feedback, carrying an enhanced beam tracking information unit of the response information, transmitted by the beam tracking responder; or, receiving, by the beam tracking initiator, a BRP frame, carrying an enhanced beam tracking information unit of the response information, transmitted by the beam tracking responder.

In a seventh possible implementation manner, according to the sixth possible implementation manner, the enhanced beam tracking information unit includes:

an information element identity Element ID, used to represent an ID of a current information unit;

a length Length, used to represent a length of the current information unit;

a backup beam link antenna weight vector setting Backup AWV Setting, used to whether to update an antenna vector setting of a peer backup beam link;

a peer transmit-sector identity Peer Tx_Sector ID, used to represent whether a peer transmit-sector identity needs to be backed up;

a peer transmit-antenna identity Peer Tx_Antenna ID, used to represent whether a peer transmit-antenna identity needs to be backed up;

an enhanced beam tracking in receiver request E-BT-R Request, used to represent whether to request a peer to receive a training auxiliary sequence according to an enhanced beam tracking mode;

an enhanced beam tracking in receiver OK E-BR-R OK, used to represent whether itself receives a training auxiliary sequence of an enhanced beam tracking mode;

an enhanced beam tracking in transmitter request E-BT-T Request, used to represent whether to request a peer to transmit a training auxiliary sequence according to an enhanced beam tracking mode; and an enhanced beam tracking in transmitter OK E-BR-T OK, used to represent whether itself transmits a training auxiliary sequence of an enhanced beam tracking mode.

In an eighth possible implementation manner, according to the seventh possible implementation manner, the transmitting, by the beam tracking initiator, first link switching information to the beam tracking responder includes:

transmitting, by the beam tracking initiator to the beam tracking responder, the first link switching information carried in a frame header of a physical layer frame.

In a ninth possible implementation manner, according to the seventh possible implementation manner, the enhanced beam tracking information unit further includes:

a switch to backup beam link identity Switch to Backup AWV, used to represent whether to switch to a backup beam link in a next frame and use an antenna configuration of the current beam link as an antenna configuration of the backup beam link in the next frame; and the transmitting, by the beam tracking initiator, first link switching information to the beam tracking responder includes:

transmitting, by the beam tracking initiator to the beam tracking responder, an SSW frame or an SSW-feedback carrying an enhanced beam tracking information unit of the first link switching information; or, transmitting, by the beam tracking initiator to the beam tracking responder, a BRP frame carrying an enhanced beam tracking information unit of the first link switching information.

In a tenth possible implementation manner, according to the third possible implementation manner, after the receiving an enhanced beam tracking training auxiliary sequence transmitted, according to the enhanced beam tracking request, by the beam tracking responder, and before the transmitting first link switching information to the beam tracking responder, the method further includes: if the current beam link via which the beam tracking initiator and the beam tracking responder perform communication is an optimal link after beamforming or a proximate selectable beam link of the optimal link, determining whether it is necessary to switch to a backup beam link in the next frame; and in a case in which it is necessary to switch to a backup beam link, calculating an azimuth of the second backup beam link that needs to be switched to in the next frame, and an azimuth of a backup beam link when the second backup beam link is used as a current link.

In an eleventh possible implementation manner, according to the tenth possible implementation manner, after the determining whether it is necessary to switch to a backup beam link in the next frame, the method further includes:

calculating, in a case in which it is not necessary to switch to a backup beam link, an azimuth of a beam link of the next frame.

In a twelfth possible implementation manner, with reference to the tenth or eleventh possible implementation manner, the determining whether it is necessary to switch to a backup beam link in the next frame includes:

performing pilot detection and estimation separately on the current beam link, the proximate selectable beam link of the current beam link, and the first backup beam link, to obtain the reception detection result of the enhanced beam tracking training auxiliary sequence;

calculating, according to the reception detection result of the enhanced beam tracking training auxiliary sequence and received signal energy of the optimal link, signal power attenuation caused by antenna rotation and signal power attenuation caused by a link blockage; and determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame.

In a thirteenth possible implementation manner, according to the twelfth possible implementation manner, the reception detection result of the enhanced beam tracking training auxiliary sequence includes:

an azimuth of a maximum received energy beam and maximum received signal energy in the proximate selectable beam link of the current beam link, received signal energy of the current beam link, and received signal energy of the backup beam link.

In a fourteenth possible implementation manner, according to the thirteenth possible implementation manner, the calculating an azimuth of the second backup beam link that needs to be switched to in the next frame, and an azimuth of a backup beam link when the second backup beam link is used as a current link includes:

calculating, according to a determining result of whether the antenna is rotated, a determining result of whether it is necessary to switch to a backup beam link in the next frame, the azimuth of the maximum received energy beam in the proximate selectable beam link of the current beam link, an azimuth of an optimal beam link, and the azimuth of the backup beam link, the azimuth of the second backup beam link that needs to be switched to in the next frame, and the azimuth of the backup beam link when the second backup beam link is used as the current link.

In a fifteenth possible implementation manner, according to the twelfth possible implementation manner, the calculating, according to the reception detection result of the enhanced beam tracking training auxiliary sequence and received signal energy of the optimal link, signal power attenuation caused by antenna rotation and signal power attenuation caused by a link blockage includes:

calculating the signal attenuation of the current beam link by using a first formula; and calculating, according to the signal attenuation, of the current beam link, obtained through calculation according to the first formula, and by using a second formula, the signal power attenuation caused by antenna rotation and the signal power attenuation caused by a link blockage, where the first formula is:

$$\begin{cases} S_{curr}(t) = P_{optimal} - P_{curr}(t) \\ S_{max\_power}(t) = P_{optimal} - P_{max\_power}(t) \end{cases}$$

where $S_{curr}(t)$ represents the current beam link signal power attenuation, $S_{max\_power}(t)$ represents attenuation of maximum received signal energy in the proximate selectable beam link of the current beam link and received signal energy of an optimal beam link, $P_{optimal}$ represents the received signal energy of the optimal beam link, $P_{max\_power}$ represents the maximum received signal energy in the proximate selectable beam link of the current beam link, and $P_{curr}$ represents signal energy of the current beam link; and the second formula is:

$$\begin{bmatrix} S_{max\_power}(t) \\ S_{curr}(t) \end{bmatrix} = \begin{bmatrix} 0 & 1 \\ 1 & 1 \end{bmatrix} \begin{bmatrix} S_R(t) \\ S_B(t) \end{bmatrix}$$

where $S_R(t)$ represents the signal power attenuation caused by antenna rotation, $S_B(t)$ represents the signal power attenuation caused by link blockage, $S_{curr}(t)$ represents the signal attenuation of the current beam link, and $S_{max\_power}(t)$ represents the attenuation of the maximum received signal energy in the proximate selectable beam link of the current beam link and the received signal energy of the optimal beam link.

In a sixteenth possible implementation manner, according to the fifteenth possible implementation manner, the determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame includes:

if $S_R(t) > \Gamma_R$, determining that an antenna is rotated, and setting a flag bit to $F_R=1$, or otherwise $F_R=0$; and if $S_B(t) > \Gamma_B$ or $P_{curr\_alter} > P_{max\_power}$, determining that it is necessary to switch to a backup beam link in the next frame, and setting a flag bit to $F_{switch}=1$, or otherwise $F_{switch}=0$, where $\Gamma_R$ represents a threshold of signal power attenuation caused by antenna rotation, $\Gamma_B$ represents a threshold of signal power attenuation caused by link blockage, $S_R(t)$ represents the signal power attenuation caused by antenna rotation, $S_B(t)$ represents the signal power attenuation caused by link blockage, $F_{switch}$ represents an identity of whether to switch to a second backup link, and $\Gamma_R$ represents an identity of whether an antenna is rotated.

In a seventeenth possible implementation manner, according to the sixteenth possible implementation manner, the calculating, according to a determining result of whether the antenna is rotated, a determining result of whether it is necessary to switch to a backup beam link in the next frame, the azimuth of the maximum received energy beam in the proximate selectable beam link of the current beam link, an azimuth of an optimal beam link, and the azimuth of the backup beam link, the azimuth of the second backup beam link that needs to be switched to in the next frame, and the azimuth of the backup beam link when the second backup beam link is used as the current link includes:

calculating the azimuth of the second backup beam link that needs to be switched to in the next frame according to a third formula, and the azimuth of the backup beam link when the second backup beam link is used as the current link, where the third formula is:

$$\begin{cases} \theta_{next} = \theta_{alter} + (\theta_{max\_power} - \theta_{curr}) \times F_R, F_{switch} = 1 \\ \theta_{next\_alter} = \theta_{curr} + (\theta_{max\_power} - \theta_{curr}) \times F_R, F_{switch} = 1 \end{cases}$$

where $\theta_{next}$ represents the azimuth of the second backup beam link to be switched to in the next frame, $\theta_{next\_alter}$ represents the azimuth of the backup beam link, $\theta_{curr}$ represents the azimuth of the optimal beam link, $\theta_{alter}$ alter represents an azimuth of the first backup beam link, $\theta_{max\_power}$ represents an azimuth of a maximum received energy beam link in the proximate selectable beam link of the current beam link, $F_{switch}$ represents a flag identity of whether to switch to a backup beam link, and $F_R$ represents an identity of whether an antenna is rotated.

In an eighteenth possible implementation manner, according to the sixteenth possible implementation manner, the calculating, in a case in which it is not necessary to switch to a backup beam link, an azimuth of a beam link of the next frame includes:

calculating the azimuth of the beam link of the next frame according to a fourth formula, where
the fourth formula is:

$$\begin{cases} \theta_{next} = \theta_{curr} + (\theta_{max\_power} - \theta_{curr}) \times F_R, F_{switch} = 0 \\ \theta_{next\_alter} = \theta_{alter} + (\theta_{max\_power} - \theta_{curr}) \times F_R, F_{switch} = 0 \end{cases}$$

where $\theta_{next}$ represents the azimuth of the beam link in a receiving and transmitting direction in the next frame, $\theta_{next\_alter}$ represents the azimuth of the backup beam link, $\theta_{curr}$ represents the azimuth of the optimal beam link, $\theta_{alter}$ represents an azimuth of the first backup beam link, $\theta_{max\_power}$ represents an azimuth of a maximum received energy beam link in the proximate selectable beam link of the current beam link, $F_{switch}$ represents an identity of whether to switch to a backup beam link, and $F_R$ represents an identity of whether an antenna is rotated.

According to a second aspect, the present invention provides a beam tracking method, including:

receiving, by a beam tracking responder, a beam tracking request transmitted by a beam tracking initiator;

transmitting, by the beam tracking responder, an enhanced beam tracking training auxiliary sequence to the beam tracking initiator according to the received beam tracking request, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link; and receiving, by the beam tracking responder, first link switching information transmitted by the beam tracking initiator, where the first link switching information is used to instruct the beam tracking initiator and the beam tracking responder to switch to a second backup beam link.

In a first possible implementation manner, according to the second aspect, the receiving, by a beam tracking responder, a beam tracking request transmitted by a beam tracking initiator includes:

if the current beam link via which the beam tracking initiator and the beam tracking responder perform communication is an optimal link after beamforming, and the beam tracking initiator detects that signal attenuation of the current beam link exceeds a preset threshold, receiving, by the beam tracking responder, the beam tracking request transmitted by the beam tracking initiator; or, if the current beam link via which the beam tracking initiator and the beam tracking responder perform communication is a second optimal link after beamforming, and the beam tracking initiator detects that an optimal link after beamforming is recovered, receiving, by the beam tracking responder, the beam tracking request transmitted by the beam tracking initiator.

In a second possible implementation manner, with reference to the second aspect or the first possible implementation manner, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

In a third possible implementation manner, with reference to the second aspect or the former two possible implementation manners, the transmitting, by the beam tracking responder, an enhanced beam tracking training auxiliary sequence to the beam tracking initiator includes:

transmitting, by the beam tracking responder, the beam tracking training auxiliary sequence unit of the current beam link to the beam tracking initiator by using the current beam link, transmitting the beam tracking training auxiliary sequence unit of the proximate selectable beam link of the current beam link to the beam tracking initiator by using the proximate selectable beam link of the current beam link, and transmitting the beam tracking training auxiliary sequence unit of the first backup beam link to the beam tracking initiator by using the first backup beam link.

In a fourth possible implementation manner, according to the second aspect, before the receiving, by a beam tracking responder, a beam tracking request transmitted by a beam tracking initiator, the method further includes:

receiving, by the beam tracking responder, enhanced beam tracking information transmitted by the beam tracking initiator, where the enhanced beam tracking information includes: information of the first backup beam link and an identity of requesting the beam tracking responder to transmit the enhanced beam tracking training auxiliary sequence; and transmitting, by the beam tracking responder, response information to the beam tracking initiator according to the received enhanced beam tracking information, where the response information is used to instruct the beam tracking responder whether to transmit the enhanced beam tracking training auxiliary sequence.

In a fifth possible implementation manner, according to the fourth possible implementation manner, the receiving, by the beam tracking responder, enhanced beam tracking information transmitted by the beam tracking initiator includes:

receiving, by the beam tracking responder, the enhanced beam tracking information transmitted by the beam tracking initiator in a sector-level sweep SLS phase; or, receiving, by the beam tracking responder, the enhanced beam tracking information transmitted by the beam tracking initiator in a beam refinement protocol BRP phase.

In a sixth possible implementation manner, with reference to the fourth or fifth possible implementation manner, the enhanced beam tracking information is in an enhanced beam tracking information unit of a media access control MAC layer;

the receiving, by the beam tracking responder, enhanced beam tracking information transmitted by the beam tracking initiator includes:

receiving, by the beam tracking responder, a sector sweep SSW frame or a sector sweep feedback SSW-feedback frame that is transmitted by the beam tracking initiator and that includes, in an SLS phase, the enhanced beam tracking information; or, receiving, by the beam tracking responder, a beam refinement protocol BRP frame that is transmitted by the beam tracking initiator and that includes, in a BRP phase, the enhanced beam tracking information; and the transmitting, by the beam tracking responder, response information to the beam tracking initiator according to the received enhanced beam tracking information includes:

transmitting, by the beam tracking responder according to the received enhanced beam tracking information, an SSW frame or an SSW-feedback carrying an enhanced beam tracking information unit of the response information; or, transmitting, by the beam tracking response initiator to the beam tracking initiator according to the received enhanced beam tracking information, a BRP frame carrying an enhanced beam tracking information unit of the responder.

In a seventh possible implementation manner, according to the sixth possible implementation manner, the enhanced beam tracking information unit includes:

an information element identity Element ID, used to represent an ID of a current information unit;

a length Length, used to represent a length of the current information unit;

a backup beam link antenna weight vector setting Backup AWV Setting, used to whether to update an antenna vector setting of a peer backup beam link;

a peer transmit-sector identity Peer Tx_Sector ID, used to represent whether a peer transmit-sector identity needs to be backed up;

a peer transmit-antenna identity Peer Tx_Antenna ID, used to represent whether a peer transmit-antenna identity needs to be backed up;

an enhanced beam tracking in receiver request E-BT-R Request, used to represent whether to request a peer to receive a training auxiliary sequence according to an enhanced beam tracking mode;

an enhanced beam tracking in receiver OK E-BR-R OK, used to represent whether itself receives a training auxiliary sequence of an enhanced beam tracking mode;

an enhanced beam tracking in transmitter request E-BT-T Request, used to represent whether to request a peer to transmit a training auxiliary sequence according to an enhanced beam tracking mode; and an enhanced beam tracking in transmitter OK E-BR-T OK, used to represent whether itself transmits a training auxiliary sequence of an enhanced beam tracking mode.

In an eighth possible implementation manner, according to the seventh possible implementation manner, the enhanced beam tracking information unit further includes: a switch to backup beam link identity Switch to Backup AWV, used to represent whether to switch to a backup beam link in a next frame and use an antenna configuration of the current beam link as an antenna configuration of the backup beam link in the next frame.

According to a third aspect, the present invention provides a beam tracking method, including:

transmitting, by a beam tracking initiator, a beam tracking request and an enhanced beam tracking training auxiliary sequence to a beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link;

receiving, by the beam tracking initiator, a reception detection result of the enhanced beam tracking training auxiliary sequence transmitted by the beam tracking responder; and when it is determined according to the received reception detection result of the enhanced beam tracking training auxiliary sequence transmitted by the beam tracking responder that it is necessary to switch to a backup beam link, transmitting, by the beam tracking initiator, first link switching information to the beam responder, where the first link switching information is used to instruct the beam tracking initiator and the beam tracking responder to switch to a second backup beam link.

In a first possible implementation manner, according to the third aspect, the transmitting, by a beam tracking initiator, a beam tracking request and an enhanced beam tracking training auxiliary sequence to a beam tracking responder includes:

if the current beam link via which the beam tracking initiator and the beam tracking responder perform communication is an optimal link after beamforming, and the beam tracking initiator detects that signal attenuation of the current beam link exceeds a preset threshold, transmitting, by the beam tracking initiator, the beam tracking request and the enhanced beam tracking training auxiliary sequence to the beam tracking responder; or, if the current beam link via which the beam tracking initiator and the beam tracking responder perform communication is a second optimal link after beamforming, and the beam tracking initiator detects that an optimal link after beamforming is recovered, transmitting, by the beam tracking initiator, the beam tracking request and the enhanced beam tracking training auxiliary sequence to the beam tracking responder.

In a second possible implementation manner, with reference to the third aspect or the first possible implementation manner, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

In a third possible implementation manner, with reference to the third aspect or the former two possible implementation manners, the transmitting, by a beam tracking initiator, an enhanced beam tracking training auxiliary sequence to a beam tracking responder includes:

transmitting, by the beam tracking initiator, the beam tracking training auxiliary sequence unit of the current beam link to the beam tracking responder by using the current beam link, transmitting the beam tracking training auxiliary sequence unit of the proximate selectable beam link of the current beam link to the beam tracking responder by using the proximate selectable beam link of the current beam link, and transmitting the beam tracking training auxiliary sequence unit of the first backup beam link to the beam tracking responder by using the first backup beam link.

In a fourth possible implementation manner, according to the third aspect, before the transmitting, by a beam tracking initiator, a beam tracking request and an enhanced beam tracking training auxiliary sequence to a beam tracking responder, the method further includes:

receiving, by the beam tracking initiator, enhanced beam tracking information transmitted by the beam tracking responder, where the enhanced beam tracking information includes: information of the first backup beam link and an identity of requesting the beam tracking initiator to transmit the enhanced beam tracking training auxiliary sequence; and transmitting, by the beam tracking initiator according to the received enhanced beam tracking information, response information to the beam tracking responder, where the response information is used to instruct the beam tracking initiator whether to transmit the enhanced beam tracking training auxiliary sequence.

In a fifth possible implementation manner, according to the fourth possible implementation manner, the receiving, by the beam tracking initiator, enhanced beam tracking information transmitted by the beam tracking responder includes:

receiving, by the beam tracking initiator, the enhanced beam tracking information transmitted by the beam tracking responder in a sector-level sweep SLS phase; or, receiving, by the beam tracking initiator, the enhanced beam tracking information transmitted by the beam tracking responder in a BRP phase.

In a sixth possible implementation manner, with reference to the fourth or fifth possible implementation manner, the enhanced beam tracking information is in an enhanced beam tracking information unit of a media access control MAC layer;

the receiving, by the beam tracking initiator, enhanced beam tracking information transmitted by the beam tracking responder includes:

receiving, by the beam tracking initiator, a sector sweep SSW frame or a sector sweep feedback SSW-feedback frame, including the enhanced beam tracking information unit, transmitted by the beam tracking responder in the SLS phase; or, receiving, by the beam tracking initiator, a beam refinement protocol BRP frame, including the enhanced beam tracking information unit, transmitted by the beam tracking responder in the BRP phase; and the transmitting, by the beam tracking initiator, response information to the beam tracking responder includes:

transmitting, by the beam tracking initiator to the beam tracking responder, an SSW frame or an SSW-feedback carrying an enhanced beam tracking information unit of the response information; or, transmitting, by the beam tracking initiator to the beam tracking responder, a BRP frame carrying an enhanced beam tracking information unit of the response information.

In a seventh possible implementation manner, according to the sixth possible implementation manner, the enhanced beam tracking information unit includes:

an information element identity Element ID, used to represent an ID of a current information unit;

a length Length, used to represent a length of the current information unit;

a backup beam link antenna weight vector setting Backup AWV Setting, used to whether to update an antenna vector setting of a peer backup beam link;

a peer transmit-sector identity Peer Tx_Sector ID, used to represent whether a peer transmit-sector identity needs to be backed up;

a peer transmit-antenna identity Peer Tx_Antenna ID, used to represent whether a peer transmit-antenna identity needs to be backed up;

an enhanced beam tracking in receiver request E-BT-R Request, used to represent whether to request a peer to receive a training auxiliary sequence according to an enhanced beam tracking mode;

an enhanced beam tracking in receiver OK E-BR-R OK, used to represent whether itself receives a training auxiliary sequence of an enhanced beam tracking mode;

an enhanced beam tracking in transmitter request E-BT-T Request, used to represent whether to request a peer to transmit a training auxiliary sequence according to an enhanced beam tracking mode; and an enhanced beam tracking in transmitter OK E-BR-T OK, used to represent whether itself transmits a training auxiliary sequence of an enhanced beam tracking mode.

In an eighth possible implementation manner, according to the seventh possible implementation manner, the transmitting, by the beam tracking initiator, first link switching information to the beam tracking responder includes:

transmitting, by the beam tracking initiator to the beam tracking responder, the first link switching information carried in a frame header of a physical layer frame.

In a ninth possible implementation manner, according to the seventh possible implementation manner, the enhanced beam tracking information unit further includes: a switch to backup beam link identity Switch to Backup AWV, used to represent whether to switch to a backup beam link in a next frame and use an antenna configuration of the current beam link as an antenna configuration of the backup beam link in the next frame;

the transmitting, by the beam tracking initiator, first link switching information to the beam tracking responder includes:

transmitting, by the beam tracking initiator to the beam tracking responder, a sector sweep SSW frame or a sector sweep feedback SSW-feedback frame carrying an enhanced beam tracking information unit of the first link switching information; or transmitting, by the beam tracking initiator to the beam tracking responder, a BRP frame carrying an enhanced beam tracking information unit of the first link switching information.

In an eleventh possible implementation manner, according to the third possible implementation manner, after the receiving, by the beam tracking initiator, a reception detection result of the enhanced beam tracking training auxiliary sequence transmitted by the beam tracking responder, and before the transmitting, by the beam tracking initiator, first link switching information to the beam responder, the method further includes: if the current beam link via which the beam tracking initiator and the beam tracking responder perform communication is an optimal link after beamforming or a proximate selectable beam link of the optimal link, determining whether it is necessary to switch to a backup beam link in a next frame; and in a case in which it is necessary to switch to a backup beam link, calculating an azimuth of the second backup beam link that needs to be switched to in the next frame, and an azimuth of a backup beam link when the second backup beam link is used as a current link.

In a tenth possible implementation manner, according to the tenth possible implementation manner, after the determining whether it is necessary to switch to a backup beam link in a next frame, the method further includes:

calculating, in a case in which it is not necessary to switch to a backup beam link, an azimuth of a beam link of the next frame.

In a twelfth possible implementation manner, with reference to the ninth, tenth or eleventh possible implementation manner, the determining whether it is necessary to switch to a backup beam link in a next frame includes:

calculating, according to the reception detection result of the enhanced beam tracking training auxiliary sequence and received signal energy of the optimal link, signal power attenuation caused by antenna rotation and signal power attenuation caused by a link blockage; and determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame.

In a thirteenth possible implementation manner, according to the twelfth possible implementation manner, the calculating an azimuth of the second backup beam link that needs to be switched to in the next frame, and an azimuth of a backup beam link when the second backup beam link is used as a current link includes:

calculating, according to a determining result of whether the antenna is rotated, a determining result of whether it is necessary to switch to a backup beam link in the next frame, an azimuth of the maximum received energy beam in the proximate selectable beam link of the current beam link, and an azimuth of an optimal beam link, the azimuth of the backup beam link, the azimuth of the second backup beam link that needs to be switched to in the next frame and the azimuth of the backup beam link when the second backup beam link is used as a current link.

In a fourteenth possible implementation manner, according to the thirteenth possible implementation manner, the reception detection result of the enhanced beam tracking training auxiliary sequence includes: an azimuth of a maximum received energy beam and maximum received signal energy in the current beam link and the proximate selectable beam link of the current beam link, received signal energy of the current beam link, and received signal energy of the backup beam link.

In a fifteenth possible implementation manner, according to the thirteenth possible implementation manner, the calculating, according to the reception detection result of the enhanced beam tracking training auxiliary sequence and received signal energy of the optimal link, signal power attenuation caused by antenna rotation and signal power attenuation caused by a link blockage includes:

calculating the signal attenuation of the current beam link according to a first formula; and calculating, by using the signal attenuation, of the current beam link, obtained through calculation according to the first formula, and according to a second formula, the signal power attenuation caused by antenna rotation and the signal power attenuation caused by a link blockage, where the first formula is:

$$\begin{cases} S_{curr}(t) = P_{optimal} - P_{curr}(t) \\ S_{max\_power}(t) = P_{optimal} - P_{max\_power}(t) \end{cases}$$

where $S_{curr}(t)$ represents the current beam link signal power attenuation, $S_{max\_power}(t)$ represents attenuation of maximum received signal energy in the proximate selectable beam link of the current beam link and received signal energy of an optimal beam link, $P_{optimal}$ represents the received signal energy of the optimal beam link, $P_{max\_power}$ represents the maximum received signal energy in the proximate selectable beam link of the current beam link, and $P_{curr}$ represents signal energy of the current beam link; and the second formula is:

$$\begin{bmatrix} S_{max\_power}(t) \\ S_{curr}(t) \end{bmatrix} = \begin{bmatrix} 0 & 1 \\ 1 & 1 \end{bmatrix} \begin{bmatrix} S_R(t) \\ S_B(t) \end{bmatrix}$$

where $S_R(t)$ represents the signal power attenuation caused by antenna rotation, $S_B(t)$ represents the signal power attenuation caused by link blockage, $S_{curr}(t)$ represents the signal attenuation of the current beam link, and $S_{max\_power}(t)$ represents the attenuation of the maximum received signal energy in the proximate selectable beam link of the current beam link and the received signal energy of the optimal beam link.

In a sixteenth possible implementation manner, according to the fifteenth possible implementation manner, the determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame includes:

if $S_R(t) > \Gamma_R$, determining that an antenna is rotated, and setting a flag bit to $F_R=1$, or otherwise $F_R=0$;

if $S_B(t) > \Gamma_B$ or $P_{curr\_alter} > P_{max\_power}$, determining that it is necessary to switch to a backup beam link in the next frame, and setting a flag bit to $F_{switch}=1$, or otherwise $F_{switch}=0$, where $\Gamma_R$ represents a threshold of signal power attenuation caused by antenna rotation, $\Gamma_B$ represents a threshold of signal power attenuation caused by link blockage, $S_R(t)$ represents the signal power attenuation caused by antenna rotation, $S_B(t)$ represents the signal power attenuation caused by link blockage, $F_{switch}$ represents an identity of whether to switch to a second backup link, and $\Gamma_R$ represents an identity of whether an antenna is rotated.

In a seventeenth possible implementation manner, according to the sixteenth possible implementation manner, the calculating, according to a determining result of whether the antenna is rotated, a determining result of whether it is necessary to switch to a backup beam link in the next frame, an azimuth of an optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link includes:

calculating, according to a third formula, the azimuth of the second backup beam link that needs to be switched to in the next frame and the azimuth of the backup beam link when the second backup beam link is used as a current link, where the third formula is:

$$\begin{cases} \theta_{next} = \theta_{alter} + (\theta_{max\_power} - \theta_{curr}) \times F_R, F_{switch} = 1 \\ \theta_{next\_alter} = \theta_{curr} + (\theta_{max\_power} - \theta_{curr}) \times F_R, F_{switch} = 1 \end{cases}$$

where $\theta_{next}$ represents the azimuth of the second backup beam link to be switched to in the next frame, $\theta_{next\_alter}$ represents the azimuth of the backup beam link, $\theta_{curr}$ represents the azimuth of the optimal beam link, $\theta_{alter}$ represents an azimuth of the first backup beam link, $\theta_{max\_power}$ represents an azimuth of a maximum received energy beam link in the proximate selectable beam link of the current beam link, $F_{switch}$ represents a flag identity of whether to switch to a backup beam link, and $F_R$ represents an identity of whether an antenna is rotated.

In a eighteenth possible implementation manner, according to the sixteenth possible implementation manner, the calculating, in a case in which it is not necessary to switch to a backup beam link, an azimuth of a beam link of the next frame includes:

calculating the azimuth of the beam link of the next frame according to a fourth formula;

the fourth formula is:

$$\begin{cases} \theta_{next} = \theta_{curr} + (\theta_{max\_power} - \theta_{curr}) \times F_R, \ F_{switch} = 0 \\ \theta_{next\_alter} = \theta_{alter} + (\theta_{max\_power} - \theta_{curr}) \times F_R, \ F_{switch} = 0 \end{cases}$$

where $\theta_{next}$ represents the azimuth of the second backup beam link to be switched to in the next frame, $\theta_{next\_alter}$ represents the azimuth of the backup beam link, $\theta_{curr}$ represents the azimuth of the optimal beam link, $\theta_{alter}$ represents an azimuth of the first backup beam link, $\theta_{max\_power}$ represents an azimuth of a maximum received energy beam link in the proximate selectable beam link of the current beam link, $F_{switch}$ represents an identity of whether to switch to a backup beam link, and $F_R$ represents an identity of whether an antenna is rotated.

According to a fourth aspect, the present invention provides a beam tracking method, including:

receiving, by a beam tracking responder, a beam tracking request and an enhanced beam tracking training auxiliary sequence that are transmitted by a beam tracking initiator, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link;

transmitting, by the beam tracking responder, a reception detection result of the enhanced beam tracking training auxiliary sequence to the beam tracking initiator according to the received beam tracking request and enhanced beam tracking training auxiliary sequence; and receiving, by the beam tracking responder, first link switching information transmitted by the beam tracking initiator, where the first link switching information is used to instruct the beam tracking initiator and the beam tracking responder to switch to a second backup beam link.

In a first possible implementation manner, according to the fourth aspect, the receiving, by a beam tracking responder, a beam tracking request and an enhanced beam tracking training auxiliary sequence that are transmitted by a beam tracking initiator includes:

if the current beam link via which the beam tracking initiator and the beam tracking responder perform communication is an optimal link after beamforming, and the beam tracking initiator detects that signal attenuation of the current beam link exceeds a preset threshold, receiving, by the beam tracking responder, the beam tracking request and the enhanced beam tracking training auxiliary sequence that are transmitted by the beam tracking initiator; or, if the current beam link via which the beam tracking initiator and the beam tracking responder perform communication is a second optimal link after beamforming, and the beam tracking initiator detects that an optimal link after beamforming is recovered, receiving, by the beam tracking responder, the beam tracking request and the enhanced beam tracking training auxiliary sequence that are transmitted by the beam tracking initiator.

In a second possible implementation manner, with reference to the fourth aspect or the first possible implementation manner, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

In a third possible implementation manner, with reference to the fourth aspect or the former two possible implementation manners, the receiving, by a beam tracking responder, an enhanced beam tracking training auxiliary sequence transmitted by a beam tracking initiator includes:

receiving, by the beam tracking responder, the beam tracking training auxiliary sequence unit, of the current beam link, transmitted by using the current beam link by the beam tracking initiator, receiving the beam tracking training auxiliary sequence unit, of the proximate selectable beam link of the current beam link, transmitted by using the proximate selectable beam link of the current beam link by the beam tracking initiator, and receiving the beam tracking training auxiliary sequence unit, of the first backup beam link, transmitted by using the first backup beam link by the beam tracking initiator.

In a fourth possible implementation manner, according to the fourth aspect, before the receiving, by a beam tracking responder, a beam tracking request and an enhanced beam tracking training auxiliary sequence that are transmitted by a beam tracking initiator, the method further includes:

transmitting, by the beam tracking responder, enhanced beam tracking information to the beam tracking initiator, where the enhanced beam tracking information includes: information of the first backup beam link and an identity of requesting the beam tracking initiator to transmit the enhanced beam tracking training auxiliary sequence; and receiving, by the beam tracking responder, response information transmitted by the beam tracking initiator, where the response information is used to instruct the beam tracking initiator whether to transmit the enhanced beam tracking training auxiliary sequence.

In a fifth possible implementation manner, according to the fourth possible implementation manner, the transmitting, by the beam tracking responder, enhanced beam tracking information to the beam tracking initiator includes:

transmitting, by the beam tracking responder, the enhanced beam tracking information to the beam tracking initiator in a sector-level sweep SLS phase; or, transmitting, by the beam tracking responder, the enhanced beam tracking information to the beam tracking initiator in a beam refinement protocol BRP phase.

In a sixth possible implementation manner, according to the fifth possible implementation manner, the enhanced beam tracking information is in an enhanced beam tracking information unit of a media access control MAC layer;

the transmitting, by the beam tracking responder, enhanced beam tracking information to the beam tracking initiator includes:

transmitting, by the beam tracking responder to the beam tracking initiator, a sector sweep SSW frame or a sector sweep feedback SSW-feedback frame including, in the SLS phase, the enhanced beam tracking information unit; or, transmitting, by the beam tracking responder to the beam tracking initiator, a beam refinement protocol BRP frame including, in the BRP phase, the enhanced beam tracking information unit; and the receiving, by the beam tracking responder, response information transmitted by the beam tracking initiator includes:

receiving, by the beam tracking responder, an SSW frame or an SSW-feedback that is transmitted by the beam tracking initiator and that carries, in an SLS phase, an enhanced beam tracking information unit of the response information; or, receiving, by the beam tracking responder, a BRP frame that is transmitted by the beam tracking initiator and that carries, in a BRP phase, an enhanced beam tracking information unit of the response information.

In a seventh possible implementation manner, according to the sixth possible implementation manner, the enhanced beam tracking information unit includes:

an information element identity Element ID, used to represent an ID of a current information unit;

a length Length, used to represent a length of the current information unit;

a backup beam link antenna weight vector setting Backup AWV Setting, used to whether to update an antenna vector setting of a peer backup beam link;

a peer transmit-sector identity Peer Tx_Sector ID, used to represent whether a peer trans sector identity needs to be backed up;

a peer transmit-antenna identity Peer Tx_Antenna ID, used to represent whether a peer transmit-antenna identity needs to be backed up;

an enhanced beam tracking in receiver request E-BT-R Request, used to represent whether to request a peer to receive a training auxiliary sequence according to an enhanced beam tracking mode;

an enhanced beam tracking in receiver OK E-BR-R OK, used to represent whether itself receives a training auxiliary sequence of an enhanced beam tracking mode;

an enhanced beam tracking in transmitter request E-BT-T Request, used to represent whether to request a peer to transmit a training auxiliary sequence according to an enhanced beam tracking mode; and an enhanced beam tracking in transmitter OK E-BR-T OK, used to represent whether itself transmits a training auxiliary sequence of an enhanced beam tracking mode.

In an eighth possible implementation manner, according to the seventh possible implementation manner, the enhanced beam tracking information unit further includes: a switch to backup beam link identity Switch to Backup AWV, used to represent whether to switch to a backup beam link in a next frame and use an antenna configuration of the current beam link as an antenna configuration of the backup beam link in the next frame.

According to a fifth aspect, the present invention provides a beam tracking device, including:

a transmission module, configured to transmit a beam tracking request to a beam tracking responder; and a receiving module, configured to receive an enhanced beam tracking training auxiliary sequence transmitted, according to the enhanced beam tracking request, by the beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link, where the transmission module is further configured to: when it is determined according to a reception detection result of the enhanced beam tracking training auxiliary sequence that it is necessary to switch to a backup beam link, transmit first link switching information to the beam tracking responder, where the first link switching information is used to instruct a beam tracking initiator and the beam tracking responder to switch to a second backup beam link.

In a first possible implementation manner, according to the fifth aspect, the transmission module is specifically configured to: if the current beam link via which the beam tracking initiator and the beam tracking responder perform communication is an optimal link after beamforming, and the beam tracking initiator detects that signal attenuation of the current beam link exceeds a preset threshold, transmit the beam tracking request to the beam tracking responder; or, if the current beam link via which the beam tracking initiator and the beam tracking responder perform communication is a second optimal link after beamforming, and the beam tracking initiator detects that an optimal link after beamforming is recovered, transmit the beam tracking request to the beam tracking responder.

In a second possible implementation manner, with reference to the fifth aspect or the first possible implementation manner, the receiving module is specifically configured to receive the beam tracking training auxiliary sequence unit, of the current beam link, transmitted by using the current beam link by the beam tracking responder, the beam tracking training auxiliary sequence unit, of the proximate selectable beam link of the current beam link, transmitted by using the proximate selectable beam link of the current beam link, and the beam tracking training auxiliary sequence unit, of the first backup beam link, transmitted by using the first backup beam link.

In a third possible implementation manner, with reference to the fifth aspect or the former two possible implementation manners, the transmission module is further configured to: before the beam tracking request is transmitted to the beam tracking responder, transmit enhanced beam tracking information to the beam tracking responder, where the enhanced beam tracking information includes: information of the first backup beam link and an identity of requesting the beam tracking responder to transmit the enhanced beam tracking training auxiliary sequence; and the receiving module is further configured to receive response information transmitted by the beam tracking responder, where the response information is used to instruct the beam tracking responder whether to transmit the enhanced beam tracking training auxiliary sequence.

In a fourth possible implementation manner, with reference to the fifth aspect or the former three possible implementation manners, the device further includes: a determining module and a calculation module, where if the current beam link via which the beam tracking initiator and the beam tracking responder perform communication is an optimal link after beamforming or a proximate selectable beam link of the optimal link, the determining module is configured to determine whether it is necessary to switch to a backup beam link in a next frame; and the calculation module is configured to: in a case in which the determining module determines that it is necessary to switch to a backup beam link, calculate an azimuth of the second backup beam link that needs to be switched to in the next frame, and an azimuth of a backup beam link when the second backup beam link is used as a current link.

In a fifth possible implementation manner, according to the fourth possible implementation manner, the calculation module is further configured to: in a case in which the determining module determines that it is not necessary to switch to a backup beam link, calculate an azimuth of a beam link of the next frame.

In a sixth possible implementation manner, according to the fourth possible implementation manner, the determining module includes:

a pilot detection and estimation unit, configured to perform pilot detection and estimation separately on the current beam link, the proximate selectable beam link of the current beam link, and the first backup beam link, to obtain the reception detection result of the enhanced beam tracking training auxiliary sequence;

an attenuation calculation unit, configured to calculate, according to the reception detection result of the enhanced beam tracking training auxiliary sequence and received signal energy of the optimal link, signal power attenuation caused by antenna rotation and signal power attenuation caused by a link blockage; and a determining unit, configured to determine whether an antenna is rotated according to the signal power attenuation caused by antenna rotation and a rotation attenuation threshold, and determine, according to the signal power attenuation caused by a link blockage and a blockage threshold, whether it is necessary to switch to a backup beam link in the next frame.

In a seventh possible implementation manner, with reference to the fourth or fifth possible implementation manner, the calculation module is specifically configured to calculate, according to a determining result in the determining unit of whether the antenna is rotated, a determining result of whether it is necessary to switch to a backup beam link in the next frame, an azimuth of an optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link.

According to a sixth aspect, the present invention provides a beam tracking device, including:

a receiving module, configured to receive a beam tracking request transmitted by a beam tracking initiator; and a transmission module, configured to transmit an enhanced beam tracking training auxiliary sequence to the beam tracking initiator according to the received beam tracking request, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link, where the receiving module is further configured to receive first link switching information transmitted by the beam tracking initiator, where the first link switching information is used to instruct the beam tracking initiator and a beam tracking responder to switch to a second backup beam link.

In a first possible implementation manner, according to the sixth aspect, the receiving module is specifically configured to: if the current beam link via which the beam tracking initiator and the beam tracking responder perform communication is an optimal link after beamforming, and the beam tracking initiator detects that signal attenuation of the current beam link exceeds a preset threshold, receive the beam tracking request transmitted by the beam tracking initiator; or, if the current beam link via which the beam tracking initiator and the beam tracking responder perform communication is a second optimal link after beamforming, and the beam tracking initiator detects that an optimal link after beamforming is recovered, receive the beam tracking request transmitted by the beam tracking initiator.

In a second possible implementation manner, with reference to the sixth aspect or the first possible implementation manner, the transmission module is specifically configured to transmit the beam tracking training auxiliary sequence unit of the current beam link to the beam tracking initiator by using the current beam link, transmit the beam tracking training auxiliary sequence unit of the proximate selectable beam link of the current beam link to the beam tracking initiator by using the proximate selectable beam link of the current beam link, and transmit the beam tracking training auxiliary sequence unit of the first backup beam link to the beam tracking initiator by using the first backup beam link.

In a third possible implementation manner, with reference to the sixth aspect or the former two possible implementation manners, the receiving module is further configured to: before the beam tracking request transmitted by the beam tracking initiator is received, receive enhanced beam tracking information transmitted by the beam tracking initiator, where the enhanced beam tracking information includes: information of the first backup beam link and an identity of requesting the beam tracking responder to transmit the enhanced beam tracking training auxiliary sequence; and the transmission module is further configured to transmit response information to the beam tracking initiator according to the received enhanced beam tracking information, where the response information is used to instruct the beam tracking responder whether to transmit the enhanced beam tracking training auxiliary sequence.

According to a seventh aspect, the present invention provides a beam tracking device, including:

a transmission module, configured to transmit a beam tracking request and an enhanced beam tracking training auxiliary sequence to a beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link; and a receiving module, configured to receive a reception detection result of the enhanced beam tracking training auxiliary sequence transmitted by the beam tracking responder, where the transmission module is further configured to: when it is determined according to received beam link information that is transmitted by the beam tracking responder and that is obtained through measurement of current beam tracking that it is necessary to switch to a backup link, transmit first link switching information to the beam responder, where the first link switching information is used to instruct the beam tracking initiator and a beam tracking responder to switch to a second backup beam link.

In a first possible implementation manner, according to the seventh aspect, the transmission module is specifically configured to: if the current beam link via which the beam tracking initiator and the beam tracking responder perform communication is an optimal link after beamforming, and the beam tracking initiator detects that signal attenuation of the current beam link exceeds a preset threshold, transmit the beam tracking request and the enhanced beam tracking training auxiliary sequence to the beam tracking responder; or, if the current beam link via which the beam tracking initiator and the beam tracking responder perform communication is a second optimal link after beamforming, and the beam tracking initiator detects that an optimal link after beamforming is recovered, transmit the beam tracking request and the enhanced beam tracking training auxiliary sequence to the beam tracking responder.

In a second possible implementation manner, with reference to the seventh aspect or the first possible implementation manner, the transmission module is specifically configured to transmit the beam tracking training auxiliary sequence unit of the current beam link to the beam tracking responder by using the current beam link, transmit the beam tracking training auxiliary sequence unit of the proximate selectable beam link of the current beam link to the beam tracking responder by using the proximate selectable beam link of the current beam link, and transmit the beam tracking training auxiliary sequence unit of the first backup beam link to the beam tracking responder by using the first backup beam link.

In a third possible implementation manner, with reference to the seventh aspect or the former two possible implementation manners, the receiving module is further configured to: before the beam tracking request and the enhanced beam tracking training auxiliary sequence are transmitted to the beam tracking responder, receive enhanced beam tracking information transmitted by the beam tracking responder, where the enhanced beam tracking information includes: information of the first backup beam link and an identity of requesting the beam tracking initiator to transmit the enhanced beam tracking training auxiliary sequence; and the transmission module is further configured to transmit response information to the beam tracking responder according to the received enhanced beam tracking information, where the response information is used to instruct the beam tracking initiator whether to transmit the enhanced beam tracking training auxiliary sequence.

In a fourth possible implementation manner, according to the seventh aspect or the former three possible implementation manners, the device further includes: a determining module and a calculation module, where if the current beam link via which the beam tracking initiator and the beam tracking responder perform communication is an optimal link after beamforming or a proximate selectable beam link of the optimal link, the determining module is configured to determine whether it is necessary to switch to a backup beam link in a next frame; and the calculation module is configured to: in a case in which the determining module determines that it is necessary to switch to a backup beam link, calculate an azimuth of a second backup beam link that needs to be switched to in the next frame, and an azimuth of a backup beam link when the second backup beam link is used as a current link.

In a fifth possible implementation manner, according to the fourth possible implementation manner, the calculation module is further configured to: in a case in which the determining module determines that it is not necessary to switch to a backup beam link, calculate an azimuth of a beam link of the next frame.

In a sixth possible implementation manner, with reference to the fourth or fifth possible implementation manner, the determining module includes: an attenuation calculation unit and a determining unit, where the attenuation calculation unit is configured to calculate, according to the reception detection result of the enhanced beam tracking training auxiliary sequence and received signal energy of the optimal link, signal power attenuation caused by antenna rotation and signal power attenuation caused by a link blockage; and the determining unit is configured to determine whether an antenna is rotated according to the signal power attenuation caused by antenna rotation and a rotation attenuation threshold, and determine, according to the signal power attenuation caused by a link blockage and a blockage threshold, whether it is necessary to switch to a backup beam link in the next frame.

In a seventh possible implementation manner, with reference to the fourth, fifth or sixth possible implementation manner, the calculation module is specifically configured to calculate, according to a determining result of whether the antenna is rotated, a determining result of whether it is necessary to switch to a backup beam link in the next frame, an azimuth of an optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link.

According to an eighth aspect, the present invention provides a beam tracking device, including:

a receiving module, configured to receive a beam tracking request and an enhanced beam tracking training auxiliary sequence that are transmitted by a beam tracking initiator, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link; and a transmission module, configured to transmit a reception detection result of the enhanced beam tracking training auxiliary sequence to the beam tracking initiator according to the received beam tracking request and enhanced beam tracking training auxiliary sequence, where the receiving module is further configured to receive first link switching information transmitted by the beam tracking initiator, where the first link switching information is used to instruct the beam tracking initiator and a beam tracking responder to switch to a second backup beam link.

In a first possible implementation manner, according to the eighth aspect, the receiving module is specifically configured to: if the current beam link via which the beam tracking initiator and the beam tracking responder perform communication is an optimal link after beamforming, and the beam tracking initiator detects that signal attenuation of the current beam link exceeds a preset threshold, receive the beam tracking request and the enhanced beam tracking training auxiliary sequence that are transmitted by the beam tracking initiator; or, if the current beam link via which the beam tracking initiator and the beam tracking responder perform communication is a second optimal link after beamforming, and the beam tracking initiator detects that an optimal link after beamforming is recovered, receive the beam tracking request and the enhanced beam tracking training auxiliary sequence that are transmitted by the beam tracking initiator.

In a second possible implementation manner, with reference to the eighth aspect or the first possible implementation manner, the receiving module is specifically configured to receive the beam tracking training auxiliary sequence unit, of the current beam link, transmitted by using the current beam link by the beam tracking initiator, receive the beam tracking training auxiliary sequence unit, of the proximate selectable beam link of the current beam link, transmitted by using the proximate selectable beam link of the current beam link by the beam tracking initiator, and receive the beam tracking training auxiliary sequence unit, of the first backup beam link, transmitted by using the first backup beam link by the beam tracking initiator.

In a third possible implementation manner, with reference to the eighth aspect or the former two possible implementation manners, the transmission module is further configured to: before the receiving module receives the beam tracking request and the enhanced beam tracking training auxiliary sequence that are transmitted by the beam tracking initiator, transmit enhanced beam tracking information to the beam tracking initiator, where the enhanced beam tracking information includes: information of the first backup beam link and an identity of requesting the beam tracking initiator to transmit the enhanced beam tracking training auxiliary sequence; and the receiving module is further configured to receive response information transmitted by the beam tracking initiator, where the response information is used to instruct the beam tracking initiator whether to transmit the enhanced beam tracking training auxiliary sequence.

According to a ninth aspect, the present invention provides a beam tracking system, including: the beam tracking device according to the fifth aspect above or any one of the possible implementation manners of the fifth aspect, and the beam tracking device according to the sixth aspect above or any one of the possible implementation manners of the sixth aspect; or, the beam tracking device according to the seventh aspect above or any one of the possible implementation manners of the seventh aspect, and the beam tracking device according to the eighth aspect above or any one of the possible implementation manners of the eighth aspect.

By means of the beam tracking method, apparatus, and system provided in the embodiments of the present invention, in a process of beam tracking, at the same time when a proximate beam link of a current link is being detected, detection is performed on a preset backup beam link, and when more desirable communication quality can be obtained on the backup beam link, information about switching to a backup link is carried in a MAC frame or a frame header of a physical layer frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 4 is a schematic diagram of an enhanced beam tracking information unit according to the present invention;

FIG. 5 is a schematic diagram of another enhanced beam tracking information unit according to the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
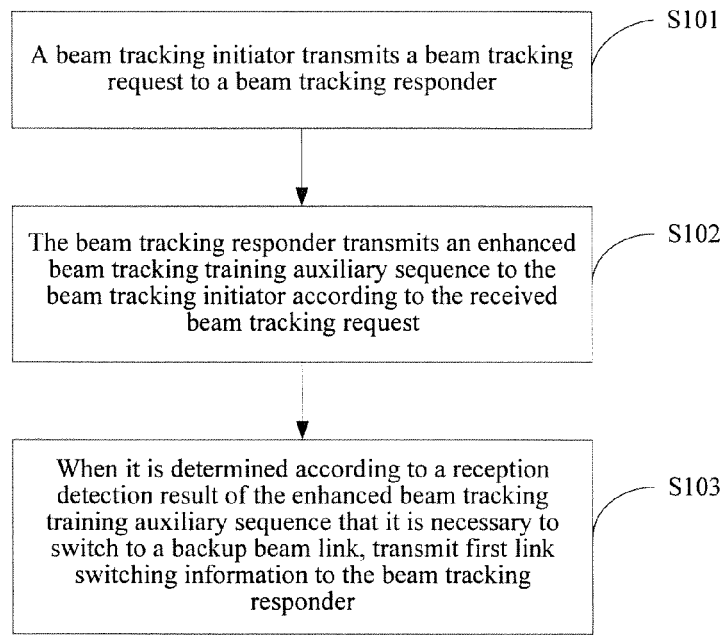
FIG. 1 is a schematic diagram of a beam tracking method according to the present invention.

The present invention provides a beam tracking method, which, as shown in FIG. 1, specifically includes:

S101: A beam tracking initiator transmits a beam tracking request to a beam tracking responder.

Correspondingly, the beam tracking responder receives the beam tracking request transmitted by the beam tracking initiator.

The transmitting, by a beam tracking initiator, a beam tracking request to a beam tracking responder includes:

if a current beam link via which the beam tracking initiator and the beam tracking responder perform communication is an optimal link after beamforming, and the beam tracking initiator detects that signal attenuation of the current beam link exceeds a preset threshold, transmitting, by the beam tracking initiator, the beam tracking request to the beam tracking responder; or, if a current beam link via which the beam tracking initiator and the beam tracking responder perform communication is a second optimal link after beamforming, and the beam tracking initiator detects that an optimal link after beamforming is recovered, transmitting, by the beam tracking initiator, the beam tracking request to the beam tracking responder.

Specifically, after beamforming training, an optimal beam link and a second optimal beam link are generated between the beam tracking initiator and the beam tracking responder, and the second optimal beam link is set as a backup beam link.

Optionally, when the optimal link is blocked and is switched to a backup link, it may be detected by using an adaptive intermittent detection policy whether the optimal link is recovered. Specifically, detection on the optimal link may be started once at an interval of a particular delay $\Delta t$, where $\Delta t$ conforms to an exponential distribution with a base of 2 during (0-T), and when it is detected that the optimal link is not recovered, $T=T+\Delta T$ and $T \leq T_{max}$, where $\Delta t$ represents an increment of detecting that the optimal link is not recovered, and $T_{max}$ represents an upper limit of an adaptive inteimittent detection. Certainly, a detection policy for switching from a second optimal link to the optimal link is not limited to the method described above.

Figure 2:
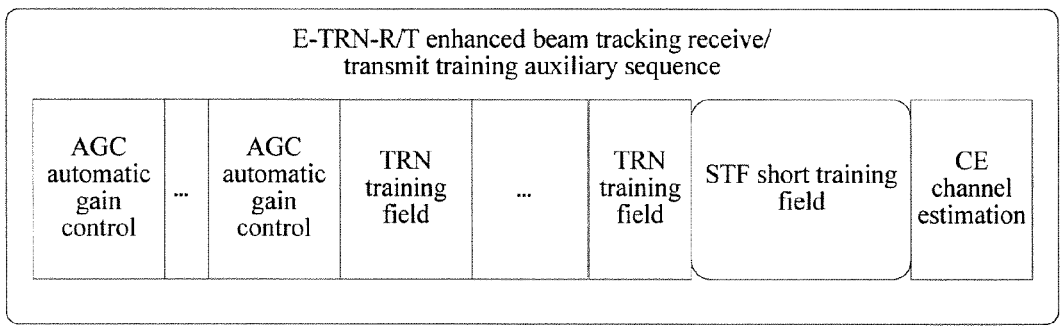
FIG. 2 is a schematic diagram of an enhanced beam tracking sequence according to the present invention.

Specifically, as shown in FIG. 2, a beam tracking training auxiliary sequence unit of the current beam link includes: an automatic gain control AGC field and a training sequence TRN field of the current beam link;

a beam tracking training auxiliary sequence unit of a proximate selectable beam link of the current beam link includes: an AGC field and a TRN field of the proximate selectable beam link of the current beam link; and a beam tracking training auxiliary sequence unit of a first backup beam link includes: a short training sequence STF field and a channel estimation CE field of the first backup beam link.

Furthermore, the receiving, by the beam tracking initiator, an enhanced beam tracking training auxiliary sequence transmitted, according to the enhanced beam tracking request, by the beam tracking responder includes:

receiving, by the beam tracking initiator, the beam tracking training auxiliary sequence unit, of the current beam link, transmitted by using the current beam link by the beam tracking responder, receiving, by the beam tracking responder, the beam tracking training auxiliary sequence unit, of the proximate selectable beam link of the current beam link, transmitted by using the proximate selectable beam link of the current beam link, and receiving, by the beam tracking responder, the beam tracking training auxiliary sequence unit, of the first backup beam link, transmitted by using the first backup beam link.

S102: The beam tracking responder transmits an enhanced beam tracking training auxiliary sequence to the beam tracking initiator according to the received beam tracking request.

Correspondingly, the beam tracking initiator receives the enhanced beam tracking training auxiliary sequence transmitted, according to the enhanced beam tracking request, by the beam tracking responder.

The enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link.

Specifically, the beam tracking responder transmits the beam tracking training auxiliary sequence unit of the current beam link to the beam tracking initiator by using the current beam link, the beam tracking responder transmits the beam tracking training auxiliary sequence unit of the proximate selectable beam link of the current beam link to the beam tracking initiator by using the proximate selectable beam link of the current beam link, and the beam tracking responder transmits the beam tracking training auxiliary sequence unit of the first backup beam link to the beam tracking initiator by using the first backup beam link.

S103: When it is determined according to a reception detection result of the enhanced beam tracking training auxiliary sequence that it is necessary to switch to a backup beam link, transmit first link switching information to the beam tracking responder.

Correspondingly, the beam tracking responder receives the first link switching information transmitted by the beam tracking initiator.

The first link switching information is used to instruct the beam tracking initiator and the beam tracking responder to switch to a second backup beam link.

Figure 3:
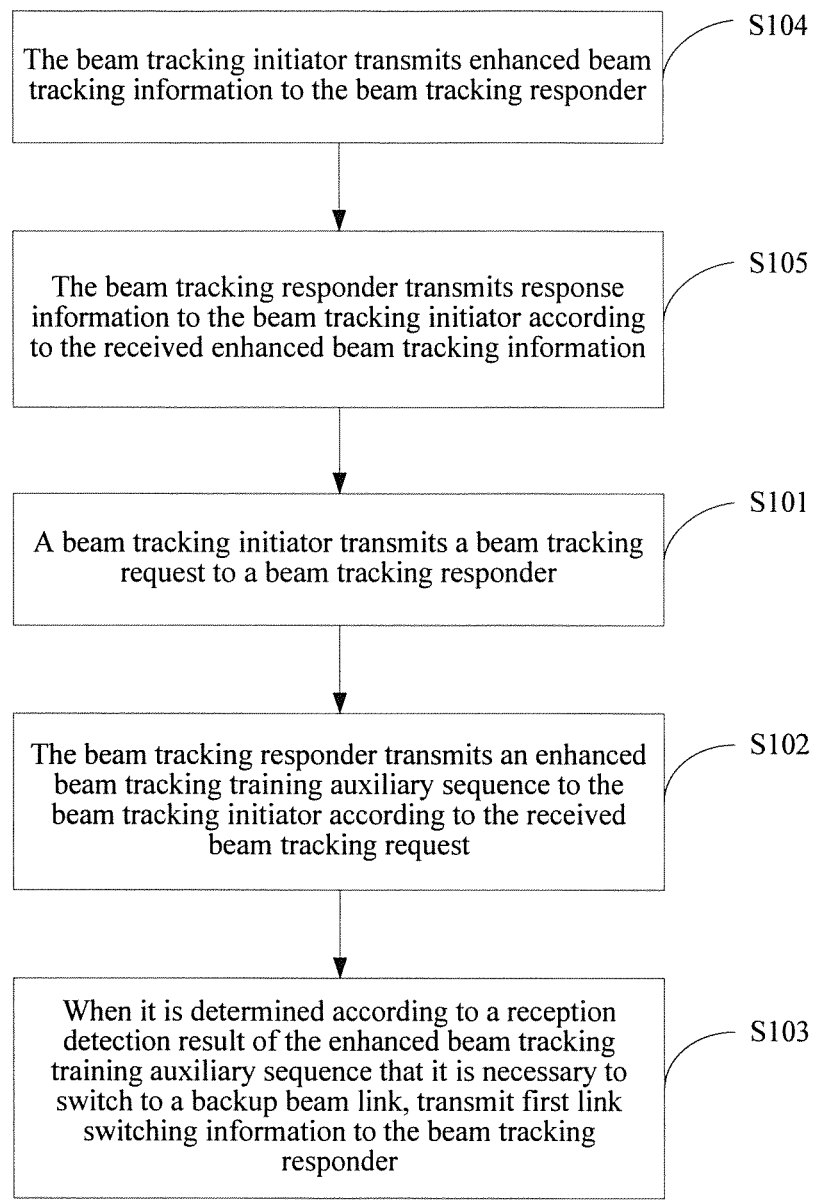
FIG. 3 is a schematic diagram of another beam tracking method according to the present invention.

Furthermore, as shown in FIG. 3, before step S101, the method further includes:

S104: The beam tracking initiator transmits enhanced beam tracking information to the beam tracking responder.

Correspondingly, the beam tracking responder receives the enhanced beam tracking information transmitted by the beam tracking initiator.

The enhanced beam tracking information includes: information about a first backup beam link and an identity of requesting the beam tracking responder to transmit the enhanced beam tracking training auxiliary sequence.

Optionally, the beam tracking responder receives the enhanced beam tracking information transmitted by the beam tracking initiator after a sector-level sweep (Sector-level Sweep, SLS for short).

Alternatively, optionally, the beam tracking responder receives the enhanced beam tracking information transmitted by the beam tracking initiator in a beam refinement protocol (beam refinement protocol, BRP for short) phase.

S105: The beam tracking responder transmits response information to the beam tracking initiator according to the received enhanced beam tracking information.

Correspondingly, the beam tracking initiator receives the response information transmitted by the beam tracking responder.

The response information is used to instruct the beam tracking responder whether to transmit the enhanced beam tracking training auxiliary sequence.

Specifically, the enhanced beam tracking information is in an enhanced beam tracking information unit of a media access control MAC layer. As shown in FIG. 4, the enhanced beam tracking information unit includes:

an information element identity (Element Identity, Element ID for short), used to represent an ID of a current information unit;

a length (Length), used to represent a length of the current information unit;

a backup antenna weight vector setting (Backup Antenna Weight Vector Setting, Backup AWV Setting for short), used to whether to update an antenna vector setting of a peer backup beam link, where specifically, if Backup AWV Setting=00, it represents that it is not to update an antenna weight vector of a backup beam link; if Backup AWV Setting=01, it represents that it is to specify an antenna weight vector of a peer backup beam link according to Peer Tx_Sector ID and Peer Tx_Antenna ID; if Backup AWV Setting=10, it represents that a receive antenna configuration of a peer backup beam link of a current transmit frame is used as a receive antenna weight vector of a peer backup; and if Backup AWV Setting=11, it represents that a beam link antenna configuration of a previous peer transmit frame is used as a transmit-antenna weight vector of a peer backup beam link;

a peer transmit-sector identity (Peer Transmit-Sector Identity, Peer Tx_Sector ID for short), used to represent whether a peer transmit-sector identity needs to be backed up;

a peer transmit-antenna identity (Peer Transmit-Antenna Identity, Peer Tx_Antenna ID for short), used to represent a peer transmit-antenna identity needs to be backed up;

an enhanced beam tracking in receiver request (Enhanced Beam Tracking in Receiver Request, E-BT-R Request for short), used to represent whether to request a peer to receive a training auxiliary sequence according to an enhanced beam tracking mode;

an enhanced beam tracking in receiver OK (Enhanced Beam Tracking in Receiver OK, E-BR-R OK for short), used to represent whether itself receives a training auxiliary sequence of an enhanced beam tracking mode;

an enhanced beam tracking in transmitter request (Enhanced Beam Tracking in Transmitter Request, E-BT-T Request for short), used to represent whether to request a peer to transmit a training auxiliary sequence according to an enhanced beam tracking mode; and an enhanced beam tracking in transmitter OK (Enhanced Beam Tracking in Transmitter OK, E-BR-T OK for short), used to represent whether itself transmits a training auxiliary sequence of an enhanced beam tracking mode.

In FIG. 4, B0 to B7 represent a $0^{th}$ bit to a $7^{th}$ bit, that is, an Element ID occupies 8 bits; B8 to B15 represent an $8^{th}$ bit to a $15^{th}$ bit, that is, a Length occupies 8 bits; B16 and B17 represent a $16^{th}$ bit and a $17^{th}$ bit, that is, a Backup AWV Setting occupies 2 bits; B18 to B23 represent an $18^{th}$ bit to a $23^{rd}$ bit, that is, a Peer Tx_Sector ID occupies 6 bits; B24 and B25 represent a $24^{th}$ bit to a $25^{th}$ bit, that is, a Peer Tx_Antenna ID occupies 2 bits; and the like.

Furthermore, as shown in FIG. 5, the enhanced beam tracking information unit further includes, in addition to what is shown in FIG. 4, a Switch to Backup Link identity (Switch to Backup AWV), used to represent whether to switch to a backup beam link in a next frame and use an antenna configuration of a current beam link as an antenna configuration of the backup beam link in the next frame, and represented by using a $30^{th}$ bit.

If the enhanced beam tracking information unit is shown in FIG. 4, the transmitting first link switching information to the beam tracking responder includes:

transmitting, by the beam tracking initiator to the beam tracking responder, the first link switching information carried in a frame header of a physical layer frame.

If the enhanced beam tracking information unit is shown in FIG. 5, the transmitting, by the beam tracking initiator, first link switching information to the beam tracking responder includes:

transmitting, by the beam tracking initiator to the beam tracking responder, a sector sweep (Sector Sweep, for short SSW) frame or a sector sweep feedback (Sector Sweep feedback, SSW-feedback for short) frame carrying an enhanced beam tracking information unit of the first link switching information; or, transmitting, by the beam tracking initiator to the beam tracking responder, a BRP frame carrying an enhanced beam tracking information unit of the first link switching information.

Furthermore, after step S102, and before step S103, the method further includes: if the current beam link via which the beam tracking initiator and the beam tracking responder perform communication is an optimal link after beamforming or a proximate selectable beam link of the optimal link, determining whether it is necessary to switch to a backup beam link in a next frame; and in a case in which it is necessary to switch to a backup beam link, calculating an azimuth of the second backup beam link that needs to be switched to in the next frame, and an azimuth of a backup beam link when the second backup beam link is used as a current link.

Specifically, the determining whether it is necessary to switch to a backup beam link in a next frame includes:

performing pilot detection and estimation separately on the current beam link, the proximate selectable beam link of the current beam link, and the first backup beam link, to obtain the reception detection result of the enhanced beam tracking training auxiliary sequence;

calculating, according to the reception detection result of the enhanced beam tracking training auxiliary sequence and received signal energy of the optimal link, signal power attenuation caused by antenna rotation and signal power attenuation caused by a link blockage; and determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame.

The reception detection result of the enhanced beam tracking training auxiliary sequence includes:

an azimuth of a maximum received energy beam and maximum received signal energy in the current beam link and the proximate selectable beam link of the current beam link, received signal energy of the current beam link, and received signal energy of the backup beam link.

Specifically, the calculating, according to the reception detection result of the enhanced beam tracking training auxiliary sequence and received signal energy of the optimal link, signal power attenuation caused by antenna rotation and signal power attenuation caused by a link blockage includes:

calculating the signal attenuation of the current beam link according to a first formula; and calculating, by using the signal attenuation, of the current beam link, obtained through calculation according to the first formula, and according to a second formula, the signal power attenuation caused by antenna rotation and the signal power attenuation caused by a link blockage, where the first formula is:

$$\begin{cases} S_{curr}(t) = P_{optimal} - P_{curr}(t) \\ S_{max\_power}(t) = P_{optimal} - P_{max\_power}(t) \end{cases}$$

where $S_{curr}(t)$ represents the current beam link signal power attenuation, $S_{max\_power}(t)$ represents attenuation of maximum received signal energy in the current beam link and the proximate selectable beam link of the current beam link and received signal energy of an optimal beam link, $P_{optimal}$ represents the received signal energy of the optimal beam link, $P_{max\_power}$ represents the maximum received signal energy in the current beam link and the proximate selectable beam link of the current beam link, and $P_{curr}$ represents signal energy of the current beam link; and the second formula is:

$$\begin{bmatrix} S_{max\_power}(t) \\ S_{curr}(t) \end{bmatrix} = \begin{bmatrix} 0 & 1 \\ 1 & 1 \end{bmatrix} \begin{bmatrix} S_R(t) \\ S_B(t) \end{bmatrix};$$

where $S_R(t)$ represents the signal power attenuation caused by antenna rotation, $S_B(t)$ represents the signal power attenuation caused by link blockage, $S_{curr}(t)$ represents the signal attenuation of the current beam link, and $S_{max\_power}(t)$ represents the attenuation of the maximum received signal energy in the current beam link and the proximate selectable beam link of the current beam link and the received signal energy of the optimal beam link.

Specifically, the determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame includes:

if $S_R(t) > \Gamma_R$, determining that an antenna is rotated, and setting a flag bit to $F_R=1$, or otherwise $F_R=0$;

if $S_B(t) > \Gamma_B$ or $P_{curr\_alter} > P_{max\_power}$, determining that it is necessary to switch to a backup beam link in the next frame, and setting a flag bit to $F_{switch}=1$, or otherwise $F_{switch}=0$, where $\Gamma_B$ represents a threshold of signal power attenuation caused by antenna rotation, $\Gamma_B$ represents a threshold of signal power attenuation caused by link blockage, $S_R(t)$ represents the signal power attenuation caused by antenna rotation, $S_B(t)$ represents the signal power attenuation caused by link blockage, $F_{switch}$ represents an identity of whether to switch to a second backup link, and $F_R$ represents an identity of whether an antenna is rotated.

Specifically, the calculating, according to a determining result of whether the antenna is rotated, a determining result of whether it is necessary to switch to a backup beam link in the next frame, an azimuth of the optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link includes:

calculating, according to a third formula, the azimuth of the second backup beam link that needs to be switched to in the next frame and the azimuth of the backup beam link when the second backup beam link is used as a current link, where the third formula is:

$$\begin{cases} \theta_{next} = \theta_{alter} + (\theta_{max\_power} - \theta_{curr}) \times F_R, F_{switch} = 1 \\ \theta_{next\_alter} = \theta_{curr} + (\theta_{max\_power} - \theta_{curr}) \times F_R, F_{switch} = 1 \end{cases}$$

where $\theta_{next}$ represents the azimuth of the second backup beam link to be switched to in the next frame, $\theta_{curr}$ represents a beam azimuth of the optimal beam link, $\theta_{alter}$ represents a beam azimuth of the first backup beam link, $\theta_{max\_power}$ represents a deviation azimuth of a maximum received energy in the current beam link and the proximate selectable beam link of the current beam link, $F_{switch}$ represents a flag identity of whether to switch to a first backup link, and $F_R$ represents an identity of whether an antenna is rotated.

Furthermore, in a case in which it is not necessary to switch to a backup beam link, an azimuth of a beam link of the next frame is calculated. Specifically, the azimuth of the beam link of the next frame according to a fourth formula is calculated, where the fourth formula is:

$$\begin{cases} \theta_{next} = \theta_{curr} + (\theta_{max\_power} - \theta_{curr}) \times F_R, F_{switch} = 0 \\ \theta_{next\_alter} = \theta_{alter} + (\theta_{max\_power} - \theta_{curr}) \times F_R, F_{switch} = 0 \end{cases}$$

where $\theta_{next\_alter}$ represents the azimuth of the backup beam link, $\theta_{curr}$ represents the azimuth of the optimal beam link, $\theta_{alter}$ represents the azimuth of the backup beam link, $\theta_{max\_power}$ represents an azimuth of a maximum received energy in the current beam link and the proximate selectable beam link of the current beam link, $F_{switch}$ represents an identity of whether to switch to the first backup link, and $F_R$ represents an identity of whether an antenna is rotated.

By means of the beam tracking method provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a MAC frame or a frame header of a physical layer frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Figure 6:
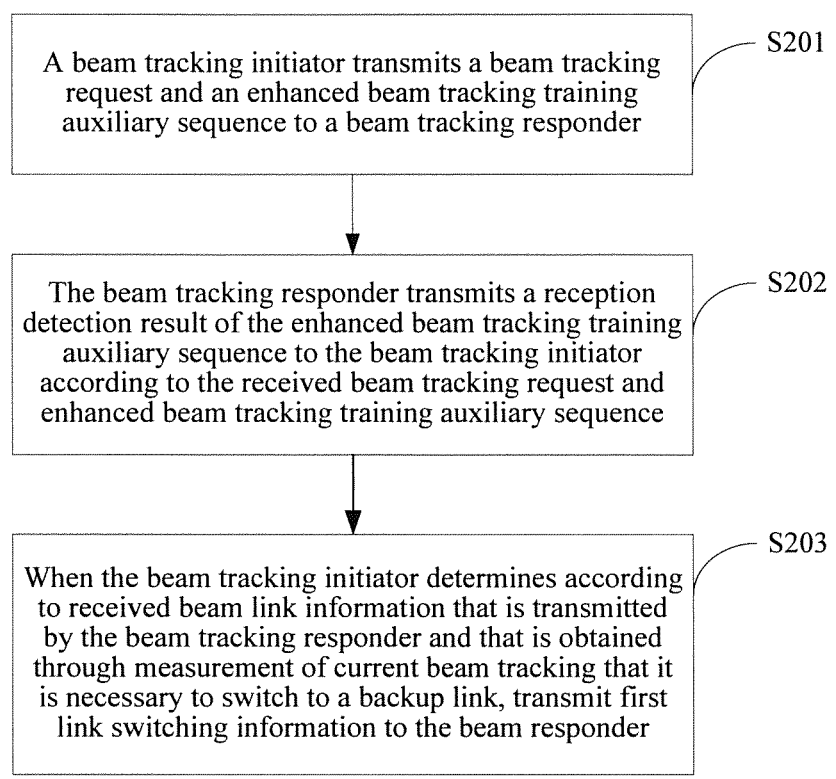
FIG. 6 is a schematic diagram of another beam tracking method according to the present invention.

The present invention provides a beam tracking method, which, as shown in FIG. 6, specifically includes:

S201: A beam tracking initiator transmits a beam tracking request and an enhanced beam tracking training auxiliary sequence to a beam tracking responder.

Correspondingly, the beam tracking responder receives the beam tracking request and the enhanced beam tracking training auxiliary sequence that are transmitted by the beam tracking initiator.

The enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link.

Optionally, if the current beam link via which the beam tracking initiator and the beam tracking responder perform communication is an optimal link after beamforming, and the beam tracking initiator detects that signal attenuation of the current beam link exceeds a preset threshold, the beam tracking initiator transmits the beam tracking request and the enhanced beam tracking training auxiliary sequence to the beam tracking responder.

Alternatively, optionally, if the current beam link via which the beam tracking initiator and the beam tracking responder perform communication is a second optimal link after beamforming, and the beam tracking initiator detects that an optimal link after beamforming is recovered, the beam tracking initiator transmits the beam tracking request and the enhanced beam tracking training auxiliary sequence to the beam tracking responder.

Specifically, after beamforming training, an optimal beam link and a second optimal beam link are generated between the beam tracking initiator and the beam tracking responder, and the second optimal beam link is set as a backup beam link.

Optionally, when the optimal link is blocked and is switched to a backup link, it may be detected by using an adaptive intermittent detection policy whether the optimal link is recovered. Specifically, detection on the optimal link may be started once at an interval of a particular delay $\Delta t$, where $\Delta t$ conforms to an exponential distribution with a base of 2 during (0-T), and when it is detected that the optimal link is not recovered, $T=T+\Delta T$ and $T \leq T_{max}$, where $\Delta t$ represents an increment of detecting that the optimal link is not recovered, and $T_{max}$ represents an upper limit of an adaptive intermittent detection. Certainly, a detection policy for switching from a second optimal link to the optimal link is not limited to the method described above.

Specifically, as shown in FIG. 2, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

Further, the transmitting, by a beam tracking initiator, an enhanced beam tracking training auxiliary sequence to a beam tracking responder includes:

transmitting, by the beam tracking initiator, the beam tracking training auxiliary sequence unit of the current beam link to the beam tracking responder by using the current beam link, transmitting the beam tracking training auxiliary sequence unit of the proximate selectable beam link of the current beam link to the beam tracking responder by using the proximate selectable beam link of the current beam link, and transmitting the beam tracking training auxiliary sequence unit of the first backup beam link to the beam tracking responder by using the first backup beam link.

S202: The beam tracking responder transmits a reception detection result of the enhanced beam tracking training auxiliary sequence to the beam tracking initiator according to the received beam tracking request and enhanced beam tracking training auxiliary sequence.

Correspondingly, the beam tracking initiator receives the reception detection result of the enhanced beam tracking training auxiliary sequence transmitted by the beam tracking responder.

The reception detection result of the enhanced beam tracking training auxiliary sequence include: an azimuth of a maximum received energy beam and maximum received signal energy in the current beam link and the proximate selectable beam link of the current beam link, received signal energy of the current beam link, and received signal energy of the backup beam link.

S203: When the beam tracking initiator determines according to received beam link information that is transmitted by the beam tracking responder and that is obtained through measurement of current beam tracking that it is necessary to switch to a backup link, transmit first link switching information to the beam responder.

Correspondingly, the beam tracking responder receives the first link switching information transmitted by the beam tracking initiator.

The first link switching information is used to instruct the beam tracking initiator and the beam tracking responder to switch to a second backup beam link.

Figure 7:
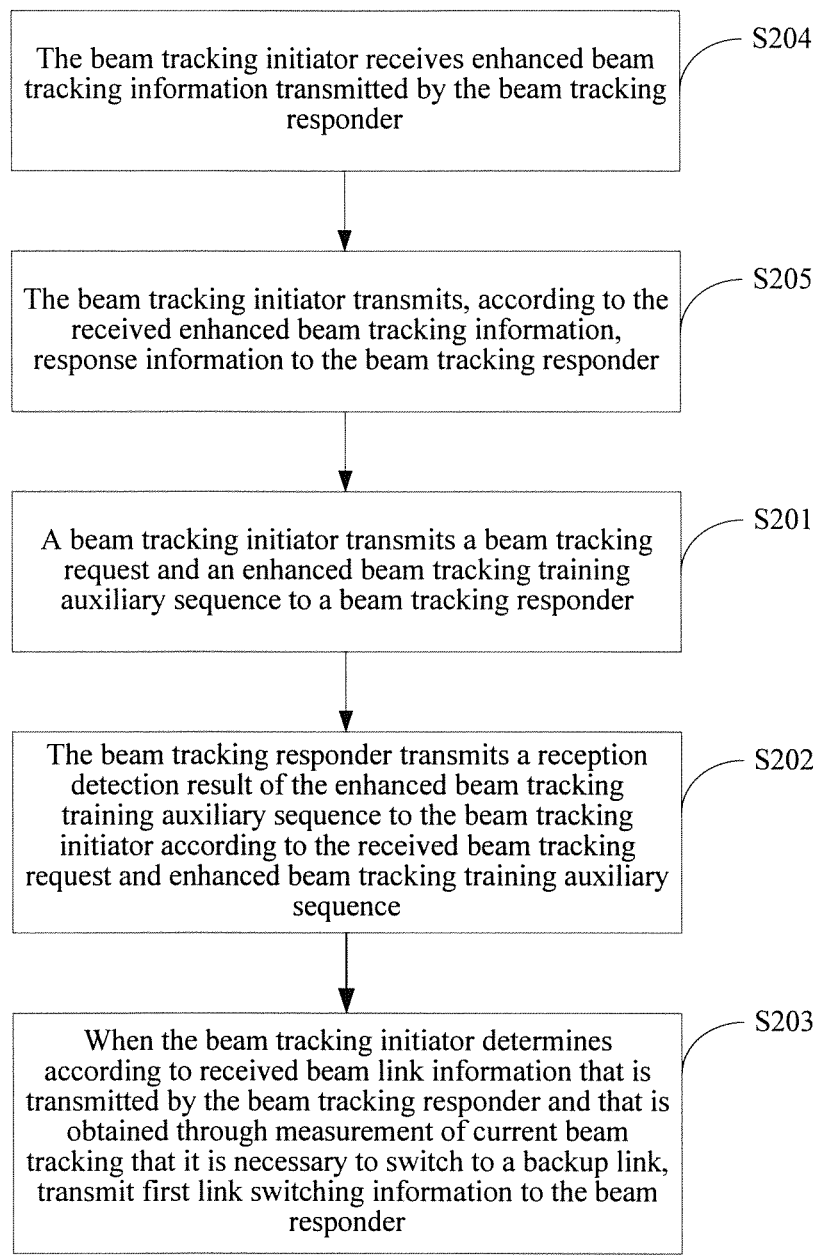
FIG. 7 is a schematic diagram of another beam tracking method according to the present invention.

Furthermore, as shown in FIG. 7, before step S201, the method further includes:

S204: The beam tracking initiator receives enhanced beam tracking information transmitted by the beam tracking responder, where the enhanced beam tracking information includes: information about a first backup beam link and an identity of requesting the beam tracking initiator to transmit the enhanced beam tracking training auxiliary sequence.

The receiving, by the beam tracking initiator, enhanced beam tracking information transmitted by the beam tracking responder includes:

receiving, by the beam tracking initiator, the enhanced beam tracking information transmitted by the beam tracking responder in a sector-level sweep SLS phase; or, receiving, by the beam tracking initiator, the enhanced beam tracking information transmitted by the beam tracking responder in a BRP phase.

S205: The beam tracking initiator transmits, according to the received enhanced beam tracking information, response information to the beam tracking responder, where the response information is used to instruct the beam tracking initiator whether to transmit the enhanced beam tracking training auxiliary sequence.

The enhanced beam tracking information is in an enhanced beam tracking information unit of a media access control MAC layer;

the receiving, by the beam tracking initiator, enhanced beam tracking information transmitted by the beam tracking responder includes:

receiving, by the beam tracking initiator, an SSW frame or an SSW-feedback, including the enhanced beam tracking information unit, transmitted by the beam tracking responder in the SLS phase; or, receiving, by the beam tracking initiator, a beam refinement protocol BRP frame, including the enhanced beam tracking information unit, transmitted by the beam tracking responder in the BRP phase; and the transmitting, by the beam tracking initiator, response information to the beam tracking responder includes:

transmitting, by the beam tracking initiator to the beam tracking responder, an SSW frame or an SSW-feedback carrying an enhanced beam tracking information unit of the response information; or, transmitting, by the beam tracking initiator to the beam tracking responder, a BRP frame carrying an enhanced beam tracking information unit of the response information.

In this embodiment, an enhanced beam tracking information unit same as that in the foregoing embodiment is used, and reference may be made to FIG. 3 and FIG. 4 for specific content of the enhanced beam tracking information unit.

If the enhanced beam tracking information unit is shown in FIG. 3, the transmitting, by the beam tracking initiator, first link switching information to the beam tracking responder includes:

transmitting, by the beam tracking initiator to the beam tracking responder, the first link switching information carried in a frame header of a physical layer frame.

If the enhanced beam tracking information unit is shown in FIG. 4, the transmitting, by the beam tracking initiator, first link switching information to the beam tracking responder includes:

transmitting, by the beam tracking initiator to the beam tracking responder, an SSW frame or an SSW-feedback carrying an enhanced beam tracking information unit of the first link switching information; or transmitting, by the beam tracking initiator to the beam tracking responder, a BRP frame carrying an enhanced beam tracking information unit of the first link switching information.

Furthermore, after step S202, and before step S203, the method further includes: if the current beam link via which the beam tracking initiator and the beam tracking responder perform communication is an optimal link after beamforming or a proximate selectable beam link of the optimal link, determining whether it is necessary to switch to a backup beam link in a next frame; and in a case in which it is necessary to switch to a backup beam link, calculating an azimuth of the second backup beam link that needs to be switched to in the next frame, and an azimuth of a backup beam link when the second backup beam link is used as a current link.

The determining whether it is necessary to switch to a backup beam link in a next frame includes:

calculating, according to the reception detection result of the enhanced beam tracking training auxiliary sequence and received signal energy of the optimal link, signal power attenuation caused by antenna rotation and signal power attenuation caused by a link blockage; and determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame.

Specifically, the calculating, according to the reception detection result of the enhanced beam tracking training auxiliary sequence and received signal energy of the optimal link, signal power attenuation caused by antenna rotation and signal power attenuation caused by a link blockage includes:

calculating the signal attenuation of the current beam link according to a first formula; and calculating, by using the signal attenuation, of the current beam link, obtained through calculation according to the first formula, and according to a second formula, the signal power attenuation caused by antenna rotation and the signal power attenuation caused by a link blockage, where the first formula is:

$$\begin{cases} S_{curr}(t) = P_{optimal} - P_{curr}(t) \\ S_{max\_power}(t) = P_{optimal} - P_{max\_power}(t) \end{cases}$$

where $S_{curr}(t)$ represents the current beam link signal power attenuation, $S_{max\_power}(t)$ represents attenuation of maximum received signal energy in the current beam link and the proximate selectable beam link of the current beam link and received signal energy of an optimal beam link, $P_{optimal}$ represents the received signal energy of the optimal beam link, $P_{max\_power}$ represents the maximum received signal energy in the current beam link and the proximate selectable beam link of the current beam link, and $P_{curr}$ represents signal energy of the current beam link; and the second formula is:

$$\begin{bmatrix} S_{max\_power}(t) \\ S_{curr}(t) \end{bmatrix} = \begin{bmatrix} 0 & 1 \\ 1 & 1 \end{bmatrix} \begin{bmatrix} S_R(t) \\ S_B(t) \end{bmatrix}$$

where $S_R(t)$ represents the signal power attenuation caused by antenna rotation, $S_B(t)$ represents the signal power attenuation caused by link blockage, $S_{curr}(t)$ represents the signal attenuation of the current beam link, and $S_{max\_power}(t)$ represents the attenuation of the maximum received signal energy in the current beam link and the proximate selectable beam link of the current beam link and the received signal energy of the optimal beam link.

The determining whether an antenna is rotated according to the signal power attenuation caused by antenna rotation and a rotation attenuation threshold, and determining, according to the signal power attenuation caused by a link blockage and a blockage threshold, whether it is necessary to switch to a backup beam link in the next frame includes:

if $S_R(t) > \Gamma_R$, determining that an antenna is rotated, and setting a flag bit to $F_R=1$, or otherwise $F_R=0$;

if $S_B(t) > \Gamma_B$ or $P_{curr\_alter} > P_{max\_power}$, determining that it is necessary to switch to a backup beam link in the next frame, and setting a flag bit to $F_{switch}=1$, or otherwise $F_{switch}=0$, where $\Gamma_B$ represents a threshold of signal power attenuation caused by antenna rotation, $\Gamma_B$ represents a threshold of signal power attenuation caused by link blockage, $S_R(t)$ represents the signal power attenuation caused by antenna rotation, $S_B(t)$ represents the signal power attenuation caused by link blockage, $F_{switch}$ represents an identity of whether to switch to a second backup link, and $F_R$ represents an identity of whether an antenna is rotated.

The calculating an azimuth of the second backup beam link that needs to be switched to in the next frame, and an azimuth of a backup beam link when the second backup beam link is used as a current link includes:

calculating, according to a determining result of whether the antenna is rotated, a determining result of whether t is necessary to switch to a backup beam link in the next frame, an azimuth of the optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link.

Specifically, the azimuth of the second backup beam link that needs to be switched to in the next frame and the azimuth of the backup beam link when the second backup beam link is used as the current link are calculated according to a third formula, where the third formula is:

$$\begin{cases} \theta_{next} = \theta_{alter} + (\theta_{max\_power} - \theta_{curr}) \times F_R, F_{switch} = 1 \\ \theta_{next\_alter} = \theta_{curr} + (\theta_{max\_power} - \theta_{curr}) \times F_R, F_{switch} = 1 \end{cases}$$

where $\theta_{next}$ represents the azimuth of the second backup beam link to be switched to in the next frame, $\theta_{next\_alter}$ represents the azimuth of the backup beam link, $\theta_{curr}$ represents a beam azimuth of the optimal beam link, $\theta_{alter}$ represents a beam azimuth of the first backup beam link, $\theta_{max\_power}$ represents a deviation azimuth of a maximum received energy in the current beam link and the proximate selectable beam link of the current beam link, $F_{switch}$ represents a flag identity of whether to switch to a first backup link, and $F_R$ represents an identity of whether an antenna is rotated.

Furthermore, the calculating, in a case in which it is not necessary to switch to a backup beam link, an azimuth of a beam link of the next frame includes:

calculating the azimuth of the beam link of the next frame according to a fourth formula, where the fourth formula is:

$$\begin{cases} \theta_{next} = \theta_{curr} + (\theta_{max\_power} - \theta_{curr}) \times F_R, F_{switch} = 0 \\ \theta_{next\_alter} = \theta_{alter} + (\theta_{max\_power} - \theta_{curr}) \times F_R, F_{switch} = 0 \end{cases}$$

where $\theta_{next}$ represents the azimuth of the second backup beam link to be switched to in the next frame, $\theta_{next\_alter}$ represents the azimuth of the backup beam link, $\theta_{curr}$ represents the azimuth of the optimal beam link, $\theta_{alter}$ represents the azimuth of the backup beam link, $\theta_{max\_power}$ represents the azimuth of the maximum received energy beam in the current beam link and the proximate selectable beam link of the current beam link, $F_{switch}$ represents an identity of whether to switch to the first backup link, and $F_R$ represents an identity of whether an antenna is rotated.

By means of the beam tracking method provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a MAC frame or a frame header of a physical layer frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Embodiment 1

Figure 8:
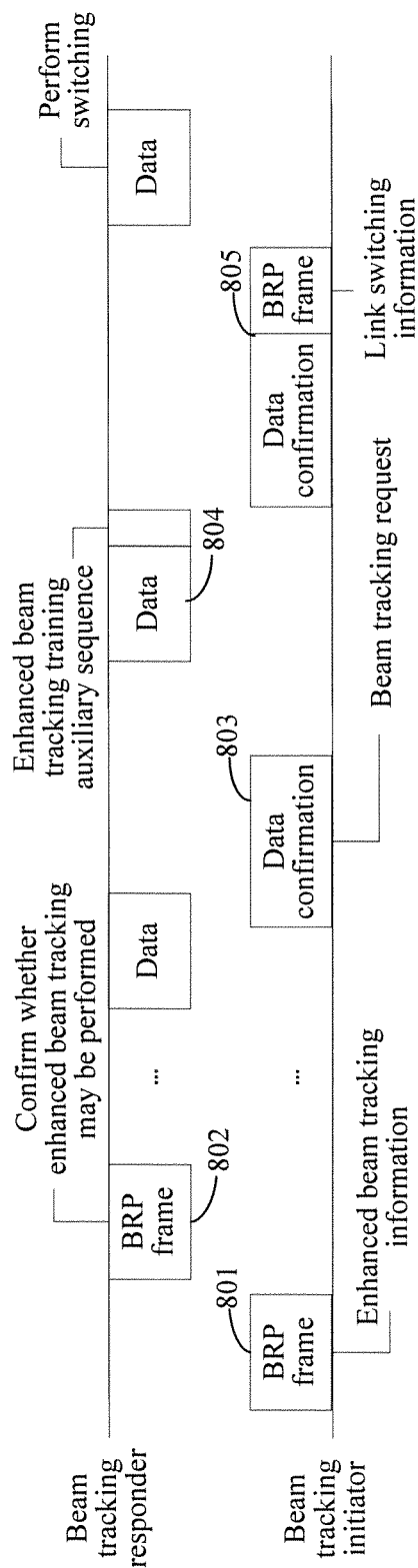
FIG. 8 is a schematic diagram of another beam tracking method according to the present invention.

This embodiment of the present invention provides a beam tracking method. The beam tracking information unit shown in FIG. 5 above is used. The beam tracking information unit is used to implement setting of an antenna configuration of a backup beam link and to enable enhanced beam tracking. In this embodiment, an example in which a beam tracking initiator receives an enhanced beam tracking training auxiliary sequence is used to describe the beam tracking method in detail. As shown in FIG. 8, specific steps include:

Step 801: A beam tracking initiator transmits enhanced beam tracking information to a beam tracking responder in a BRP phase.

The enhanced beam tracking information is in an enhanced beam tracking information unit of a MAC layer. In that way, the beam tracking initiator transmits, in the BRP phase to the beam tracking responder, a BRP frame including an enhanced beam tracking unit.

Specifically, the enhanced beam tracking information unit includes: If a Backup AWV Setting=01, it represents that it is to set an antenna configuration in a direction of a backup beam link of the beam tracking responder according to antenna configuration information in a Peer Tx_Sector ID and a Peer Tx_Antenna ID, where the Peer Tx_Sector ID and the Peer Tx_Antenna ID include antenna configuration information in a direction of a beam link that needs to be backed up; meanwhile, if an E-BT-R Request=1, it represents that it is to request the beam tracking responder to transmit an enhanced beam tracking training auxiliary sequence (enhance receive training, e-TRN-R for short).

Step 802: The beam tracking responder receives the enhanced beam tracking information transmitted by the beam tracking initiator, and transmits, to the beam tracking initiator, response information of whether to transmit the enhanced beam tracking training auxiliary sequence.

Specifically, if the beam tracking responder determines that the enhanced beam tracking training auxiliary sequence may be transmitted, it is set that an E-BR-R OK of an enhanced beam tracking information unit=1, and the beam tracking responder transmits, to the beam tracking initiator, a BRP frame carrying the response information of that the E-BR-R OK=1; or if the beam tracking responder determines not to transmit the enhanced beam tracking training auxiliary sequence, it is set that an E-BR-R OK of an enhanced beam tracking information unit=0, the beam tracking responder transmits, to the beam tracking initiator, a BRP frame carrying the response information of that the E-BR-R OK=0.

Step 803: When beam tracking needs to be performed, the beam tracking initiator transmits a beam tracking request to the beam tracking responder.

The beam tracking initiator sets, in a frame header of a physical layer frame, that a Packet Type=TRN-R, where TRN-LEN>0, so as to represent that it is to send the beam tracking request to the beam tracking responder.

Step 804: The beam tracking responder receives the beam tracking request transmitted by the beam tracking initiator, and transmits the enhanced beam tracking training auxiliary sequence to the beam tracking initiator.

Specifically, the beam tracking responder adds the enhanced beam tracking training auxiliary sequence to a transmitted data frame, where the sequence includes an AGC field and a TRN field of a current beam link, an AGC field and a TRN field of a proximate beam link of the current beam link, and an STF field and a CE field of a backup beam link, and a final STF field and CE field of the sequence are transmitted by using an antenna configuration of the backup beam link.

Correspondingly, the beam tracking initiator receives, according to a preset antenna configuration, an e-TRN-R sequence transmitted by the beam tracking responder, that is, receives, on an antenna configuration in a direction of the current beam link, the AGC field and the TRN field of the current beam link, receives, on an antenna configuration in a direction of the proximate beam link of the current beam link, the AGC field and the TRN field of the proximate beam link of the current beam link, and receives, on the antenna configuration in the direction of the backup beam link, the STF field and the CE field of the backup beam link.

An enhanced beam training auxiliary field of the backup beam link is the STF field and the CE field, which are used to accomplish functions such as link synchronization, AGC, and carrier restoration after is switched to the backup beam link, thereby ensuring a channel estimation result of sufficient precision.

Step 805: The beam tracking initiator considers that it is necessary to perform switching to a backup link, and adds, behind an ACK frame transmitted to the beam tracking responder, one BRP frame carrying link switching information.

The BRP frame includes an enhanced beam tracking information unit, and it is set in the enhanced beam tracking information unit that Switch to Backup AWV=1, so as to represent that it is to perform link switching in a next frame. In that way, during the next frame, the beam tracking initiator and the beam tracking responder both use an antenna configuration in a direction of a backup beam link as an antenna configuration in a direction of a beam link for performing communication in the next frame, and an antenna configuration in a direction of an original beam link is used as an antenna configuration of a backup beam link during the next frame.

By means of the beam tracking embodiment provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a MAC frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Embodiment 2

Figure 9:
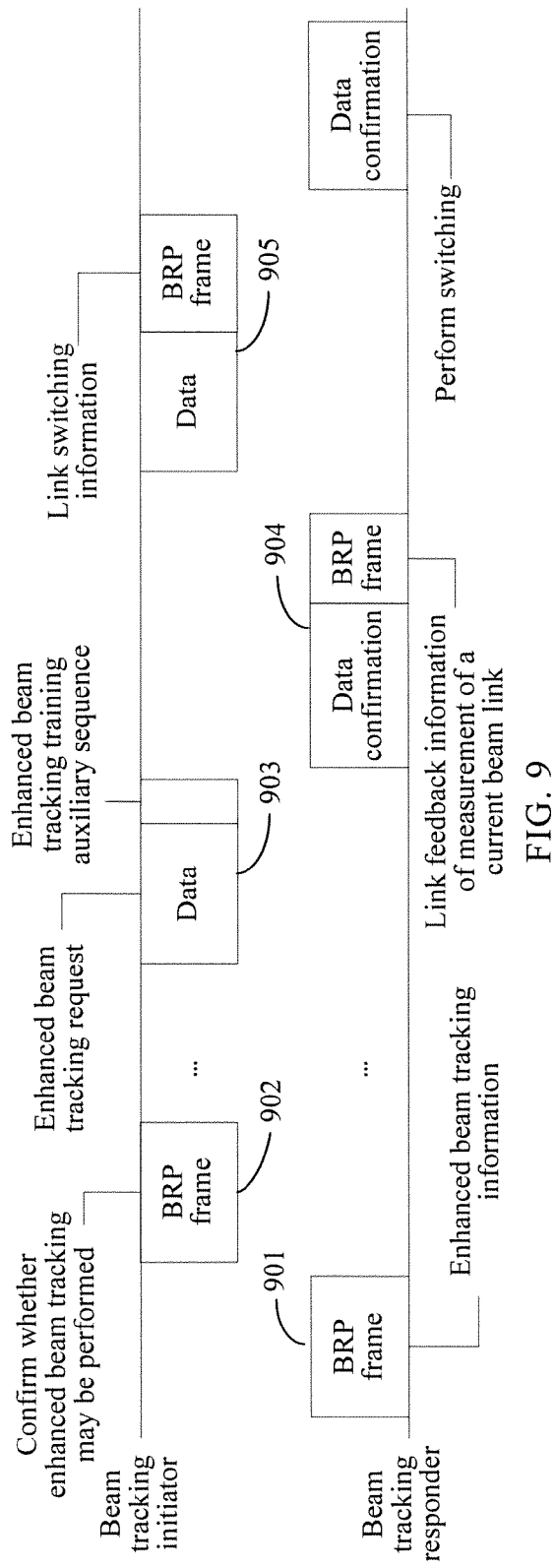
FIG. 9 is a schematic diagram of another beam tracking method according to the present invention.

This embodiment of the present invention provides a beam tracking method. The beam tracking information unit shown in FIG. 5 above is used. The beam tracking information unit is used to implement setting an antenna configuration of a backup beam link and to enable enhanced beam tracking. In this embodiment, an example in which a beam tracking initiator transmits an enhanced beam tracking training auxiliary sequence is used to describe the beam tracking method in detail. As shown in FIG. 9, specific steps include:

Step 901: A beam tracking responder transmits, in a BRP phase to a beam tracking initiator, a BRP frame carrying enhanced beam tracking information.

The enhanced beam tracking information is in an enhanced beam tracking information unit of a MAC layer. In that way, the beam tracking initiator transmits, in the BRP phase to the beam tracking responder, a BRP frame including an enhanced beam tracking unit.

Specifically, the enhanced beam tracking information is in the enhanced beam tracking information unit of the MAC layer, and the enhanced beam tracking information includes setting that a Backup AWV Setting in the enhanced beam tracking information unit=01, so as to represent that it is to specify, according to information in a Peer Tx_Sector ID and a Peer Tx_Antenna ID, that the beam tracking initiator sets an antenna weight vector of a backup beam link, and setting that an E-BT-T Request=1, so as to represent that it is to enable the beam tracking initiator to transmit an enhanced beam tracking auxiliary sequence (enhance transmit training, e-TAN-T for short).

Step 902: The beam tracking initiator transmits, to the beam tracking responder according to the received enhanced beam tracking information, a BRP frame carrying response information.

The response information is used to instruct the beam tracking initiator whether to transmit an enhanced beam tracking training auxiliary sequence. The response information is identified in an enhanced beam tracking information unit of a MAC layer.

If the beam tracking initiator determines that the enhanced beam tracking training auxiliary sequence may be transmitted, it is set that an E-BT-T OK in the enhanced beam tracking information unit=1; or if the beam tracking initiator determines not to transmit the enhanced beam tracking training auxiliary sequence, it is set that an E-BT-T OK in the enhanced beam tracking information unit=0.

Step 903: When beam tracking needs to be performed, the beam tracking initiator transmits a beam tracking request and an enhanced beam tracking training auxiliary sequence to the beam tracking responder.

The beam tracking request that Packet Type=TRN-T, where TRN-LEN>0 is set in a frame header of a physical layer frame transmitted by the beam tracking initiator. The enhanced beam tracking training auxiliary sequence includes a current beam link, a proximate beam link of the current beam link, and an enhanced beam training auxiliary field of a backup beam link.

Specifically, the enhanced beam training auxiliary field of the current beam link is an AGC field and a TRN field; an enhanced beam training auxiliary field of the proximate beam link of the current beam link is an AGC field and a TRN field; and an enhanced beam training auxiliary field of the backup beam link is an STF field and a CE field.

An enhanced beam training auxiliary field of the backup beam link is the STF field and the CE field, which are used to accomplish functions such as link synchronization, AGC, and carrier restoration after is switched to the backup beam link, thereby ensuring a channel estimation result of sufficient precision.

Step 904: The beam tracking responder transmits, according to the received beam tracking request and enhanced beam tracking training auxiliary sequence, channel information obtained through measurement of current beam tracking.

Step 905: The beam tracking initiator considers that it is necessary to perform switching of an antenna configuration, and adds, behind a data frame transmitted to the beam tracking responder, one BRP frame carrying link switching information.

The BRP frame includes an enhanced beam tracking information unit, and it is set in the enhanced beam tracking information unit that Switch to Backup AWV=1, so as to represent that it is to perform link switching in a next frame. In that way, during the next frame, the beam tracking initiator and the beam tracking responder both use an antenna configuration in a direction of a backup beam link as an antenna configuration in a direction of a beam link for performing communication in the next frame, and an antenna configuration in a direction of an original beam link is used as an antenna configuration of a backup beam link during the next frame.

By means of the beam tracking method provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a MAC frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Embodiment 3

This embodiment of the present invention provides a beam tracking method. The beam tracking information unit shown in FIG. 4 above is used. The beam tracking information unit is used to implement setting of an antenna configuration of a backup beam link and to enable enhanced beam tracking.

In this embodiment, an example in which a beam tracking responder transmits an enhanced beam tracking training auxiliary sequence is used to describe the beam tracking method in detail, where reference may be made to steps 801 to 804 in Embodiment 1 for the first four steps. However, a difference of this embodiment from Embodiment 1 is that information about whether to perform link switching is carried in a frame header of a physical layer frame, and one bit in the frame header of the physical layer frame is used to represent whether to perform link switching. Meanwhile, an antenna configuration of a current beam link is used to update an antenna configuration of a backup beam link, and is used as the antenna configuration of the backup beam link in a next frame.

Optionally, for one bit, representing whether to perform link switching, in the frame header of the physical layer frame, information of one bit may be added at a $22^{nd}$ bit of a control physical layer frame header field (Control Physical header fields, Control PHY header fields for short); the information of the bit is identified by a Switch to Backup AWV, and is information used to whether to switch to a backup beam link. When a Switch to Backup AWV=1, it represents that it is to switch, in the next frame, to an antenna configuration in a direction of the backup beam link to receive information. An antenna configuration in a direction of a current beam link is used as the antenna configuration in the direction of the backup beam link in the next frame; or otherwise, the Switch to Backup AWV=0.

Alternatively, optionally, for one bit, representing whether to perform link switching, in the frame header of the physical layer frame, information of one bit may be added at a $46^{th}$ bit of an orthogonal frequency division multiplexing physical layer frame header field (Orthogonal Frequency Division Multiplexing Physical header field, OFDM PHY header field for short); the information of the bit is information used to whether to switch to a backup beam link. When a Switch to Backup AWV=1, it represents that it is to switch, in the next frame, to an antenna configuration in a direction of the backup beam link to receive information. An antenna configuration in a direction of a current beam link is used as the antenna configuration in the direction of the backup beam link in the next frame; or otherwise, the Switch to Backup AWV=0.

Alternatively, optionally, for one bit, representing whether to perform link switching, in the frame header of the physical layer frame, information of one bit may be added at a $44^{th}$ bit of a single carrier or lower power physical layer frame header field (Single Carrier/Lower Power Physical header fields, SC/Lower Power PHY header fields for short); the information of the bit is information used to whether to switch to a backup beam link. When a Switch to Backup AWV=1, it represents that it is to switch, in the next frame, to an antenna configuration in a direction of the backup beam link to receive information. An antenna configuration in a direction of a current beam link is used as the antenna configuration in the direction of the backup beam link in the next frame; or otherwise, the Switch to Backup AWV=0.

Figure 10:
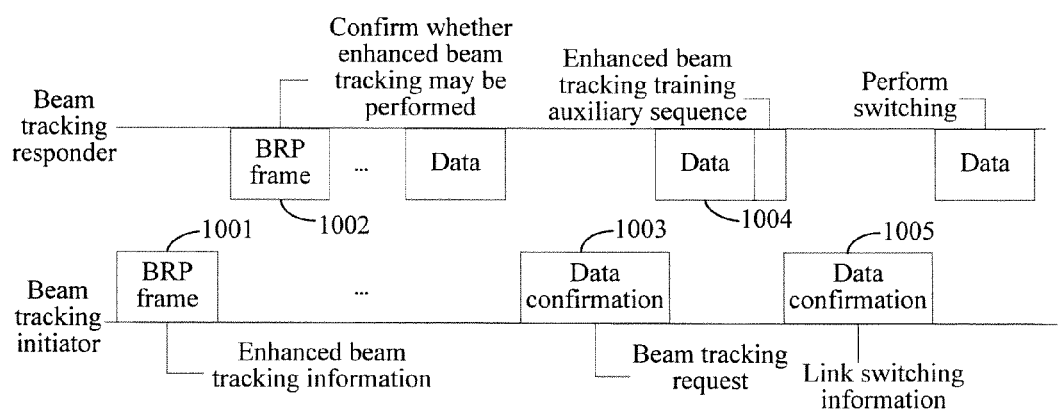
FIG. 10 is a schematic diagram of another beam tracking method according to the present invention.

The beam tracking method is described in detail based on the beam tracking information unit shown in FIG. 4 above, and that link switching information is carried in a $22^{nd}$ bit of a reserved field of a control physical layer frame header field. As shown in FIG. 10, specific steps include:

Step 1001: A beam tracking initiator transmits enhanced beam tracking information to a beam tracking responder in a BRP phase.

The enhanced beam tracking information is in an enhanced beam tracking information unit of a MAC layer. In that way, the beam tracking initiator transmits, in the BRP phase to the beam tracking responder, a BRP frame including an enhanced beam tracking unit.

Specifically, the enhanced beam tracking information is in the enhanced beam tracking information unit of the MAC layer. The enhanced beam tracking information unit includes: If a Backup AWV Setting=01, it represents that it is to set an antenna configuration in a direction of a backup beam link of the beam tracking responder according to antenna configuration information in a Peer Tx_Sector ID and a Peer Tx_Antenna ID, where the Peer Tx_Sector ID and the Peer Tx_Antenna ID include antenna configuration information in a direction of a beam link that needs to be backed up; meanwhile, if an E-BT-R Request=1, it represents that it is to request the beam tracking responder to transmit an enhanced beam tracking training auxiliary sequence.

Step 1002: The beam tracking responder receives the enhanced beam tracking information transmitted by the beam tracking initiator, and transmits, to the beam tracking initiator, response information of whether to transmit the enhanced beam tracking training auxiliary sequence.

Specifically, if the beam tracking responder determines that the enhanced beam tracking training auxiliary sequence may be transmitted, it is set that an E-BR-R OK of an enhanced beam tracking information unit=1, and the beam tracking responder transmits, to the beam tracking initiator, a BRP frame carrying the response information of that the E-BR-R OK=1; or if the beam tracking responder determines not to transmit the enhanced beam tracking training auxiliary sequence, it is set that an E-BR-R OK of an enhanced beam tracking information unit=0, the beam tracking responder transmits, to the beam tracking initiator, a BRP frame carrying the response information of that the E-BR-R OK=0.

Step 1003: When beam tracking needs to be performed, the beam tracking initiator transmits a beam tracking request to the beam tracking responder.

The beam tracking initiator sets, in a frame header of a physical layer frame, that a Packet Type=TRN-R, where TRN-LEN>0, so as to represent that it is to send the beam tracking request to the beam tracking responder.

Step 1004: The beam tracking responder receives the beam tracking request transmitted by the beam tracking initiator, and transmits the enhanced beam tracking training auxiliary sequence to the beam tracking initiator.

Specifically, the beam tracking responder adds the enhanced beam tracking training auxiliary sequence to a transmitted data frame, where the sequence includes an AGC field and a TRN field of a current beam link, an AGC field and a TRN field of a proximate beam link of the current beam link, and an STF field and a CE field of a backup beam link, and a final STF field and CE field of the sequence are transmitted by using an antenna configuration of the backup beam link.

Correspondingly, the beam tracking initiator receives, according to a preset antenna configuration, an e-TRN-R sequence transmitted by the beam tracking responder, that is, receives, on an antenna configuration in a direction of the current beam link, the AGC field and the TRN field of the current beam link, receives, on an antenna configuration in a direction of the proximate beam link of the current beam link, the AGC field and the TRN field of the proximate beam link of the current beam link, and receives, on the antenna configuration in the direction of the backup beam link, the STF field and the CE field of the backup beam link.

An enhanced beam training auxiliary field of the backup beam link is the STF field and the CE field, which are used to accomplish functions such as link synchronization, AGC, and carrier restoration after is switched to the backup beam link, thereby ensuring a channel estimation result of sufficient precision.

Step 1005: The beam tracking initiator considers that it is necessary to perform switching to a backup link, and transmits, to the beam tracking responder, link switching information carried in a frame header of a physical layer frame.

Specifically, it is set, in a $22^{nd}$ bit of the frame header of the physical layer frame, that a Switch to Backup AWV=1, so as to represent that it is to perform link switching in the next frame. In that way, during the next frame, the beam tracking initiator and the beam tracking responder both use an antenna configuration in a direction of a backup beam link as an antenna configuration in a direction of a beam link for performing communication in the next frame, and an antenna configuration in a direction of an original beam link is used as an antenna configuration of a backup beam link during the next frame.

By means of the beam tracking method provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a frame header of a physical layer frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Embodiment 4

Figure 11:
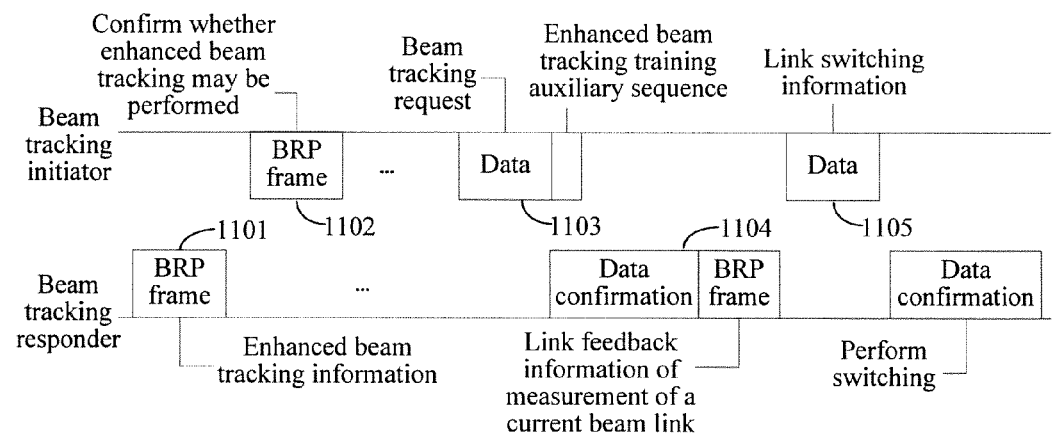
FIG. 11 is a schematic diagram of another beam tracking method according to the present invention.

This embodiment of the present invention provides a beam tracking method. The beam tracking information unit shown in FIG. 4 is used. The beam tracking information unit is used to implement setting an antenna configuration of a backup beam link and enable enhanced beam tracking. Meanwhile, link switching information, carried in a frame header of a physical layer frame, shown in FIG. 10 in Embodiment 3 is used. In this embodiment, an example in which a beam tracking initiator transmits an enhanced beam tracking training auxiliary sequence is used to describe the beam tracking method in detail. As shown in FIG. 11, specific steps include:

Step 1101: A beam tracking responder transmits, in a BRP phase to a beam tracking initiator, a BRP frame carrying enhanced beam tracking information.

The enhanced beam tracking information is in an enhanced beam tracking information unit of a MAC layer. In that way, the beam tracking initiator transmits, in the BRP phase to the beam tracking responder, a BRP frame including an enhanced beam tracking unit.

Specifically, the enhanced beam tracking information is in the enhanced beam tracking information unit of the MAC layer, and the enhanced beam tracking information includes setting that a Backup AWV Setting in the enhanced beam tracking information unit=01, so as to represent that it is to specify, according to information in a Peer Tx_Sector ID and a Peer Tx_Antenna ID, that the beam tracking initiator sets an antenna weight vector of a backup beam link, and setting that an E-BT-T Request=1, so as to represent that it is to enable the beam tracking initiator to transmit an enhanced beam tracking auxiliary sequence.

Step 1102: The beam tracking initiator transmits, to the beam tracking responder according to the received enhanced beam tracking information, a BRP frame carrying response information.

The response information is used to instruct the beam tracking initiator whether to transmit an enhanced beam tracking training auxiliary sequence. The response information is identified in an enhanced beam tracking information unit of a MAC layer.

If the beam tracking initiator determines that the enhanced beam tracking training auxiliary sequence may be transmitted, it is set that an E-BT-T OK in the enhanced beam tracking information unit=1; or if the beam tracking initiator determines not to transmit the enhanced beam tracking training auxiliary sequence, it is set that an E-BT-T OK in the enhanced beam tracking information unit=0.

Step 1103: When beam tracking needs to be performed, the beam tracking initiator transmits a beam tracking request and an enhanced beam tracking training auxiliary sequence to the beam tracking responder.

It is set, in a frame header of a physical layer frame transmitted by the beam tracking initiator, that Packet Type=TRN-T, where TRN-LEN>0, so as to represent that it is to send the beam tracking request to the beam tracking responder. The enhanced beam tracking training auxiliary sequence includes a current beam link, a proximate beam link of the current beam link, and an enhanced beam training auxiliary field of a backup beam link.

Specifically, the enhanced beam training auxiliary field of the current beam link is an AGC field and a TRN field; an enhanced beam training auxiliary field of the proximate beam link of the current beam link is an AGC field and a TRN field; and an enhanced beam training auxiliary field of the backup beam link is an STF field and a CE field.

An enhanced beam training auxiliary field of the backup beam link is the STF field and the CE field, which are used to accomplish functions such as link synchronization, AGC, and carrier restoration after is switched to the backup beam link, thereby ensuring a channel estimation result of sufficient precision.

Step 1104: The beam tracking responder transmits, according to the received beam tracking request and enhanced beam tracking training auxiliary sequence, channel information obtained through measurement of current beam tracking.

Step 1105: The beam tracking initiator considers that it is necessary to perform switching to a backup link, and transmits, to the beam tracking responder, link switching information carried in a frame header of a physical layer frame.

Specifically, it is set, in a $22^{nd}$ bit of the frame header of the physical layer frame, that a Switch to Backup AWV=1, so as to represent that it is to perform link switching in the next frame. In that way, during the next frame, the beam tracking initiator and the beam tracking responder both use an antenna configuration in a direction of a backup beam link as an antenna configuration in a direction of a beam link for performing communication in the next frame, and an antenna configuration in a direction of an original beam link is used as an antenna configuration of a backup beam link during the next frame.

By means of the beam tracking method provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a frame header of a physical layer frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Embodiment 5

This embodiment of the present invention is based on the IEEE 802.11 ad standard and a channel model, and simulated implementation is performed based on the enhanced beam tracking methods in Embodiment 1 to Embodiment 4 above.

Figure 12:
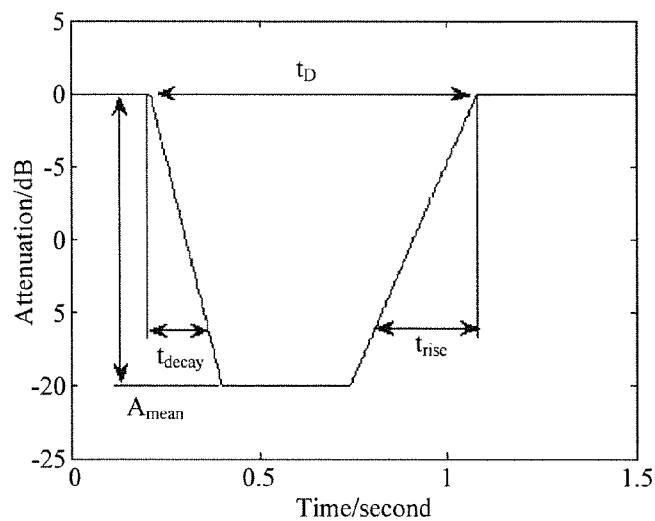
FIG. 12 is a schematic diagram of attenuation of a link blocked by a device in 60 GHz short-range communication according to the present invention.

In 60 GHz short-range communication, time-attenuation of a current communication link being blocked by an object is shown in FIG. 12, where a horizontal axis represents time, using a unit of second, and a vertical axis represents attenuation, using a unit of decibel (dB). In the figure, $A_{mean}$ mean denotes me maximum attenuation, $t_D$ denotes a block delay, $t_{decay}$ denotes a link gain decay time, $t_{rise}$ denotes a gain rise time, and the duration $t_{decay}$ of a process during which a beam for communication between devices is blocked is about 100 ms.

Based on the IEEE 802.11 ad standard and a channel model, as well as attenuation because a beam link is blocked in 60 GHz short-range communication, it is assumed that there are two beam links: a line of sight (line of sight, LOS for short) link and a non line of sight (non-line of sight, NLOS for short) link, and two stations (station, STA for short): STA-A and STA-B, where between STA-A and STA-B, a distance of a LOS link is 4 meters, and a distance of an NLOS link is 6 meters, and the LOS link and the NLOS link have an equal probability of being blocked. Each of a receive end and a transmit end has 16 antennas, a noise figure (Noise Figure) is 5 dB, and an implementation loss is 5 dB. A decay time $t_{decay}$ of each time of blockage is 93 ms, a block delay $t_D$=393 ms, and a mean maximum attenuation $A_{mean}$=20 dB.

Figure 13:
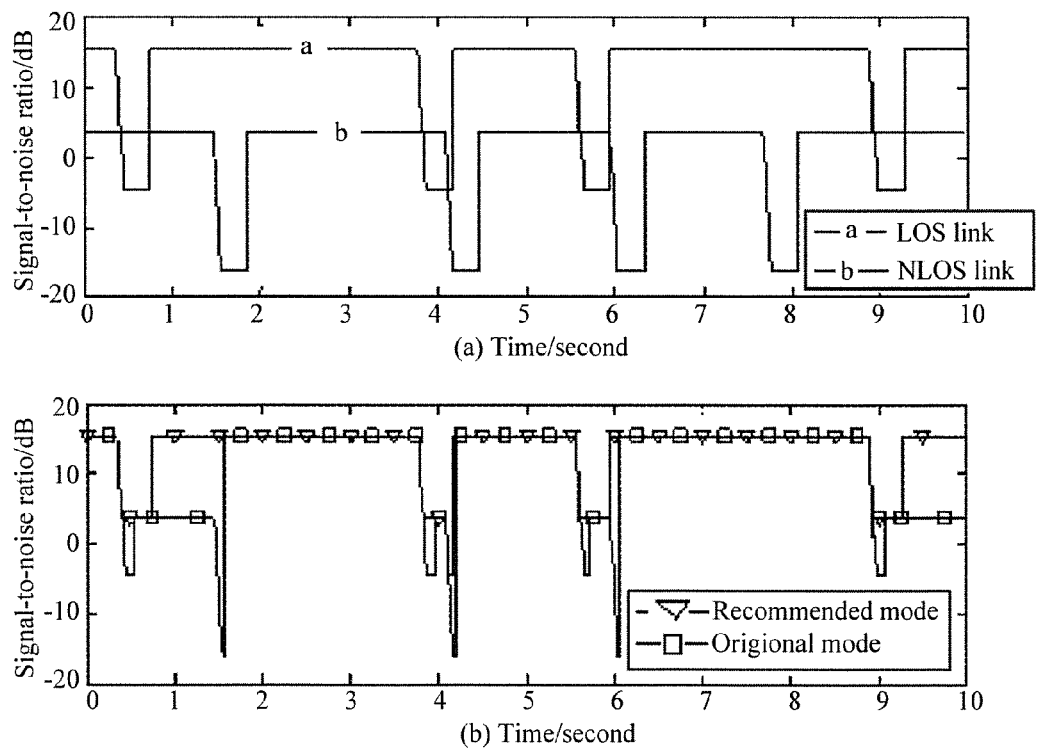
FIG. 13 is a schematic diagram of a time-signal-to-noise ratio comparison between an enhanced beam tracking method and an original beam tracking method according to the present invention.

According to the foregoing assumption, in a case in which a probability that a link is blocked per second is 0.25, time-signal-to-noise ratio (signal-to-noise ratio, SNR) of receiving a signal by the receive end is shown in FIG. 13.

In FIG. 13(a), a horizontal axis represents time, using a unit of second (s), and a vertical axis represents a signal-to-noise ratio, using a unit of decibel (dB), where a line a represents a diagram of time-signal-to-noise ratio kept on a LOS beam link, and a line b represents a diagram of time-signal-to-noise ratio kept in a direction of an NLOS beam link. In FIG. 13(b), a horizontal axis represents time, using a unit of second (s), and a vertical axis represents a signal-to-noise ratio, using a unit of decibel (dB), where straight lines and lines of inverted triangles represent enhanced beam tracking of the present invention, that is, a recommended mode in FIG. 13(b), and straight lines and lines of boxes represent original beam tracking, that is, an original mode in FIG. 13(b).

As can be seen from FIG. 13, because detection of a blocked LOS link is performed during transmission of an A-PPDU frame, switching is performed from the LOS link to an NLOS link in time, so as to avoid a link interruption. Meanwhile, after the LOS link is recovered, a rapid discovery may be made and is switched to the LOS link; therefore, compared with original beam tracking, enhanced beam tracking provided in the present invention can obtain a higher link gain, and a probability of a communication interruption (SNR<0 dB) is greatly reduced.

Figure 14:
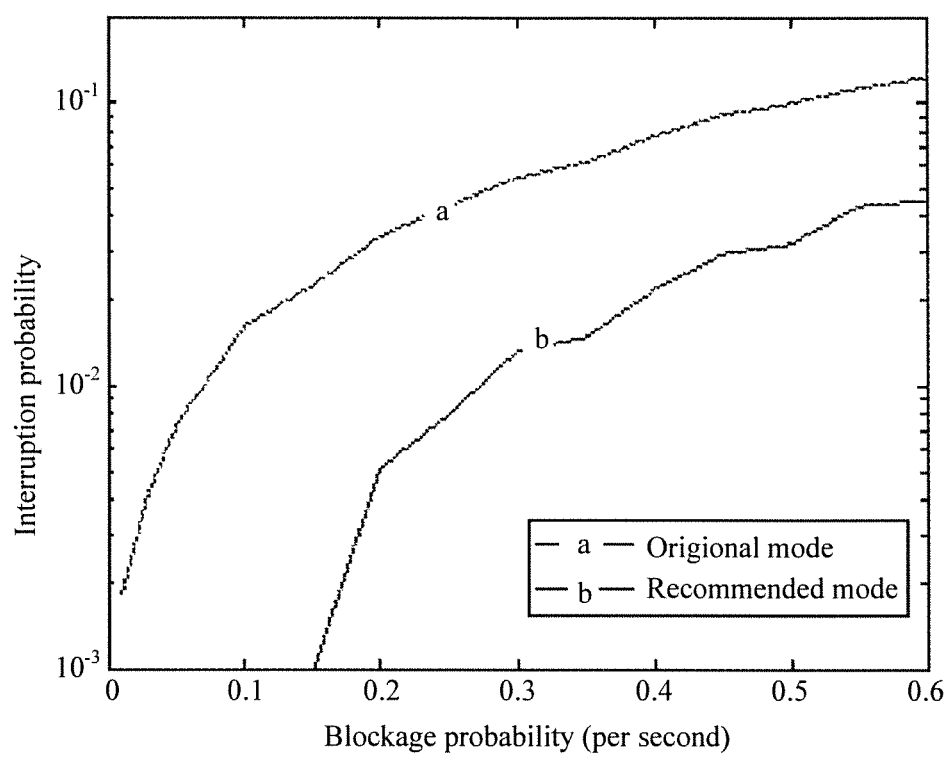
FIG. 14 is a schematic diagram of a blockage probability-interruption probability comparison between an enhanced beam tracking method and an original beam tracking method according to the present invention.

According to the foregoing assumption, a blockage probability is used as a variable to simulate interruption probabilities for enhanced beam tracking and original beam tracking of the present invention. As shown in FIG. 14, a horizontal axis represents a blockage probability, a time is each second, and a vertical axis represents an interruption probability.

In FIG. 14, a line b represents enhanced beam tracking of the present invention, that is, a recommended mode in FIG. 14, and a line a represents the original beam tracking, that is, an original mode in FIG. 14. As can be seen from FIG. 14, in a case in which a blockage probability per second is less than 0.15, an interruption probability of enhanced beam tracking of the present invention may be less than $10^{-3}$; original beam tracking does not have a capability of counteracting blockage, therefore, performance of original beam tracking is severely susceptible to a blockage probability.

Figure 15:
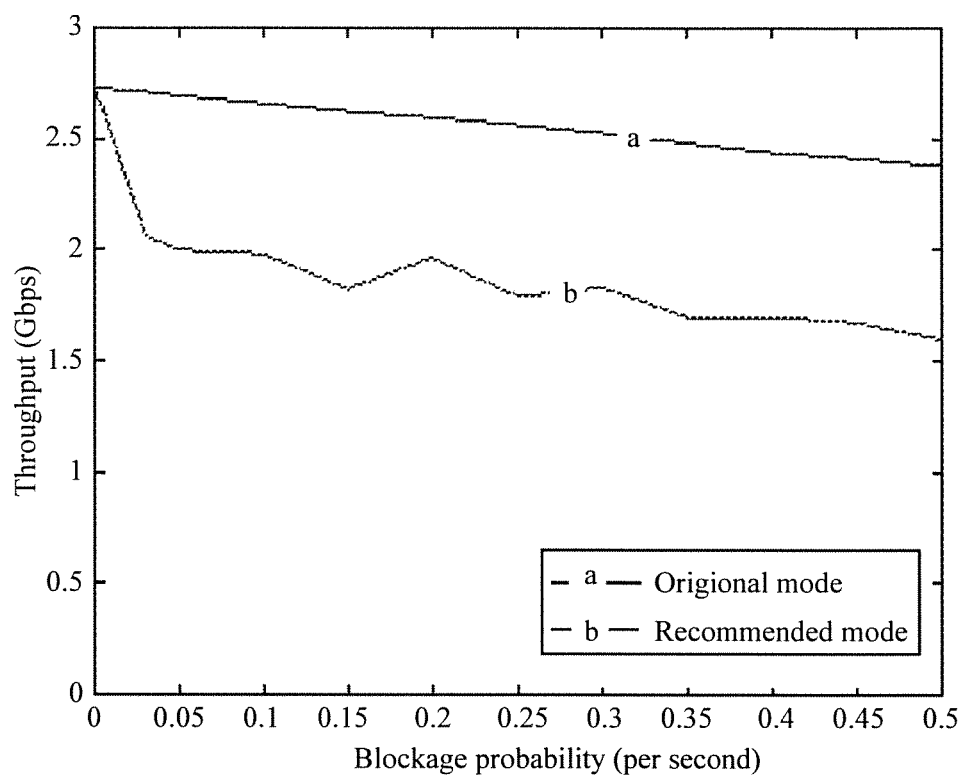
FIG. 15 is a schematic diagram of a blockage probability-throughput comparison between an enhanced beam tracking method and an original beam tracking method according to the present invention.

According to the foregoing assumption, because in enhanced beam tracking of the present invention, switching may be performed from an NLOS link to a LOS link within a short time period after the LOS link is recovered, a throughput rate in enhanced beam tracking of the present invention is greatly improved as compared with original beam tracking, as shown in FIG. 15. A horizontal axis represents a blockage probability, using a unit of second, and a vertical axis represents the throughput rate, using a unit of 1000 gigabit per second (Gbps). A line b represents enhanced beam tracking of the present invention, that is, a recommended mode in FIG. 15, and a line a represents original beam tracking, that is, an original mode in FIG. 15.

By means of the beam tracking method provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a frame header of a physical layer frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Figure 16:
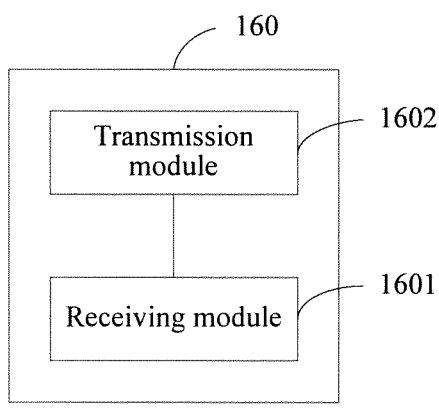
FIG. 16 is a schematic diagram of a beam tracking device according to the present invention.

An embodiment of the present invention provides a beam tracking device 160, which, as shown in FIG. 16, includes:

a transmission module 1601, configured to transmit a beam tracking request to a beam tracking responder; and a receiving module 1602, configured to receive an enhanced beam tracking training auxiliary sequence transmitted, according to the enhanced beam tracking request, by the beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link, where the transmission module 1601 is further configured to: when it is determined according to a reception detection result of the enhanced beam tracking training auxiliary sequence that it is necessary to switch to a backup beam link, transmit first link switching information to the beam tracking responder, where the first link switching information is used to instruct the beam tracking initiator and the beam tracking responder to switch to a second backup beam link.

The transmission module 1601 is specifically configured to: if the current beam link via which the beam tracking initiator and the beam tracking responder perform communication is an optimal link after beamforming, and the beam tracking initiator detects that signal attenuation of the current beam link exceeds a preset threshold, transmit the beam tracking request to the beam tracking responder; or, if the current beam link via which the beam tracking initiator and the beam tracking responder perform communication is a second optimal link after beamforming, and the beam tracking initiator detects that an optimal link after beamforming is recovered, transmit the beam tracking request to the beam tracking responder.

Specifically, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

The receiving module 1602 is specifically configured to receive the beam tracking training auxiliary sequence unit, of the current beam link, transmitted by using the current beam link by the beam tracking responder, the beam tracking training auxiliary sequence unit, of the proximate selectable beam link of the current beam link, transmitted by using the proximate selectable beam link of the current beam link, and the beam tracking training auxiliary sequence unit, of the first backup beam link, transmitted by using the first backup beam link.

Furthermore, the transmission module 1601 is further configured to: before the beam tracking request is transmitted to the beam tracking responder, transmit enhanced beam tracking information to the beam tracking responder, where the enhanced beam tracking information includes: information of the first backup beam link and an identity of requesting the beam tracking responder to transmit the enhanced beam tracking training auxiliary sequence; and the receiving module 1602 is further configured to receive response information transmitted by the beam tracking responder, where the response information is used to instruct the beam tracking responder whether to transmit the enhanced beam tracking training auxiliary sequence.

Optionally, the transmission module 1601 may transmit the enhanced beam tracking information to the beam tracking responder in a sector-level sweep SLS phase; or, Alternatively, optionally, the transmission module 1601 may further transmit the enhanced beam tracking information to the beam tracking responder in a beam refinement protocol BRP phase.

The enhanced beam tracking information is in an enhanced beam tracking information unit of a media access control MAC layer.

Furthermore, the transmission module 1601 may transmit, to the beam tracking responder, an SSW frame or an SSW-feedback including, in the SLS phase, the enhanced beam tracking information unit; or, the transmission module may transmit, to the beam tracking responder, a beam refinement protocol BRP frame including, in the BRP phase, the enhanced beam tracking information unit.

Furthermore, the receiving module 1602 receives an SSW frame or an SSW-feedback, carrying an enhanced beam tracking information unit of the response information, transmitted by the beam tracking responder; or, the receiving module receives a BRP frame, carrying an enhanced beam tracking information unit of the response information, transmitted by the beam tracking responder.

Furthermore, the enhanced beam tracking information unit includes: an Element ID, used to represent an ID of a current information unit; a Length, used to represent a length of the current information unit; a Backup AWV Setting, used to whether to update an antenna vector setting of a peer backup; a Peer Tx_Sector ID, used to represent whether a peer transmit-sector identity needs to be backed up; a Peer Tx_Antenna ID, used to represent a peer transmit-antenna identity needs to be backed up; an E-BT-R Request, used to represent whether to request a peer to receive a training auxiliary sequence according to an enhanced beam tracking mode; an E-BR-R OK, used to represent whether itself receives a training auxiliary sequence of an enhanced beam tracking mode; an E-BT-T Request, used to represent whether to request a peer to transmit a training auxiliary sequence according to an enhanced beam tracking mode; and an E-BR-T OK, used to represent whether itself transmits a training auxiliary sequence of an enhanced beam tracking mode.

Furthermore, the transmission module 1601 further is configured to transmit to the beam tracking responder, first link switching information carried in a BRP frame header of a physical layer frame.

Furthermore, the enhanced beam tracking information unit further includes: a Switch to Backup AWV, used to represent whether to switch to a backup link in a next frame and use an antenna configuration of a current link as an antenna configuration of the backup link.

In that way, the transmission module is further configured to transmit, to the beam tracking responder, an SSW frame or an SSW-feedback carrying an enhanced beam tracking information unit of the first link switching information; or, transmit, to the beam tracking responder, a BRP frame carrying an enhanced beam tracking information unit of the first link switching information.

Figure 17:
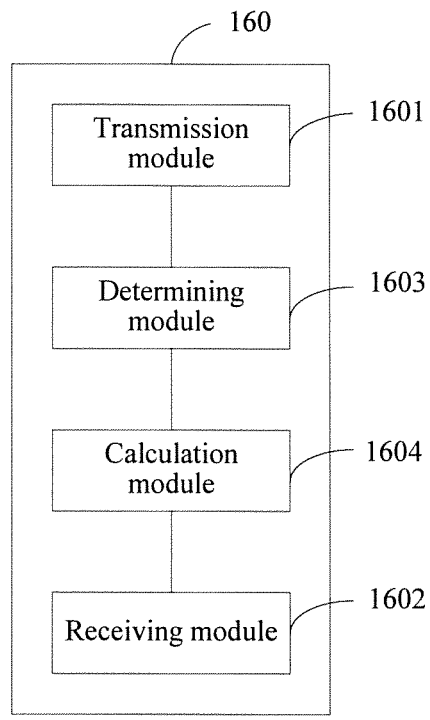
FIG. 17 is a schematic diagram of another beam tracking device according to the present invention.

Furthermore, the device 160 further includes: a determining module 1603 and a calculation module 1604, as shown in FIG. 17.

If the current beam link via which the beam tracking initiator and the beam tracking responder perform communication is an optimal link after beamforming or a proximate selectable beam link of the optimal link, the determining module 1603 is configured to determine whether it is necessary to switch to a backup beam link in the next frame; and the calculation module 1604 is configured to: in a case in which the determining module 1603 determines that it is necessary to switch to a backup beam link, calculate an azimuth of the second backup beam link that needs to be switched to in the next frame, and an azimuth of a backup beam link when the second backup beam link is used as a current link.

Furthermore, the calculation module is further configured to: in a case in which the determining module determines that it is not necessary to switch to a backup beam link, calculate an azimuth of a beam link of the next frame.

Figure 18:
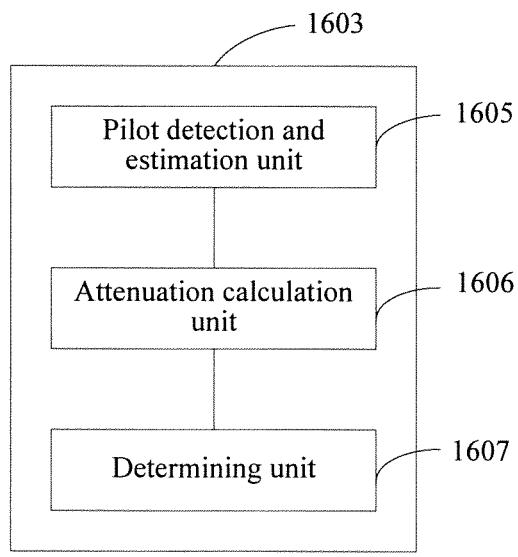
FIG. 18 is a schematic diagram of another beam tracking device according to the present invention.

Furthermore, the determining module 1603 includes: a pilot detection and estimation unit 1605, an attenuation calculation unit 1606, and a determining unit 1607, as shown in FIG. 18.

The pilot detection and estimation unit 1605 is configured to perform pilot detection and estimation separately on the current beam link, the proximate selectable beam link of the current beam link, and the first backup beam link, to obtain the reception detection result of the enhanced beam tracking training auxiliary sequence.

The attenuation calculation unit 1606 is configured to calculate, according to the reception detection result of the enhanced beam tracking training auxiliary sequence and received signal energy of the optimal link, signal power attenuation caused by antenna rotation and signal power attenuation caused by a link blockage.

The determining unit 1607 is configured to determine whether an antenna is rotated according to the signal power attenuation caused by antenna rotation and a rotation attenuation threshold, and determine, according to the signal power attenuation caused by a link blockage and a blockage threshold, whether it is necessary to switch to a backup beam link in the next frame.

Furthermore, the calculation module 1604 is specifically configured to calculate, according to a determining result of whether the antenna is rotated, a determining result of whether it is necessary to switch to a backup beam link in the next frame, an azimuth of an optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link.

The reception detection result, of the enhanced beam tracking training auxiliary sequence, obtained by the pilot detection and estimation unit 1605 includes: an azimuth of a maximum received energy beam and maximum received signal energy in the proximate selectable beam link of the current beam link, received signal energy of the current beam link, and received signal energy of the backup beam link.

Figure 19:
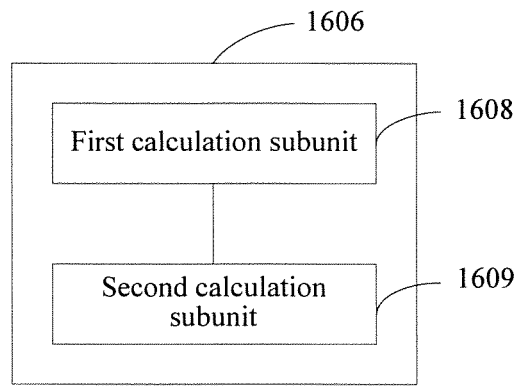
FIG. 19 is a schematic diagram of another beam tracking device according to the present invention.

The attenuation calculation unit 1606 includes: a first calculation subunit 1608 and a second calculation subunit 1609, as shown in FIG. 19.

The first calculation subunit 1608 is configured to calculate the signal attenuation of the current beam link according to a first formula.

The second calculation subunit 1609 is configured to calculate, according to the signal attenuation, of the current beam link, obtained through calculation by the first calculation subunit, and by using a second formula, the signal power attenuation caused by antenna rotation and the signal power attenuation caused by a link blockage, where the first formula is:

$$\begin{cases} S_{curr}(t) = P_{optimal} - P_{curr}(t) \\ S_{max\_power}(t) = P_{optimal} - P_{max\_power}(t) \end{cases}$$

where $S_{curr}(t)$ represents the current beam link signal power attenuation, $S_{max\_power}(t)$ represents attenuation of maximum received signal energy in the proximate selectable beam link of the current beam link and received signal energy of an optimal beam link, $P_{optimal}$ represents the received signal energy of the optimal beam link, $P_{max\_power}$ represents the maximum received signal energy in the proximate selectable beam link of the current beam link, and $P_{curr}$ represents signal energy of the current beam link; and the second formula is:

$$\begin{bmatrix} S_{max\_power}(t) \\ S_{curr}(t) \end{bmatrix} = \begin{bmatrix} 0 & 1 \\ 1 & 1 \end{bmatrix} \begin{bmatrix} S_R(t) \\ S_B(t) \end{bmatrix}$$

where $S_R(t)$ represents the signal power attenuation caused by antenna rotation, $S_B(t)$ represents the signal power attenuation caused by link blockage, $S_{curr}(t)$ represents the signal attenuation of the current beam link, and $S_{max\_power}(t)$ represents the attenuation of the maximum received signal energy in the proximate selectable beam link of the current beam link and the received signal energy of the optimal beam link.

The determining unit 1607 is specifically configured to: if $S_R(t) > \Gamma_R$, determine that an antenna is rotated, and set a flag bit to $F_R=1$, or otherwise $F_R=0$; if $S_B(t) > \Gamma_B$ or $P_{curr\_alter} > P_{max\_power}$, determine that it is necessary to switch to a backup beam link in the next frame, and set a flag bit to $F_{switch}=1$, or otherwise $F_{switch}=0$, where $\Gamma_R$ represents a threshold of signal power attenuation caused by antenna rotation, $\Gamma_B$ represents a threshold of signal power attenuation caused by link blockage, $S_R(t)$ represents the signal power attenuation caused by antenna rotation, $S_B(t)$ represents the signal power attenuation caused by link blockage, $F_{switch}$ represents an identity of whether to switch to a second backup link, and $\Gamma_R$ represents an identity of whether an antenna is rotated.

The calculation module 1604 is specifically configured to calculate the azimuth of the second backup beam link that needs to be switched to in the next frame according to a third formula, and the azimuth of the backup beam link when the second backup beam link is used as the current link, where the third formula is:

$$\begin{cases} \theta_{next} = \theta_{alter} + (\theta_{max\_power} - \theta_{curr}) \times F_R, F_{switch} = 1 \\ \theta_{next\_alter} = \theta_{curr} + (\theta_{max\_power} - \theta_{curr}) \times F_R, F_{switch} = 1 \end{cases}$$

where $\theta_{next}$ represents the azimuth of the second backup beam link to be switched to in the next frame, next $\theta_{next\_alter}$ represents the azimuth of the backup beam link, $\theta_{curr}$ represents the azimuth of the optimal beam link, $\theta_{alter}$ represents an azimuth of the first backup beam link, $\theta_{max\_power}$ represents an azimuth of a maximum received energy beam link in the proximate selectable beam link of the current beam link, $F_{switch}$ represents a flag identity of whether to switch to a backup beam link, and $F_R$ represents an identity of whether an antenna is rotated.

The calculation module 1604 is specifically further configured to: in a case in which the determining unit determines that it is not necessary to switch to a backup beam link, calculate the azimuth of the beam link of the next frame according to a fourth formula, where the fourth formula is:

$$\begin{cases} \theta_{next} = \theta_{curr} + (\theta_{max\_power} - \theta_{curr}) \times F_R, F_{switch} = 0 \\ \theta_{next\_alter} = \theta_{alter} + (\theta_{max\_power} - \theta_{curr}) \times F_R, F_{switch} = 0 \end{cases}$$

where $\theta_{next}$ represents the azimuth of the second backup beam link to be switched to in the next frame, $\theta_{next\_alter}$ represents the azimuth of the backup beam link, $\theta_{curr}$ represents the azimuth of the optimal beam link, $\theta_{alter}$ represents an azimuth of the first backup beam link, $\theta_{max\_power}$ represents an azimuth of a maximum received energy beam link in the proximate selectable beam link of the current beam link, $F_{switch}$ represents an identity of whether to switch to a backup beam link, and $F_R$ represents an identity of whether an antenna is rotated.

Figure 20:
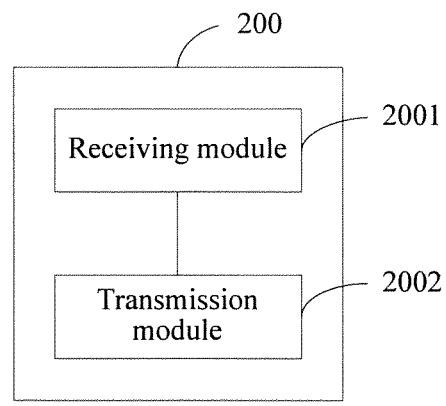
FIG. 20 is a schematic diagram of another beam tracking device according to the present invention.

The present invention provides a beam tracking device 200, which, as shown in FIG. 20, includes:

a receiving module 2001, configured to receive a beam tracking request transmitted by a beam tracking initiator; and a transmission module 2002, configured to transmit an enhanced beam tracking training auxiliary sequence to the beam tracking initiator according to the received beam tracking request, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link, where the receiving module 2001 is further configured to receive first link switching information transmitted by the beam tracking initiator, where the first link switching information is used to instruct the beam tracking initiator and the beam tracking responder to switch to a second backup beam link.

The receiving module 2001 is specifically configured to: if the current beam link via which the beam tracking initiator and the beam tracking responder perform communication is an optimal link after beamforming, and the beam tracking initiator detects that signal attenuation of the current beam link exceeds a preset threshold, receive the beam tracking request transmitted by the beam tracking initiator; or, if the current beam link via which the beam tracking initiator and the beam tracking responder perform communication is a second optimal link after beamforming, and the beam tracking initiator detects that an optimal link after beamforming is recovered, receive the beam tracking request transmitted by the beam tracking initiator.

Specifically, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

The transmission module 2002 is specifically configured to transmit the beam tracking training auxiliary sequence unit of the current beam link to the beam tracking initiator by using the current beam link, transmit the beam tracking training auxiliary sequence unit of the proximate selectable beam link of the current beam link to the beam tracking initiator by using the proximate selectable beam link of the current beam link, and transmit the beam tracking training auxiliary sequence unit of the first backup beam link to the beam tracking initiator by using the first backup beam link.

Furthermore, the receiving module 2001 is further configured to: before the beam tracking request transmitted by the beam tracking initiator is received, receive enhanced beam tracking information transmitted by the beam tracking initiator, where the enhanced beam tracking information includes: information of the first backup beam link and an identity of requesting the beam tracking responder to transmit the enhanced beam tracking training auxiliary sequence; and the transmission module 2002 is further configured to transmit response information to the beam tracking initiator according to the received enhanced beam tracking information, where the response information is used to instruct the beam tracking responder whether to transmit the enhanced beam tracking training auxiliary sequence.

Optionally, the receiving module 2001 may receive the enhanced beam tracking information transmitted by the beam tracking initiator in a sector-level sweep SLS phase.

Alternatively, optionally, the receiving module 2001 may receive the enhanced beam tracking information transmitted by the beam tracking initiator in a beam refinement protocol BRP phase.

Specifically, the enhanced beam tracking information is in an enhanced beam tracking information unit of a media access control MAC layer.

Furthermore, the receiving module 2001 is further configured to receive an SSW frame or an SSW-feedback that is transmitted by the beam tracking initiator and that includes, in an SLS phase, the enhanced beam tracking information; or, receive a beam refinement protocol BRP frame, including the enhanced beam tracking information, transmitted by the beam tracking initiator in a BRP phase.

Furthermore, the transmission module 2002 is further configured to transmit, according to the received enhanced beam tracking information, an SSW frame or an SSW-feedback carrying an enhanced beam tracking information unit of the response information; or, transmit, to the beam tracking initiator according to the received enhanced beam tracking information, a BRP frame carrying an enhanced beam tracking information unit of the response information.

Specifically, the enhanced beam tracking information unit includes: an Element ID, used to represent an ID of a current information unit; a Length, used to represent a length of the current information unit; a Backup AWV Setting, used to whether to update an antenna vector setting of a peer backup; a Peer Tx_Sector ID, used to represent whether a peer transmit-sector identity needs to be backed up; a Peer Tx_Antenna ID, used to represent whether a peer transmit-antenna identity needs to be backed up; an E-BT-R Request, used to represent whether to request a peer to receive a training auxiliary sequence according to an enhanced beam tracking mode; an E-BR-R OK, used to represent whether itself receives a training auxiliary sequence of an enhanced beam tracking mode; an E-BT-T Request, used to represent whether to request a peer to transmit a training auxiliary sequence according to an enhanced beam tracking mode; and an E-BR-T OK, used to represent whether itself transmits a training auxiliary sequence of an enhanced beam tracking mode.

Furthermore, the enhanced beam tracking information unit further includes: a Switch to Backup AWV, used to represent whether to switch to a backup beam link in a next frame and use an antenna configuration of the current beam link as an antenna configuration of the backup beam link in the next frame.

Figure 21:
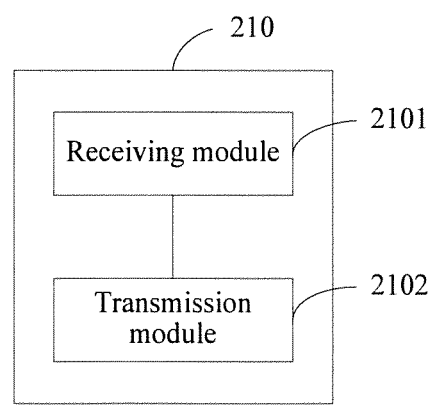
FIG. 21 is a schematic diagram of another beam tracking device according to the present invention.

The present invention provides a beam tracking device 210, which, as shown in FIG. 21, includes:

a transmission module 2101, configured to transmit a beam tracking request and an enhanced beam tracking training auxiliary sequence to a beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link; and a receiving module 2102, configured to receive a reception detection result of the enhanced beam tracking training auxiliary sequence transmitted by the beam tracking responder, where the transmission module 2101 is further configured to: when it is determined according to received beam link information that is transmitted by the beam tracking responder and that is obtained through measurement of current beam tracking that it is necessary to switch to a backup link, transmit first link switching information to the beam responder, where the first link switching information is used to instruct the beam tracking initiator and a beam tracking responder to switch to a second backup beam link.

The transmission module 2101 is specifically configured to: if the current beam link via which the beam tracking initiator and the beam tracking responder perform communication is an optimal link after beamforming, and the beam tracking initiator detects that signal attenuation of the current beam link exceeds a preset threshold, transmit the beam tracking request and the enhanced beam tracking training auxiliary sequence to the beam tracking responder; or, if the current beam link via which the beam tracking initiator and the beam tracking responder perform communication is a second optimal link after beamforming, and the beam tracking initiator detects that an optimal link after beamforming is recovered, transmit the beam tracking request and the enhanced beam tracking training auxiliary sequence to the beam tracking responder.

Specifically, the beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

The transmission module 2101 is specifically configured to transmit the beam tracking training auxiliary sequence unit of the current beam link to the beam tracking responder by using the current beam link, transmit the beam tracking training auxiliary sequence unit of the proximate selectable beam link of the current beam link to the beam tracking responder by using the proximate selectable beam link of the current beam link, and transmit the beam tracking training auxiliary sequence unit of the first backup beam link to the beam tracking responder by using the first backup beam link.

Furthermore, the receiving module 2102 is further configured to: before the beam tracking request and the enhanced beam tracking training auxiliary sequence are transmitted to the beam tracking responder, receive enhanced beam tracking information transmitted by the beam tracking responder, where the enhanced beam tracking information includes: information of the first backup beam link and an identity of requesting the beam tracking initiator to transmit the enhanced beam tracking training auxiliary sequence; and the transmission module 2101 is further configured to transmit response information to the beam tracking responder according to the received enhanced beam tracking information, where the response information is used to instruct the beam tracking initiator whether to transmit the enhanced beam tracking training auxiliary sequence.

Optionally, the receiving module 2102 is specifically configured to receive the enhanced beam tracking information transmitted by the beam tracking responder in a sector-level sweep SLS phase.

Alternatively, optionally, the receiving module 2102 is specifically configured to receive the enhanced beam tracking information transmitted by the beam tracking responder in a BRP phase.

The enhanced beam tracking information is in an enhanced beam tracking information unit of a media access control MAC layer.

Furthermore, the receiving module 2102 is further configured to receive an SSW frame or an SSW-feedback, including the enhanced beam tracking information unit, transmitted by the beam tracking responder in the SLS phase; or, receive a beam refinement protocol BRP frame, including the enhanced beam tracking information unit, transmitted by the beam tracking responder in the BRP phase.

Furthermore, the transmission module 2101 is further configured to transmit, to the beam tracking responder, an SSW frame or an SSW-feedback carrying an enhanced beam tracking information unit of the response information; or, transmit, to the beam tracking responder, a BRP frame carrying an enhanced beam tracking information unit of the response information.

Specifically, the enhanced beam tracking information unit includes: an Element ID, used to represent an ID of a current information unit; a Length, used to represent a length of the current information unit; a Backup AWV Setting, used to whether to update an antenna vector setting of a peer backup; a Peer Tx_Sector ID, used to represent whether a peer transmit-sector identity needs to be backed up; a Peer Tx_Antenna ID, used to represent a peer transmit-antenna identity needs to be backed up; an E-BT-R Request, used to represent whether to request a peer to receive a training auxiliary sequence according to an enhanced beam tracking mode; an E-BR-R OK, used to represent whether itself receives a training auxiliary sequence of an enhanced beam tracking mode; an E-BT-T Request, used to represent whether to request a peer to transmit a training auxiliary sequence according to an enhanced beam tracking mode; and an E-BR-T OK, used to represent whether itself transmits a training auxiliary sequence of an enhanced beam tracking mode.

Furthermore, the transmission module 2101 is further configured to transmit, to the beam tracking responder, the first link switching information carried in a frame header of a physical layer frame.

Furthermore, the enhanced beam tracking information unit further includes: a Switch to Backup AWV, used to represent whether to switch to a backup link in a next frame and use an antenna configuration of a current link as an antenna configuration of the backup link.

Furthermore, the transmission module 2101 is further configured to transmit, to the beam tracking responder, an SSW frame or an SSW-feedback carrying an enhanced beam tracking information unit of the first link switching information; or, transmit, to the beam tracking responder, a BRP frame carrying an enhanced beam tracking information unit of the first link switching information.

Figure 22:
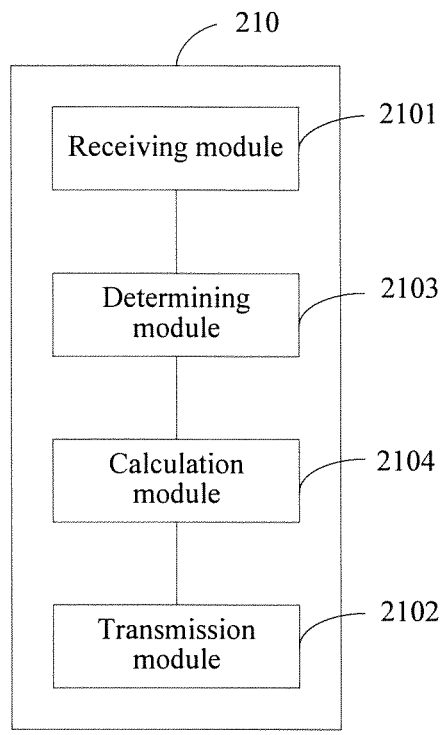
FIG. 22 is a schematic diagram of another beam tracking device according to the present invention.

Furthermore, the device 210 further includes: a determining module 2103 and a calculation module 2104, as shown in FIG. 22.

If the current beam link via which the beam tracking initiator and the beam tracking responder perform communication is the optimal link after beamforming and a proximate beam link of the optimal link, the determining module 2103 is configured to determine whether it is necessary to switch to a backup beam link in the next frame; and the calculation module 2104 is configured to: in a case in which the determining module determines that it is necessary to switch to a backup beam link, calculate an azimuth of the second backup beam link that needs to be switched to in the next frame, and an azimuth of a backup beam link when the second backup beam link is used as a current link.

Furthermore, the calculation module 2104 is further configured to: in a case in which the determining module determines that it is not necessary to switch to a backup beam link, calculate an azimuth of a beam link of the next frame.

Figure 23:
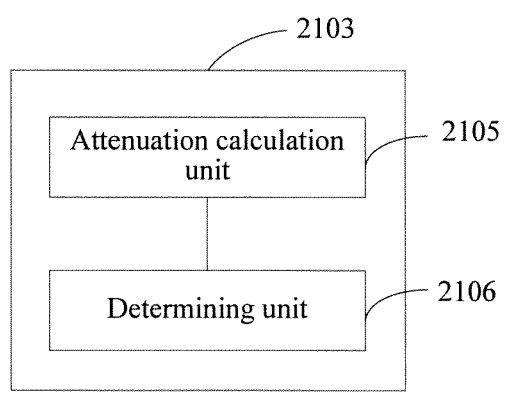
FIG. 23 is a schematic diagram of another beam tracking device according to the present invention.

Furthermore, the determining module 2103 includes: an attenuation calculation unit 2105 and a determining unit 2106, as shown in FIG. 23.

The attenuation calculation unit 2105 is configured to calculate, according to the reception detection result of the enhanced beam tracking training auxiliary sequence and received signal energy of the optimal link, signal power attenuation caused by antenna rotation and signal power attenuation caused by a link blockage.

The determining unit 2106 is configured to determine whether an antenna is rotated according to the signal power attenuation caused by antenna rotation and a rotation attenuation threshold, and determine, according to the signal power attenuation caused by a link blockage and a blockage threshold, whether it is necessary to switch to a backup beam link in the next frame.

Furthermore, the calculation module 2104 is specifically configured to calculate, according to a determining result of whether the antenna is rotated, a determining result of whether it is necessary to switch to a backup beam link in the next frame, an azimuth of an optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link.

The reception detection result of the enhanced beam tracking training auxiliary sequence includes: an azimuth of a maximum received energy beam and maximum received signal energy in the proximate selectable beam link of the current beam link, received signal energy of the current beam link, and received signal energy of the backup beam link.

Figure 24:
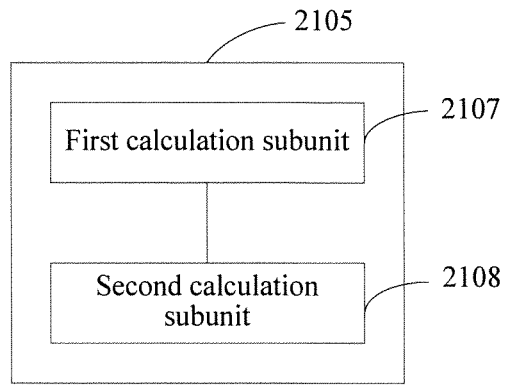
FIG. 24 is a schematic diagram of another beam tracking device according to the present invention.

Furthermore, the attenuation calculation unit 2105 includes: a first calculation subunit 2107 and a second calculation subunit 2108, as shown in FIG. 24.

The first calculation subunit 2107 is configured to calculate the signal attenuation of the current beam link according to a first formula.

The second calculation subunit 2108 is configured to calculate, according to the signal attenuation, of the current beam link, obtained through calculation by the first calculation subunit, and by using a second formula, the signal power attenuation caused by antenna rotation and the signal power attenuation caused by a link blockage, where
the first formula is:

$$\begin{cases} S_{curr}(t) = P_{optimal} - P_{curr}(t) \\ S_{max\_power}(t) = P_{optimal} - P_{max\_power}(t) \end{cases}$$

where $S_{curr}(t)$ represents the current beam link signal power attenuation, $S_{max\_power}(t)$ represents attenuation of maximum received signal energy in the proximate selectable beam link of the current beam link and received signal energy of an optimal beam link, $P_{optimal}$ represents the received signal energy of the optimal beam link, $P_{max\_power}$ represents the maximum received signal energy in the proximate selectable beam link of the current beam link, and $P_{curr}$ represents signal energy of the current beam link; and
the second formula is:

$$\begin{bmatrix} S_{max\_power}(t) \\ S_{curr}(t) \end{bmatrix} = \begin{bmatrix} 0 & 1 \\ 1 & 1 \end{bmatrix} \begin{bmatrix} S_R(t) \\ S_B(t) \end{bmatrix}$$

where $S_R(t)$ represents the signal power attenuation caused by antenna rotation, $S_B(t)$ represents the signal power attenuation caused by link blockage, $S_{curr}(t)$ represents the signal attenuation of the current beam link, and $S_{max\_power}(t)$ represents the attenuation of the maximum received signal energy in the proximate selectable beam link of the current beam link and the received signal energy of the optimal beam link.

Furthermore, the determining unit 2106 is specifically configured to: if $S_R(t) > \Gamma_R$, determine that an antenna is rotated, and set a flag bit to $F_R=1$, or otherwise $F_R=0$; if $S_B(t) > \Gamma_B$ or $P_{curr\_alter} > P_{max\_power}$, determine that it is necessary to switch to a backup beam link in the next frame, and set a flag bit to $F_{switch}=1$, or otherwise $F_{switch}=0$,
where $\Gamma_R$ represents a threshold of signal power attenuation caused by antenna rotation, $\Gamma_B$ represents a threshold of signal power attenuation caused by link blockage, $S_R(t)$ represents the signal power attenuation caused by antenna rotation, $S_B(t)$ represents the signal power attenuation caused by link blockage, $F_{switch}$ represents an identity of whether to switch to a second backup beam link, and $\Gamma_R$ represents an identity of whether an antenna is rotated.

Furthermore, the calculation module 2104 is specifically configured to calculate, according to a third formula, the azimuth of the second backup beam link that needs to be switched to in the next frame, and the azimuth of the backup beam link when the second backup beam link is used as the current link, where
the third formula is:

$$\begin{cases} \theta_{next} = \theta_{alter} + (\theta_{max\_power} - \theta_{curr}) \times F_R, F_{switch} = 1 \\ \theta_{next\_alter} = \theta_{curr} + (\theta_{max\_power} - \theta_{curr}) \times F_R, F_{switch} = 1 \end{cases}$$

where $\theta_{next}$ represents the azimuth of the second backup beam link to be switched to in the next frame, $\theta_{next\_alter}$ represents the azimuth of the backup beam link, $\theta_{curr}$ represents the azimuth of the optimal beam link, $\theta_{alter}$ represents an azimuth of the first backup beam link, $\theta_{max\_power}$ represents an azimuth of a maximum received energy beam link in the proximate selectable beam link of the current beam link, $F_{switch}$ represents a flag identity of whether to switch to a backup beam link, and $F_R$ represents an identity of whether an antenna is rotated.

Furthermore, the calculation module 2104 is specifically further configured to: in a case in which the determining unit determines that it is not necessary to switch to a backup beam link, calculate the azimuth of the beam link of the next frame according to a fourth formula, where
the fourth formula is:

$$\begin{cases} \theta_{next} = \theta_{curr} + (\theta_{max\_power} - \theta_{curr}) \times F_R, F_{switch} = 0 \\ \theta_{next\_alter} = \theta_{alter} + (\theta_{max\_power} - \theta_{curr}) \times F_R, F_{switch} = 0 \end{cases}$$

where $\theta_{next}$ represents the azimuth of the second backup beam link to be switched to in the next frame, $\theta_{next\_alter}$ represents the azimuth of the backup beam link, $\theta_{curr}$ represents the azimuth of the optimal beam link, $\theta_{alter}$ represents an azimuth of the first backup beam link, $\theta_{max\_power}$ represents an azimuth of a maximum received energy beam link in the proximate selectable beam link of the current beam link, $F_{switch}$ represents an identity of whether to switch to a backup beam link, and $F_R$ represents an identity of whether an antenna is rotated.

Figure 25:
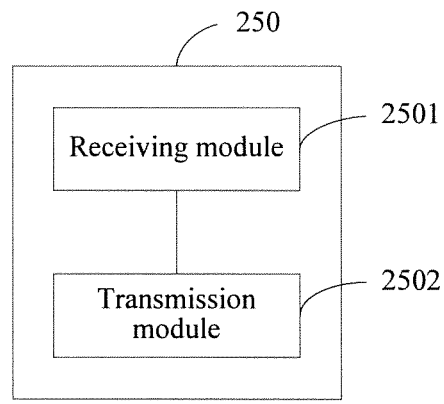
FIG. 25 is a schematic diagram of another beam tracking device according to the present invention.

The present invention provides a beam tracking device 250, which, as shown in FIG. 25, includes:
a receiving module 2501, configured to receive a beam tracking request and an enhanced beam tracking training auxiliary sequence that are transmitted by a beam tracking initiator, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link; and
a transmission module 2502, configured to transmit a reception detection result of the enhanced beam tracking training auxiliary sequence to the beam tracking initiator according to the received beam tracking request and enhanced beam tracking training auxiliary sequence, where
the receiving module 2501 is further configured to receive first link switching information transmitted by the beam tracking initiator, where the first link switching information is used to instruct the beam tracking initiator and the beam tracking responder to switch to a second backup beam link.

Specifically, the receiving module 2501 is specifically configured to: if the current beam link via which the beam tracking initiator and the beam tracking responder perform communication is an optimal link after beamforming, and the beam tracking initiator detects that signal attenuation of the current beam link exceeds a preset threshold, receive the beam tracking request and the enhanced beam tracking training auxiliary sequence that are transmitted by the beam tracking initiator; or,
if the current beam link via which the beam tracking initiator and the beam tracking responder perform communication is a second optimal link after beamforming, and the beam tracking initiator detects that an optimal link after beamforming is recovered, receive the beam tracking request and the enhanced beam tracking training auxiliary sequence that are transmitted by the beam tracking initiator.

The beam tracking training auxiliary sequence unit of the current beam link includes: an automatic gain control AGC field and a training sequence TRN field of the current beam link;

the beam tracking training auxiliary sequence unit of the proximate selectable beam link of the current beam link includes: an AGC field and a TRN field of the proximate selectable beam link of the current beam link; and the beam tracking training auxiliary sequence unit of the first backup beam link includes: a short training sequence STF field and a channel estimation CE field of the first backup beam link.

The receiving module 2501 is specifically configured to receive the beam tracking training auxiliary sequence unit, of the current beam link, transmitted by using the current beam link by the beam tracking initiator, receive the beam tracking training auxiliary sequence unit, of the proximate selectable beam link of the current beam link, transmitted by using the proximate selectable beam link of the current beam link by the beam tracking initiator, and receive the beam tracking training auxiliary sequence unit, of the first backup beam link, transmitted by using the first backup beam link by the beam tracking initiator.

Furthermore, the transmission module 2502 is further configured to transmit enhanced beam tracking information to the beam tracking initiator, where the enhanced beam tracking information includes: information of the first backup beam link and an identity of requesting the beam tracking initiator to transmit the enhanced beam tracking training auxiliary sequence; and the receiving module 2501 is further configured to receive response information transmitted by the beam tracking initiator, where the response information is used to instruct the beam tracking initiator whether to transmit the enhanced beam tracking training auxiliary sequence.

Optionally, the transmission module 2502 may transmit the enhanced beam tracking information to the beam tracking initiator in a sector-level sweep SLS phase.

Alternatively, optionally, the transmission module 2502 may transmit the enhanced beam tracking information to the beam tracking initiator in a beam refinement protocol BRP phase.

Specifically, the enhanced beam tracking information is in an enhanced beam tracking information unit of a media access control MAC layer.

Furthermore, the transmission module 2502 is further configured to transmit, to the beam tracking initiator, an SSW frame or an SSW-feedback including, in the SLS phase, the enhanced beam tracking information unit; or, transmit, to the beam tracking initiator, a beam refinement protocol BRP frame including, in the BRP phase, the enhanced beam tracking information unit.

Furthermore, the receiving module 2501 is further configured to receive an SSW frame or an SSW-feedback, carrying an enhanced beam tracking information unit of the response information, transmitted by the beam tracking initiator; or, receive a BRP frame, carrying an enhanced beam tracking information unit of the response information, transmitted by the beam tracking initiator.

The enhanced beam tracking information unit includes: an Element ID, used to represent an ID of a current information unit; a Length, used to represent a length of the current information unit; a Backup AWV Setting, used to whether to update an antenna vector setting of a peer backup beam link; a Peer Tx_Sector ID, used to represent whether a peer transmit-sector identity needs to be backed up; a Peer Tx_Antenna ID, used to represent whether a peer transmit-antenna identity needs to be backed up; an E-BT-R Request, used to represent whether to request a peer to receive a training auxiliary sequence according to an enhanced beam tracking mode; an E-BR-R OK, used to represent whether itself receives a training auxiliary sequence of an enhanced beam tracking mode; an E-BT-T Request, used to represent whether to request a peer to transmit a training auxiliary sequence according to an enhanced beam tracking mode; and an E-BR-T OK, used to represent whether itself transmits a training auxiliary sequence of an enhanced beam tracking mode.

Furthermore, the enhanced beam tracking information unit further includes: a Switch to Backup Link identity Switch to Backup AWV, used to represent whether to switch to a backup link in a next frame and use an antenna configuration of a current link as an antenna configuration of the backup link.

The present invention provides a beam tracking system, including: the foregoing beam tracking device 160, and the foregoing beam tracking device 200; or, the foregoing beam tracking device 210, and the foregoing beam tracking device 250.

By means of the beam tracking device and system provided in this embodiment of the present invention, in a process of beam tracking, at the same time when a proximate beam link of a current link is being detected, detection is performed on a preset backup beam link, and when more desirable communication quality can be obtained on the backup beam link, information about switching to a backup link is carried in a MAC frame or a frame header of a physical layer frame, so as to switch from an optimal beam link to the backup link in time, thereby avoiding a link interruption and improving a throughput of a system link; meanwhile, when communication is performed on a nonoptimal link, it can be detected at an exceedingly low cost whether an optimal link is recovered, and when the optimal link is recovered, switching is performed from the nonoptimal link to the optimal link in time, so that a throughput rate of the system link can also be effectively improved.

Figure 26:
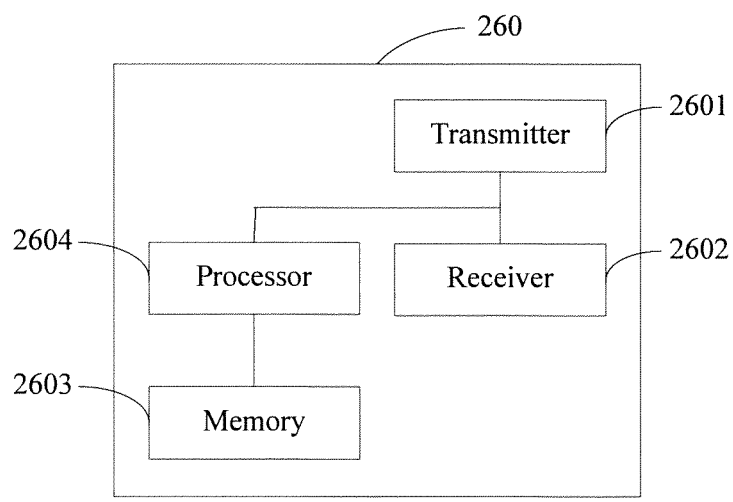
FIG. 26 is a schematic diagram of another physical beam tracking apparatus according to the present invention.

The present invention provides a beam tracking device 260, which, as shown in FIG. 26, includes: a transmitter 2601, a receiver 2602, a memory 2603, and a processor 2604.

The transmitter 2601 is configured to transmit a beam tracking request to a beam tracking responder.

The receiver 2602 is configured to receive an enhanced beam tracking training auxiliary sequence transmitted, according to the enhanced beam tracking request, by the beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link.

The transmitter 2601 is further configured to: when it is determined according to a reception detection result of the enhanced beam tracking training auxiliary sequence that it is necessary to switch to a backup beam link, transmit first link switching information to the beam tracking responder, where the first link switching information is used to instruct a beam tracking initiator and the beam tracking responder to switch to a second backup beam link.

The transmitter 2601 is specifically configured to: if the current beam link via which the beam tracking initiator and the beam tracking responder perform communication is an optimal link after beamforming, and the beam tracking initiator detects that signal attenuation of the current beam link exceeds a preset threshold, transmit the beam tracking request to the beam tracking responder; or, if the current beam link via which the beam tracking initiator and the beam tracking responder perform communication is a second optimal link after beamforming, and the beam tracking initiator detects that an optimal link after beamforming is recovered, transmit the beam tracking request to the beam tracking responder.

The receiver 2602 is specifically configured to receive the beam tracking training auxiliary sequence unit, of the current beam link, transmitted by using the current beam link by the beam tracking responder, the beam tracking training auxiliary sequence unit, of the proximate selectable beam link of the current beam link, transmitted by using the proximate selectable beam link of the current beam link, and the beam tracking training auxiliary sequence unit, of the first backup beam link, transmitted by using the first backup beam link.

Furthermore, the transmitter 2601 is further configured to: before the beam tracking request is transmitted to the beam tracking responder, transmit enhanced beam tracking information to the beam tracking responder, where the enhanced beam tracking information includes: information of the first backup beam link and an identity of requesting the beam tracking responder to transmit the enhanced beam tracking training auxiliary sequence; and the receiver 2602 is further configured to, receive response information transmitted by the beam tracking responder, where the response information is used to instruct the beam tracking responder whether to transmit the enhanced beam tracking training auxiliary sequence.

The memory 2603 is configured to store a beam tracking detection algorithm; and the processor 2604 is configured to invoke a detection unit stored in the memory 2603 to: if the current beam link via which the beam tracking initiator and the beam tracking responder perform communication is an optimal link after beamforming or a proximate selectable beam link of the optimal link, determine whether it is necessary to switch to a backup beam link in a next frame; and in a case in which it is determined that it is necessary to switch to a backup beam link, calculate an azimuth of the second backup beam link that needs to be switched to in the next frame, and an azimuth of a backup beam link when the second backup beam link is used as a current link.

Furthermore, the processor 2604 is further configured to: in a case in which it is determined that it is not necessary to switch to a backup beam link, calculate an azimuth of a beam link of the next frame.

Furthermore, the processor 2604 is further configured to perform pilot detection and estimation separately on the current beam link, the proximate selectable beam link of the current beam link, and the first backup beam link, to obtain the reception detection result of the enhanced beam tracking training auxiliary sequence; calculate, according to the reception detection result of the enhanced beam tracking training auxiliary sequence and received signal energy of the optimal link, signal power attenuation caused by antenna rotation and signal power attenuation caused by a link blockage; and determine whether an antenna is rotated according to the signal power attenuation caused by antenna rotation and a rotation attenuation threshold, and determine, according to the signal power attenuation caused by a link blockage and a blockage threshold, whether it is necessary to switch to a backup beam link in the next frame.

Furthermore, the processor 2604 is further configured to calculate, according to a determining result in the determining unit of whether the antenna is rotated, a determining result of whether it is necessary to switch to a backup beam link in the next frame, an azimuth of an optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link.

Figure 27:
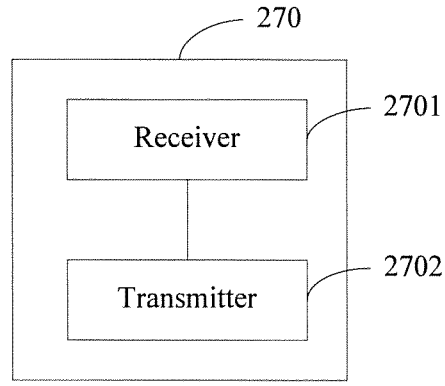
FIG. 27 is a schematic diagram of another physical beam tracking apparatus according to the present invention.

The present invention provides a beam tracking device 270, which, as shown in FIG. 27, includes: a receiver 2701 and a transmitter 2702.

The receiver 2701 is configured to receive a beam tracking request transmitted by a beam tracking initiator.

The transmitter 2702 is configured to transmit an enhanced beam tracking training auxiliary sequence to the beam tracking initiator according to the received beam tracking request, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link.

The receiver 2701 is further configured to receive first link switching information transmitted by the beam tracking initiator, where the first link switching information is used to instruct the beam tracking initiator and a beam tracking responder to switch to a second backup beam link.

The receiver 2701 is specifically configured to: if the current beam link via which the beam tracking initiator and the beam tracking responder perform communication is an optimal link after beamforming, and the beam tracking initiator detects that signal attenuation of the current beam link exceeds a preset threshold, receive the beam tracking request transmitted by the beam tracking initiator; or, if the current beam link via which the beam tracking initiator and the beam tracking responder perform communication is a second optimal link after beamforming, and the beam tracking initiator detects that an optimal link after beamforming is recovered, receive the beam tracking request transmitted by the beam tracking initiator.

The transmitter 2702 is specifically configured to transmit the beam tracking training auxiliary sequence unit of the current beam link to the beam tracking initiator by using the current beam link, transmit the beam tracking training auxiliary sequence unit of the proximate selectable beam link of the current beam link to the beam tracking initiator by using the proximate selectable beam link of the current beam link, and transmit the beam tracking training auxiliary sequence unit of the first backup beam link to the beam tracking initiator by using the first backup beam link.

Furthermore, the receiver 2701 is further configured to: before the beam tracking request transmitted by the beam tracking initiator is received, receive enhanced beam tracking information transmitted by the beam tracking initiator, where the enhanced beam tracking information includes: information of the first backup beam link and an identity of requesting the beam tracking responder to transmit the enhanced beam tracking training auxiliary sequence; and the transmitter 2702 is further configured to transmit response information to the beam tracking initiator according to the received enhanced beam tracking information, where the response information is used to instruct the beam tracking responder whether to transmit the enhanced beam tracking training auxiliary sequence.

Figure 28:
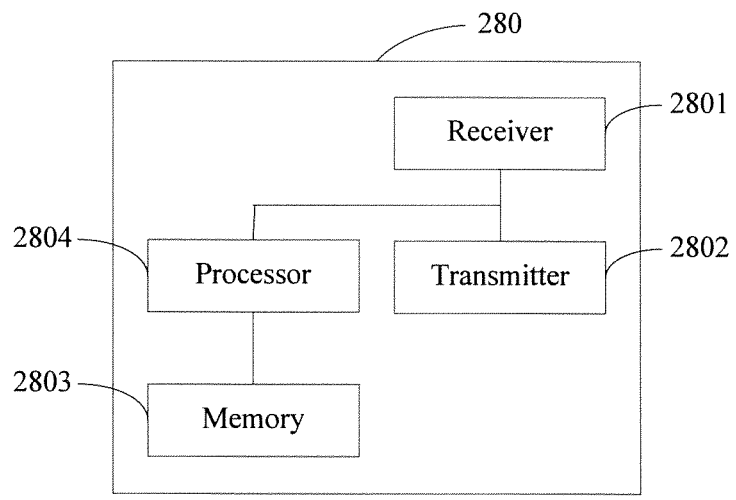
FIG. 28 is a schematic diagram of another physical beam tracking apparatus according to the present invention.

The present invention provides a beam tracking device 280, which, as shown in FIG. 28, includes: a sender 2801, a receiver 2802, a memory 2803, and a processor 2804.

The transmitter 2801 is configured to transmit a beam tracking request and an enhanced beam tracking training auxiliary sequence to a beam tracking responder, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link.

The receiver 2802 is configured to receive a reception detection result of the enhanced beam tracking training auxiliary sequence transmitted by the beam tracking responder.

The transmitter 2801 is further configured to: when it is determined according to received beam link information that is transmitted by the beam tracking responder and that is obtained through measurement of current beam tracking that it is necessary to switch to a backup link, transmit first link switching information to the beam responder, where the first link switching information is used to instruct a beam tracking initiator and the beam tracking responder to switch to a second backup beam link.

The transmitter 2801 is specifically configured to: if the current beam link via which the beam tracking initiator and the beam tracking responder perform communication is an optimal link after beamforming, and the beam tracking initiator detects that signal attenuation of the current beam link exceeds a preset threshold, transmit the beam tracking request and the enhanced beam tracking training auxiliary sequence to the beam tracking responder; or, if the current beam link via which the beam tracking initiator and the beam tracking responder perform communication is a second optimal link after beamforming, and the beam tracking initiator detects that an optimal link after beamforming is recovered, transmit the beam tracking request and the enhanced beam tracking training auxiliary sequence to the beam tracking responder.

The transmitter 2801 is further specifically configured to transmit the beam tracking training auxiliary sequence unit of the current beam link to the beam tracking responder by using the current beam link, transmit the beam tracking training auxiliary sequence unit of the proximate selectable beam link of the current beam link to the beam tracking responder by using the proximate selectable beam link of the current beam link, and transmit the beam tracking training auxiliary sequence unit of the first backup beam link to the beam tracking responder by using the first backup beam link.

Furthermore, the receiver 2802 is further configured to receive enhanced beam tracking information transmitted by the beam tracking responder, where the enhanced beam tracking information includes: information of the first backup beam link and an identity of requesting the beam tracking initiator to transmit the enhanced beam tracking training auxiliary sequence; and the transmitter 2801 is further configured to transmit response information to the beam tracking responder according to the received enhanced beam tracking information, where the response information is used to instruct the beam tracking initiator whether to transmit the enhanced beam tracking training auxiliary sequence.

The memory 2803 is configured to stores a beam tracking detection algorithm; and the processor 2804 is configured to invoke a detection unit stored in the memory to: if the current beam link via which the beam tracking initiator and the beam tracking responder perform communication is the optimal link after beamforming and a proximate beam link of the optimal link, determine whether it is necessary to switch to a backup beam link in a next frame; and in a case in which the processor module determines that it is necessary to switch to a backup beam link, calculate an azimuth of the second backup beam link that needs to be switched to in the next frame, and an azimuth of a backup beam link when the second backup beam link is used as a current link.

Furthermore, the processor 2804 is further configured to: calculate, in a case in which it is not necessary to switch to a backup beam link, an azimuth of a beam link of the next frame.

The processor 2804 is specifically configured to calculate, according to the reception detection result of the enhanced beam tracking training auxiliary sequence and received signal energy of the optimal link, signal power attenuation caused by antenna rotation and signal power attenuation caused by a link blockage; and determine whether an antenna is rotated according to the signal power attenuation caused by antenna rotation and a rotation attenuation threshold, and determine, according to the signal power attenuation caused by a link blockage and a blockage threshold, whether it is necessary to switch to a backup beam link in the next frame.

The processor 2804 is further specifically configured to calculate, according to a determining result of whether the antenna is rotated, a determining result of whether it is necessary to switch to a backup beam link in the next frame, an azimuth of an optimal beam link, the azimuth of the backup beam link, and the reception detection result of the enhanced beam tracking training auxiliary sequence, the azimuth of the second backup beam link that needs to be switched to in the next frame and the azimuth of the backup beam link when the second backup beam link is used as a current link.

Figure 29:
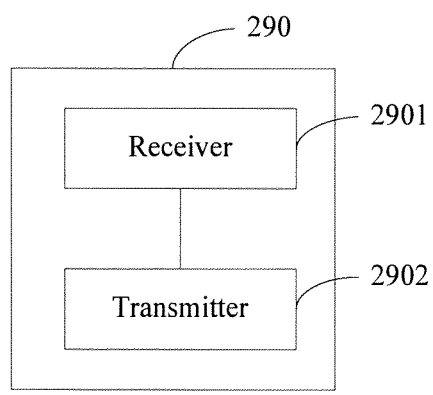
FIG. 29 is a schematic diagram of another physical beam tracking apparatus according to the present invention.

The present invention provides a beam tracking device 290, which, as shown in FIG. 29, includes: a receiver 2901 and a transmitter 2902.

The receiver 2901 is configured to receive a beam tracking request and an enhanced beam tracking training auxiliary sequence that are transmitted by a beam tracking initiator, where the enhanced beam tracking training auxiliary sequence includes: a beam tracking training auxiliary sequence unit of a current beam link, a beam tracking training auxiliary sequence unit of a proximate selectable beam link of the current beam link, and a beam tracking training auxiliary sequence unit of a first backup beam link.

The transmitter 2902 is configured to transmit a reception detection result of the enhanced beam tracking training auxiliary sequence to the beam tracking initiator according to the received beam tracking request and enhanced beam tracking training auxiliary sequence.

The receiver 2901 is further configured to receive first link switching information transmitted by the beam tracking initiator, where the first link switching information is used to instruct the beam tracking initiator and a beam tracking responder to switch to a second backup beam link.

The receiver 2901 is specifically configured to: if the current beam link via which the beam tracking initiator and the beam tracking responder perform communication is an optimal link after beamforming, and the beam tracking initiator detects that signal attenuation of the current beam link exceeds a preset threshold, receive the beam tracking request and the enhanced beam tracking training auxiliary sequence that are transmitted by the beam tracking initiator; or, if the current beam link via which the beam tracking initiator and the beam tracking responder perform communication is a second optimal link after beamforming, and the beam tracking initiator detects that an optimal link after beamforming is recovered, receive the beam tracking request and the enhanced beam tracking training auxiliary sequence that are transmitted by the beam tracking initiator.

Furthermore, the receiver 2901 is further specifically configured to receive the beam tracking training auxiliary sequence unit, of the current beam link, transmitted by using the current beam link by the beam tracking initiator, receive the beam tracking training auxiliary sequence unit, of the proximate selectable beam link of the current beam link, transmitted by using the proximate selectable beam link of the current beam link by the beam tracking initiator, and receive the beam tracking training auxiliary sequence unit, of the first backup beam link, transmitted by using the first backup beam link by the beam tracking initiator.

Furthermore, the transmitter 2902 is further configured to: before the receiver receives the beam tracking request and the enhanced beam tracking training auxiliary sequence that are transmitted by the beam tracking initiator, transmit enhanced beam tracking information to the beam tracking initiator, where the enhanced beam tracking information includes: information of the first backup beam link and an identity of requesting the beam tracking initiator to transmit the enhanced beam tracking training auxiliary sequence; and the receiver 2901 is further configured to receive response information transmitted by the beam tracking initiator, where the response information is used to instruct the beam tracking initiator whether to transmit the enhanced beam tracking training auxiliary sequence.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A beam tracking method, comprising:
   transmitting, by a beam tracking initiator, a beam tracking request to a beam tracking responder;
   receiving, by the beam tracking initiator, a beam tracking training auxiliary sequence transmitted, according to the beam tracking request, by the beam tracking responder, wherein the beam tracking training auxiliary sequence comprises:
      a beam tracking training auxiliary sequence unit of a current beam link,
      a beam tracking training auxiliary sequence unit of a proximate selectable beam link of the current beam link, and
      a beam tracking training auxiliary sequence unit of a first backup beam link,
      wherein the proximate selectable beam link of the current beam link is a selectable beam link proximate to the current beam link,
      wherein the beam tracking training auxiliary sequence unit of the current beam link comprises: an automatic gain control (AGC) field and a training sequence (TRN) field of the current beam link;
      wherein the beam tracking training auxiliary sequence unit of the proximate selectable beam link of the current beam link comprises: an AGC field and a TRN field of the proximate selectable beam link of the current beam link; and
      wherein the beam tracking training auxiliary sequence unit of the first backup beam link comprises: a short training sequence (STF) field and a channel estimation (CE) field of the first backup beam link, wherein the STF field and the CE field are at end of the beam tracking training auxiliary sequence; and
   when it is determined according to a reception detection result of the STF field and the CE field of the first backup beam link, the AGC field and the TRN field of the current beam link, and the AGC field and the TRN field of the proximate selectable beam link of the current beam link, to switch to the first backup beam link, transmitting, by the beam tracking initiator, first link switching information to the beam tracking responder, wherein the first link switching information is used to instruct the beam tracking initiator and the beam tracking responder to switch to the first backup beam link.

2. The method according to claim 1, wherein transmitting, by a beam tracking initiator, a beam tracking request to a beam tracking responder comprises:
   if the current beam link via which the beam tracking initiator and the beam tracking responder perform communication is an optimal link after beamforming, and the beam tracking initiator detects that signal attenuation of the current beam link exceeds a preset threshold, transmitting, by the beam tracking initiator, the beam tracking request to the beam tracking responder; or if the current beam link via which the beam tracking initiator and the beam tracking responder perform communication is a second optimal link after beamforming, and the beam tracking initiator detects that an optimal link after beamforming is recovered, transmitting, by the beam tracking initiator, the beam tracking request to the beam tracking responder.

3. The method according to claim 1, wherein receiving, by the beam tracking initiator, the beam tracking training auxiliary sequence transmitted, according to the beam tracking request, by the beam tracking responder comprises:

receiving, by the beam tracking initiator, the beam tracking training auxiliary sequence unit, of the current beam link, transmitted by using the current beam link by the beam tracking responder, receiving the beam tracking training auxiliary sequence unit, of the proximate selectable beam link of the current beam link, transmitted by using the proximate selectable beam link of the current beam link by the beam tracking responder, and receiving the beam tracking training auxiliary sequence unit, of the first backup beam link, transmitted by using the first backup beam link by the beam tracking responder.

4. The method according to claim 1, wherein before transmitting, by the beam tracking initiator, the beam tracking request to a beam tracking responder, the method further comprises:

transmitting, by the beam tracking initiator, enhanced beam tracking information to the beam tracking responder, wherein the enhanced beam tracking information comprises: antenna configuration information of the first backup beam link and an indicator of requesting the beam tracking responder to transmit the beam tracking training auxiliary sequence; and receiving, by the beam tracking initiator, response information transmitted by the beam tracking responder, wherein the response information is used to instruct the beam tracking responder whether to transmit the beam tracking training auxiliary sequence.

5. The method according to claim 1, wherein transmitting, by the beam tracking initiator, enhanced beam tracking information to the beam tracking responder comprises:

transmitting, by the beam tracking initiator, the enhanced beam tracking information to the beam tracking responder in a sector-level sweep (SLS) phase; or transmitting, by the beam tracking initiator, the enhanced beam tracking information to the beam tracking responder in a beam refinement protocol (BRP) phase.

6. The method according to claim 4, wherein:

the enhanced beam tracking information is in an enhanced beam tracking information unit of a media access control (MAC) layer;

transmitting, by the beam tracking initiator, enhanced beam tracking information to the beam tracking responder comprises:

transmitting, by the beam tracking initiator to the beam tracking responder, a sector sweep (SSW) frame or a sector sweep feedback (SSW-feedback) frame comprising the enhanced beam tracking information unit, or transmitting, by the beam tracking initiator to the beam tracking responder, a beam refinement protocol (BRP) frame comprising the enhanced beam tracking information unit; and receiving, by the beam tracking initiator, response information transmitted by the beam tracking responder comprises:

receiving, by the beam tracking initiator, an SSW frame or an SSW-feedback frame, carrying an enhanced beam tracking information unit of the response information, transmitted by the beam tracking responder, or receiving, by the beam tracking initiator, a BRP frame, carrying an enhanced beam tracking information unit of the response information, transmitted by the beam tracking responder.

7. The method according to claim 6, wherein the enhanced beam tracking information unit comprises:

an information element identity (Element ID) used to represent an ID of a current information unit;

a length, used to represent a length of the current information unit;

a backup beam link antenna weight vector setting (Backup AWV Setting) used to represent whether to update an antenna vector setting of a peer backup beam link;

a peer transmit-sector identity (Peer Tx_Sector ID) used to represent whether a peer transmit-sector identity needs to be backed up;

a peer transmit-antenna identity (Peer Tx_Antenna ID) used to represent whether a peer transmit-antenna identity needs to be backed up;

an enhanced beam tracking in receiver request (E-BT-R Request) used to represent whether to request a peer to receive a training auxiliary sequence according to an enhanced beam tracking mode;

an enhanced beam tracking in receiver OK (E-BR-R OK) used to represent whether itself receives a training auxiliary sequence of an enhanced beam tracking mode;

an enhanced beam tracking in transmitter request (E-BT-T Request) used to represent whether to request a peer to transmit a training auxiliary sequence according to an enhanced beam tracking mode; and an enhanced beam tracking in transmitter OK (E-BR-T OK) used to represent whether itself transmits a training auxiliary sequence of an enhanced beam tracking mode.

8. The method according to claim 7, wherein transmitting, by the beam tracking initiator, first link switching information to the beam tracking responder comprises:

transmitting, by the beam tracking initiator to the beam tracking responder, the first link switching information carried in a frame header of a physical layer frame.

9. The method according to claim 7, wherein:

the enhanced beam tracking information unit further comprises:

a switch to backup beam link identity (Switch to Backup AWV) used to represent whether to switch to a backup beam link in a next frame and use an antenna configuration of the current beam link as an antenna configuration of the backup beam link in the next frame; and transmitting, by the beam tracking initiator, first link switching information to the beam tracking responder comprises:

transmitting, by the beam tracking initiator to the beam tracking responder, an SSW frame or an SSW-feedback carrying an enhanced beam tracking information unit of the first link switching information, or transmitting, by the beam tracking initiator to the beam tracking responder, a BRP frame carrying an enhanced beam tracking information unit of the first link switching information.

10. A beam tracking device, comprising:
a transmitter configured to transmit a beam tracking request to a beam tracking responder; and
a receiver configured to receive a beam tracking training auxiliary sequence transmitted, according to the beam tracking request, by the beam tracking responder, wherein the beam tracking training auxiliary sequence comprises:
a beam tracking training auxiliary sequence unit of a current beam link,
a beam tracking training auxiliary sequence unit of a proximate selectable beam link of the current beam link, wherein the proximate selectable beam link of the current beam link is a selectable beam link proximate to the current beam link, and
a beam tracking training auxiliary sequence unit of a first backup beam link;
wherein the beam tracking training auxiliary sequence unit of the current beam link comprises: an automatic gain control (AGC) field and a training sequence (TRN) field of the current beam link;
wherein the beam tracking training auxiliary sequence unit of the proximate selectable beam link of the current beam link comprises: an AGC field and a TRN field of the proximate selectable beam link of the current beam link; and
wherein the beam tracking training auxiliary sequence unit of the first backup beam link comprises: a short training sequence (STF) field and a channel estimation (CE) field of the first backup beam link, wherein the STF field and the CE field are at end of the beam tracking training auxiliary sequence;
at least one processor configured to:
determine to switch to the first backup beam link according to a reception detection result of the STF field and the CE field of the first backup beam link, the AGC field and the TRN field of the current beam link, and the AGC field and the TRN field of the proximate selectable beam link of the current beam link; and
wherein the transmitter is further configured to transmit first link switching information to the beam tracking responder, wherein the first link switching information is used to instruct the beam tracking device and the beam tracking responder to switch to the first backup beam link.

11. The device according to claim 10, wherein the transmitter is configured to:
if the current beam link via which the beam tracking device and the beam tracking responder perform communication is an optimal link after beamforming, and the at least one processor detects that signal attenuation of the current beam link exceeds a preset threshold, transmit the beam tracking request to the beam tracking responder; or
if the current beam link via which the beam tracking device and the beam tracking responder perform communication is a second optimal link after beamforming, and the at least one processor detects that an optimal link after beamforming is recovered, transmit the beam tracking request to the beam tracking responder.

12. The device according to claim 10, wherein the receiver is configured to receive the beam tracking training auxiliary sequence unit, of the current beam link, transmitted by using the current beam link by the beam tracking responder, the beam tracking training auxiliary sequence unit, of the proximate selectable beam link of the current beam link, transmitted by using the proximate selectable beam link of the current beam link, and the beam tracking training auxiliary sequence unit, of the first backup beam link, transmitted by using the first backup beam link.

13. The device according to claim 10, wherein:
the transmitter is further configured to: before the beam tracking request is transmitted to the beam tracking responder, transmit enhanced beam tracking information to the beam tracking responder, wherein the enhanced beam tracking information comprises: information of the first backup beam link and an indicator of requesting the beam tracking responder to transmit the beam tracking training auxiliary sequence; and
the receiver is further configured to receive response information transmitted by the beam tracking responder, wherein the response information is used to instruct the beam tracking responder whether to transmit the beam tracking training auxiliary sequence.

14. A beam tracking device, comprising:
a receiver configured to receive a beam tracking request transmitted by a beam tracking initiator; and
a transmitter configured to transmit a beam tracking training auxiliary sequence to the beam tracking initiator according to the received beam tracking request, wherein the beam tracking training auxiliary sequence comprises:
a beam tracking training auxiliary sequence unit of a current beam link,
a beam tracking training auxiliary sequence unit of a proximate selectable beam link of the current beam link, wherein the proximate selectable beam link of the current beam link is a selectable beam link proximate to the current beam link, and
a beam tracking training auxiliary sequence unit of a first backup beam link;
wherein the beam tracking training auxiliary sequence unit of the current beam link comprises: an automatic gain control (AGC) field and a training sequence (TRN) field of the current beam link;
wherein the beam tracking training auxiliary sequence unit of the proximate selectable beam link of the current beam link comprises: an AGC field and a TRN field of the proximate selectable beam link of the current beam link; and
wherein the beam tracking training auxiliary sequence unit of the first backup beam link comprises: a short training sequence (STF) field and a channel estimation (CE) field of the first backup beam link, and the STF field and the CE field are at end of the beam tracking training auxiliary sequence; and
wherein the receiver is further configured to receive first link switching information transmitted by the beam tracking initiator, wherein the first link switching information is used to instruct the beam tracking initiator and the beam tracking device to switch to the first backup beam link.

15. The device according to claim 14, wherein the receiver is configured to:
if the current beam link via which the beam tracking initiator and the beam tracking device perform communication is an optimal link after beamforming, and the beam tracking initiator detects that signal attenuation of the current beam link exceeds a preset threshold, receive the beam tracking request transmitted by the beam tracking initiator; or if the current beam link via which the beam tracking initiator and the beam tracking device perform communication is a second optimal link after beamforming, and the beam tracking initiator detects that an optimal link after beamforming is recovered, receive the beam tracking request transmitted by the beam tracking initiator.

16. The device according to claim 14, wherein the transmitter is configured to:

transmit the beam tracking training auxiliary sequence unit of the current beam link to the beam tracking initiator by using the current beam link;

transmit the beam tracking training auxiliary sequence unit of the proximate selectable beam link of the current beam link to the beam tracking initiator by using the proximate selectable beam link of the current beam link; and transmit the beam tracking training auxiliary sequence unit of the first backup beam link to the beam tracking initiator by using the first backup beam link.

17. The device according to claim 14, wherein:

the receiver is further configured to: before the beam tracking request transmitted by the beam tracking initiator is received, receive enhanced beam tracking information transmitted by the beam tracking initiator, wherein the enhanced beam tracking information comprises: information of the first backup beam link and an indicator of requesting the beam tracking device to transmit the beam tracking training auxiliary sequence; and the transmitter is further configured to: transmit response information to the beam tracking initiator according to the received enhanced beam tracking information, wherein the response information is used to instruct the beam tracking device whether to transmit the beam tracking training auxiliary sequence.

18. The method according to claim 1, wherein receiving the beam tracking training auxiliary sequence comprises receiving, in a single frame, the AGC field and the TRN field of the current beam link, the AGC field and the TRN field of the proximate selectable beam link of the current beam link, and the STF field and the CE field of the first backup beam link; and wherein determining, according to a reception detection result of the beam tracking training auxiliary sequence, to switch to the first backup beam link comprises determining to switch to the first backup beam link in a next frame of the single frame.

19. The method according to claim 1, wherein performing the reception detection of the beam tracking training auxiliary sequence further comprises:

performing channel estimation of the current beam link based on the AGC field and the TRN field of the current beam link;

performing channel estimation of the proximate selectable beam link of the current beam link based on the AGC field and the TRN field of the proximate selectable beam link of the current beam link; and wherein determining, according to a reception detection result of the beam tracking training auxiliary sequence, to switch to the first backup beam link comprisese a comparison of:

a result of the channel estimation the current beam link based on the AGC field and the TRN field of the current beam link;

a result of the channel estimation the proximate selectable beam link of the current beam link based on the AGC field and the TRN field of the proximate selectable beam link of the current beam link; and the result of the channel estimation the first backup beam link based on the STF field and the CE field of the first backup beam link.

* * * * *

UNITED STATES PATENT AND TRADEMARK OFFICE
CERTIFICATE OF CORRECTION

PATENT NO. : 10,027,027 B2
APPLICATION NO. : 15/064354
DATED : July 17, 2018
INVENTOR(S) : Bo Gao et al.

Page 1 of 1

It is certified that error appears in the above-identified patent and that said Letters Patent is hereby corrected as shown below:

In the Claims

Column 70, Line 26, Claim 19, delete "comprisese" and insert -- comprises --, therefor.

Signed and Sealed this
Tenth Day of March, 2020

Andrei Iancu
*Director of the United States Patent and Trademark Office*